US009825800B2

(12) United States Patent
Jung et al.

(10) Patent No.: US 9,825,800 B2
(45) Date of Patent: *Nov. 21, 2017

(54) METHODS AND SYSTEMS FOR MANAGING DATA

(71) Applicant: Elwha LLC, Bellevue, WA (US)

(72) Inventors: Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 770 days.

This patent is subject to a terminal disclaimer.

(21) Appl. No.: 13/685,485

(22) Filed: Nov. 26, 2012

(65) Prior Publication Data

US 2014/0122700 A1 May 1, 2014
US 2017/0257253 A9 Sep. 7, 2017

Related U.S. Application Data

(63) Continuation-in-part of application No. 13/987,300, filed on Oct. 30, 2012, and a continuation-in-part of
(Continued)

(51) Int. Cl.
*G06F 15/16* (2006.01)
*H04L 29/06* (2006.01)
(Continued)

(52) U.S. Cl.
CPC .......... *H04L 29/0602* (2013.01); *G06F 21/60* (2013.01); *G06F 21/6218* (2013.01);
(Continued)

(58) Field of Classification Search
USPC ................. 709/203, 223–229, 250
See application file for complete search history.

(56) References Cited

U.S. PATENT DOCUMENTS 6,029,175 A 2/2000 Chow et al.
6,122,520 A * 9/2000 Want et al. ............. 455/456.2
(Continued)

FOREIGN PATENT DOCUMENTS

EP 1818807 A 8/2007
WO WO 01/28273 A1 4/2001

OTHER PUBLICATIONS

PCT International Search Report; International App. No. PCT/US14/19562; Jun. 10, 2014; pp. 1-2.
(Continued)

*Primary Examiner* — Zarni Maung

(57) ABSTRACT

Computationally implemented methods and systems include receiving data regarding one or more properties of a device, said data not particularly identifying the device, identifying one or more services configured to be provided to a user of the device, said one or more services requiring access to particular data controlled by the device, wherein access to the particular data controlled by the device is managed by the device, and requesting access to the particular data controlled by the device, in exchange for providing one or more of the identified one or more services. In addition to the foregoing, other aspects are described in the claims, drawings, and text.

45 Claims, 32 Drawing Sheets

Related U.S. Application Data application No. 13/385,604, filed on Oct. 31, 2012, now Pat. No. 9,088,450.

(51) Int. Cl.

| | | |
|---|---|---|
| *H04L 29/08* | (2006.01) | |
| *G06F 21/60* | (2013.01) | |
| *H04L 12/24* | (2006.01) | |
| *G06F 21/62* | (2013.01) | |
| *G06F 12/00* | (2006.01) | |

(52) U.S. Cl.
CPC .......... *G06F 21/6254* (2013.01); *H04L 29/06* (2013.01); *H04L 29/06551* (2013.01); *H04L 29/08072* (2013.01); *H04L 29/0899* (2013.01); *H04L 41/00* (2013.01); *H04L 41/5054* (2013.01); *H04L 63/10* (2013.01); *H04L 67/16* (2013.01); *H04L 67/18* (2013.01); *H04L 67/32* (2013.01); *G06F 2221/2107* (2013.01); *G06F 2221/2111* (2013.01); *G06F 2221/2117* (2013.01); *G06F 2221/2141* (2013.01); *G06F 2221/2149* (2013.01); *G06F 2221/2153* (2013.01)

(56) References Cited

U.S. PATENT DOCUMENTS

| | | | |
|---|---|---|---|
| 6,871,277 | B1 | 3/2005 | Keronen |
| 7,178,034 | B2 | 2/2007 | Cihula et al. |
| 7,203,752 | B2 | 4/2007 | Rice et al. |
| 7,269,853 | B1 | 9/2007 | Dunn |
| 7,647,164 | B2 | 1/2010 | Reeves |
| 7,685,238 | B2 | 3/2010 | Etelapera |
| 7,849,311 | B2 | 12/2010 | Donlin et al. |
| 7,860,807 | B2 | 12/2010 | Kaneko et al. |
| 7,873,957 | B2 | 1/2011 | Nallipogu et al. |
| 7,913,312 | B2 | 3/2011 | de Jong |
| 7,917,154 | B2 | 3/2011 | Fortescue et al. |
| 7,996,682 | B2 | 8/2011 | Schutz et al. |
| 8,364,389 | B2 | 1/2013 | Dorogusker et al. |
| 8,387,155 | B2 | 2/2013 | Gregg et al. |
| 8,578,483 | B2 | 11/2013 | Seshadri et al. |
| 8,630,494 | B1 | 1/2014 | Svendsen |
| 8,756,321 | B2 | 6/2014 | Clark et al. |
| 2001/0025316 | A1 | 9/2001 | Oh |
| 2003/0023726 | A1 | 1/2003 | Rice et al. |
| 2004/0128500 | A1 | 7/2004 | Cihula et al. |
| 2005/0278342 | A1 | 12/2005 | Abdo et al. |
| 2006/0010047 | A1 | 1/2006 | Minor |
| 2007/0113079 | A1 | 5/2007 | Ito et al. |
| 2007/0136466 | A1 | 6/2007 | Etelapera |
| 2007/0232268 | A1 | 10/2007 | Park et al. |
| 2007/0273583 | A1 | 11/2007 | Rosenberg |
| 2008/0102856 | A1* | 5/2008 | Fortescue et al. ......... 455/456.1 |
| 2008/0153670 | A1 | 6/2008 | McKirdy et al. |
| 2009/0077085 | A1 | 3/2009 | Olivieri et al. |
| 2010/0024020 | A1 | 1/2010 | Baugher et al. |
| 2010/0082237 | A1* | 4/2010 | Black ........................... 701/207 |
| 2010/0107225 | A1 | 4/2010 | Spencer et al. |
| 2010/0324819 | A1 | 12/2010 | Nurminen et al. |
| 2011/0022468 | A1* | 1/2011 | Muster et al. ............. 705/14.58 |
| 2011/0128568 | A1 | 6/2011 | Bhogal et al. |
| 2011/0179366 | A1 | 7/2011 | Chae |
| 2011/0190009 | A1 | 8/2011 | Gerber, Jr. et al. |
| 2011/0209221 | A1 | 8/2011 | Hanson et al. |
| 2011/0295899 | A1 | 12/2011 | James et al. |
| 2012/0036345 | A1 | 2/2012 | Chen et al. |
| 2012/0054841 | A1 | 3/2012 | Schultz et al. |
| 2012/0084247 | A1 | 4/2012 | Aguera y Arcas et al. |
| 2012/0089465 | A1 | 4/2012 | Froloff |
| 2012/0096080 | A1 | 4/2012 | Levesque et al. |
| 2012/0117232 | A1 | 5/2012 | Brown et al. |
| 2012/0143662 | A1 | 6/2012 | Heath |
| 2012/0185912 | A1 | 7/2012 | Lee et al. |
| 2012/0209923 | A1 | 8/2012 | Mathur et al. |
| 2012/0222083 | A1 | 8/2012 | Vaha-Sipila et al. |
| 2012/0291101 | A1 | 11/2012 | Ahlstrom et al. |
| 2013/0014212 | A1 | 1/2013 | Cohen |
| 2013/0046632 | A1 | 2/2013 | Grigg et al. |
| 2013/0110854 | A1 | 5/2013 | Lockhart et al. |
| 2013/0124546 | A1 | 5/2013 | Wormley et al. |
| 2013/0179244 | A1 | 7/2013 | Laffoon et al. |
| 2013/0179988 | A1 | 7/2013 | Bekker et al. |
| 2013/0219461 | A1 | 8/2013 | Esaki et al. |
| 2013/0263000 | A1 | 10/2013 | Lucas et al. |
| 2013/0263206 | A1 | 10/2013 | Nefedov et al. |
| 2013/0282227 | A1 | 10/2013 | Chen et al. |
| 2013/0290359 | A1 | 10/2013 | Eronen et al. |
| 2013/0318627 | A1 | 11/2013 | Lundkvist et al. |
| 2013/0339234 | A1 | 12/2013 | Prakash et al. |
| 2014/0006616 | A1 | 1/2014 | Aad et al. |
| 2014/0031959 | A1 | 1/2014 | Glode et al. |
| 2014/0059695 | A1 | 2/2014 | Parecki et al. |
| 2014/0122890 | A1 | 5/2014 | Prot |
| 2014/0123300 | A1 | 5/2014 | Jung et al. |
| 2014/0195349 | A1* | 7/2014 | Muster et al. ............. 705/14.58 |

OTHER PUBLICATIONS

Zhou, Yajin et al., "Taming Information-Stealing Smartphone Applications (on Android)," Proceedings of the 4th International Conference on Trust and Trustworthy Computing, Pittsburgh, PA, Jun. 2011, 15 pages.

Reddy et al.; "Biketastic: Sensing and Mapping for Better Biking"; CHI 2010; Apr. 10-15, 2010; pp. 1-4; ACM; located at http://research.cens.ucla.edu/people/estrin/resources/conferences/2010apr-Reddy-Shilton-Biketastic.pdf.

Holder, Joseph; "BlackBerry 101 —Application permissions"; bearing a date of Dec. 31, 2010; printed on Sep. 28, 2016; pp. 1-6.

Extended European Search Report; European App. No.: EP 14 75 7393, dated Oct. 13, 2016 (received by our Agent on Oct. 14, 2016); pp. 1-8.

* cited by examiner

| Fig. 2A | Fig. 2B | Fig. 2C | Fig. 2D |

152 Non-identifying Device Property Data Acquiring Module

| 238 Non-specifically Identifying Device Property Data Acquiring Module | 240 Incompletely Identifying Device Property Data Acquiring Module | 242 Device Property Data With Omitted Device Identifying Information Acquiring Module |

Fig. 2

| Fig. 2A | Fig. 2B | Fig. 2C | Fig. 2D |

FIG. 2C

152 Non-identifying Device Property Data Acquiring Module

244 Non-identifying Device Property Data Including Device Type Data Acquiring Module

| 246 Non-identifying Device Property Data Including Device Type As A Smartphone Data Acquiring Module | 248 Non-identifying Device Property Data Including Device Type As Having A Radio Data Acquiring Module | 250 Non-identifying Device Property Data Including Device Manufacturer Data Acquiring Module | 252 Non-identifying Device Property Data Including Device Operating System Data Acquiring Module |

| Fig. 2A | Fig. 2B | Fig. 2C | Fig. 2D |

(A)

154 Device User Services That Are Partly Based On Access To Particular Data That Is Under Device Authority Identifying Module 302 Device User Application Services That Are Partly Based On Access To Particular Data That Is Under Device Authority Identifying Module 304 Device User Object Proximity Notification Application Services That Are Partly Based On Access To Particular Data That Is Under Device Authority Identifying Module 310 Device User One Or More Friend Devices Proximity Notification Application Services That Are Partly Based On Access To Particular Data That Is Under Device Authority Identifying Module 312 Device User One Or More Friend Devices Proximity Notification Application Services That Are Partly Based On Access To Device Position Data And Device Contact List Data That Is Under Device Authority Identifying Module 314 Device User One Or More Friend Devices Proximity Notification Application Services That Are Partly Based On Access To Device Position Data And Device Contact List Data That Is Under Device Authority Based On User Input Identifying Module 306 Device User Shop Proximity Notification Application Services That Are Partly Based On Access To Particular Data That Is Under Device Authority Identifying Module 308 Device User Shop Proximity Notification Application Services That Are Partly Based On Access To Device Position Data That Is Under Device Authority Identifying Module (B)

Fig. 3

| Fig. 3A | Fig. 3B | Fig. 3C | Fig. 3D | Fig. 3E | Fig. 3F |

FIG. 3A

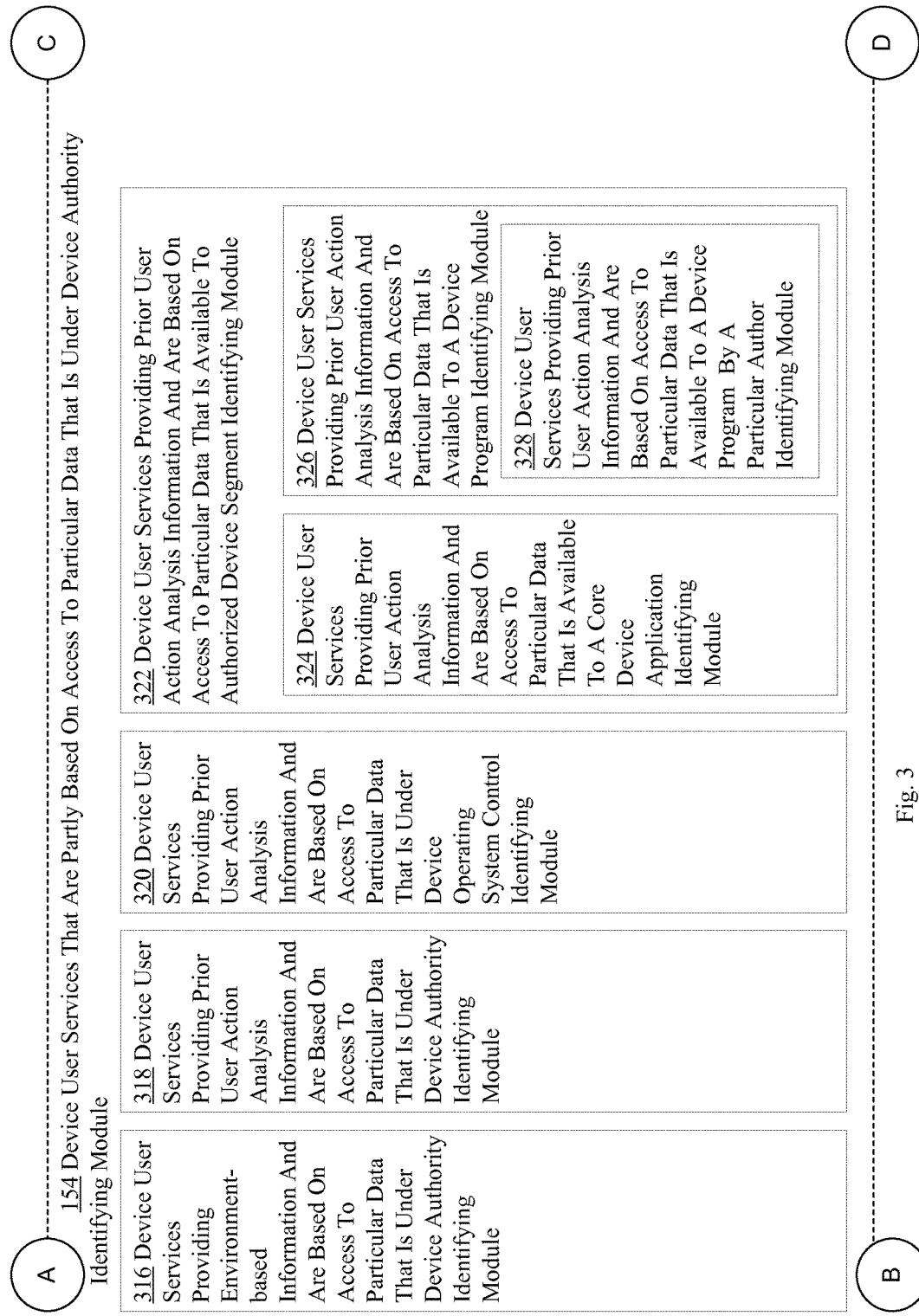

154 Device User Services That Are Partly Based On Access To Particular Data That Is Under Device Authority Identifying Module 330 Device User Services Providing Prior User Action Analysis Information And Are Based On Access To Particular Data That Is Available To A Device Application Having One Or More Specific Properties Identifying Module 332 Device User Services Providing Prior User Action Analysis Information And Are Based On Access To Particular Data That Is Available To A Device Application For Which A User Has Granted Access Identifying Module

Fig. 3

| Fig. 3A | Fig. 3B | Fig. 3C | Fig. 3D | Fig. 3E | Fig. 3F |

FIG. 3C

154 Device User Services That Are Partly Based On Access To Particular Data That Is Under Device Authority Identifying Module

| 334 Device User Services Providing Prior User Action Analysis Information And Are Based On Access To Particular Data That Is Available To A Device Application For Which A Security Certification Has Been Acquired Identifying Module | 336 Device User Services Providing Prior User Action Analysis Information And Are Based On Access To Particular Data That Is Available To A Device Application For Which A Security Certification Has Been Obtained Identifying Module | 338 Device User Services Providing Prior User Action Analysis Information And Are Based On Access To Particular Data That Is Unavailable To A Device Application For A Security Determination Has Not Been Acquired Identifying Module | 340 Device User Services Providing Prior User Action Analysis Information And Are Based On Access To Particular Data That Is Prevented From Being Transmitted To One Or More Locations Identifying Module | 342 Device User Services Providing Prior User Action Analysis Information And Are Based On Access To Particular Data That Is Transmitted Only To One Or More Identified Locations Identifying Module |

Fig. 3

| Fig. 3A | Fig. 3B | Fig. 3C | Fig. 3D | Fig. 3E | Fig. 3F |

FIG. 3D

154 Device User Services That Are Partly Based On Access To Particular Data That Is Under Device Authority Identifying Module 344 Device User Services Providing Prior User Action Analysis Information And Are Based On Access To Particular Data That Is Available To A Device Application For Which Transmission Of The Particular Data Is Regulated Identifying Module 346 Device User Services Providing Prior User Action Analysis Information And Are Based On Access To Particular Data That Is Available To A Device Application For Which Transmission Of The Particular Data Is Approved For One Or More Determined Locations Identifying Module 348 Device User Services Providing Prior User Action Analysis Information And Are Based On Access To Particular Data That Is Available To A Device Application For Which Transmission Of The Particular Data Is Approved For One Or More Locations For Which Particular Data Access Is Granted Identifying Module 350 Device User Services Providing Prior User Action Analysis Information And Are Based On Access To Particular Data That Is Available To A Device Application For Which Transmission Of The Particular Data Is Approved For One Or More Locations For Which Particular Data Access Is User-granted Identifying Module 352 Device User Services Providing Prior User Action Analysis Information And Are Based On Access To Particular Data That Is Available To A Device Application For Which Transmission Of The Particular Data Is Approved For One Or More Locations For Which Particular Data Access Is Granted By A Device Application Identifying Module

Fig. 3

| Fig. 3A | Fig. 3B | Fig. 3C | Fig. 3D | Fig. 3E | Fig. 3F |

FIG. 3E

154 Device User Services That Are Partly Based On Access To Particular Data That Is Under Device Authority Identifying Module

| 354 Device User Services That Are Based On Usage Data And That Are Partly Based On Access To Particular Data That Has An Access Attribute Managed By The Device Identifying Module | 358 Device User Services That Are Based On Usage Data And That Are Partly Based On Access To Particular Data That Is Controlled By The Device Identifying Module | 360 Device User Services That Are Partly Based On Access To Remotely-stored Particular Data That Is Managed By The Device Identifying Module | 362 Device User Services That Are Partly Based On Access To Cloud Stored Particular Data That Is Managed By The Device Identifying Module | 364 Device User Services That Are Partly Based On Access To Particular Sensor Collected Data That Is Managed By The Device Identifying Module |

356 Device User Services That Are Based On Temperature Usage Data And That Are Partly Based On Device Position Data Managed By The Device Identifying Module

| Fig. 3A | Fig. 3B | Fig. 3C | Fig. 3D | Fig. 3E | Fig. 3F |

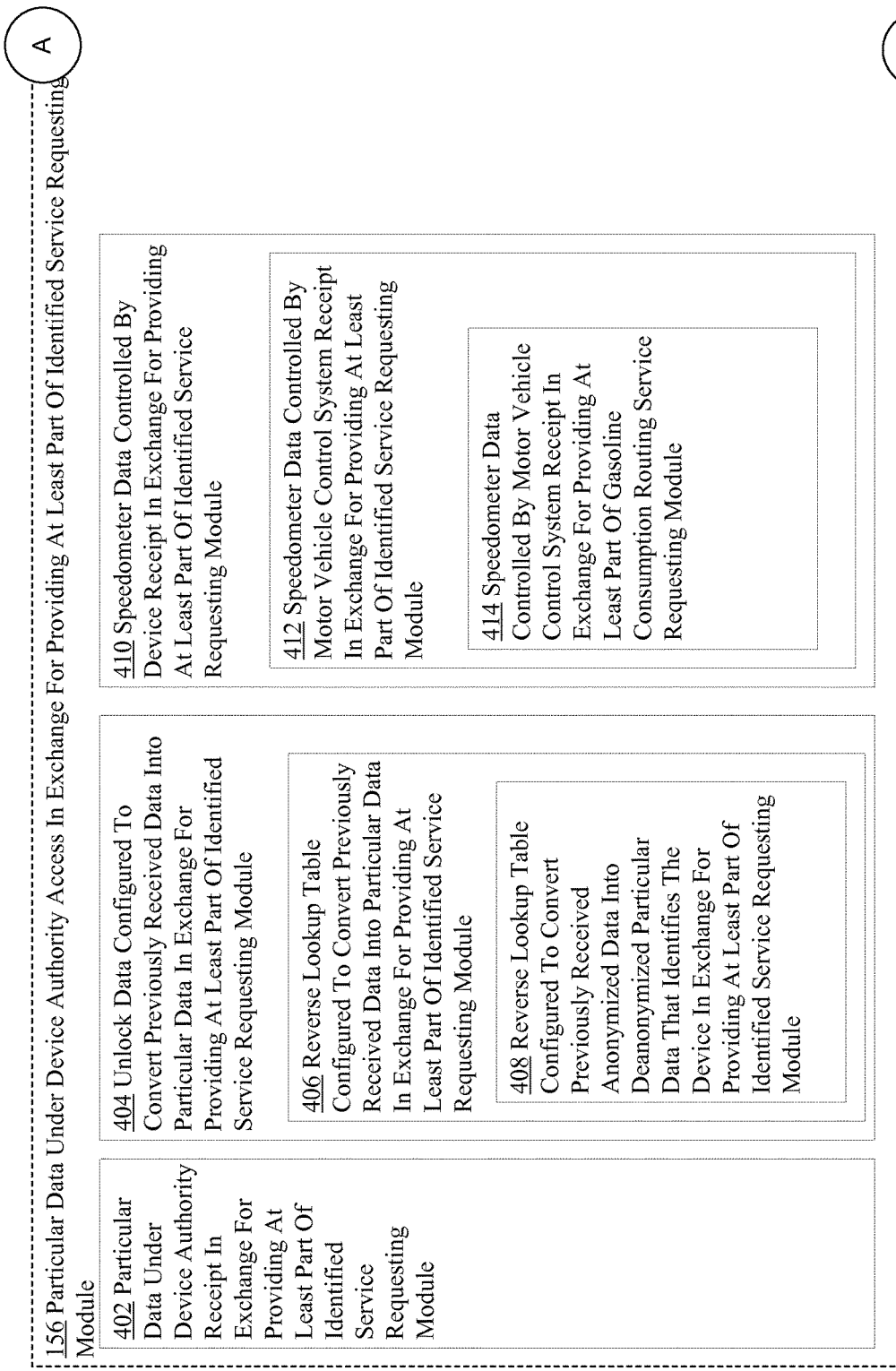

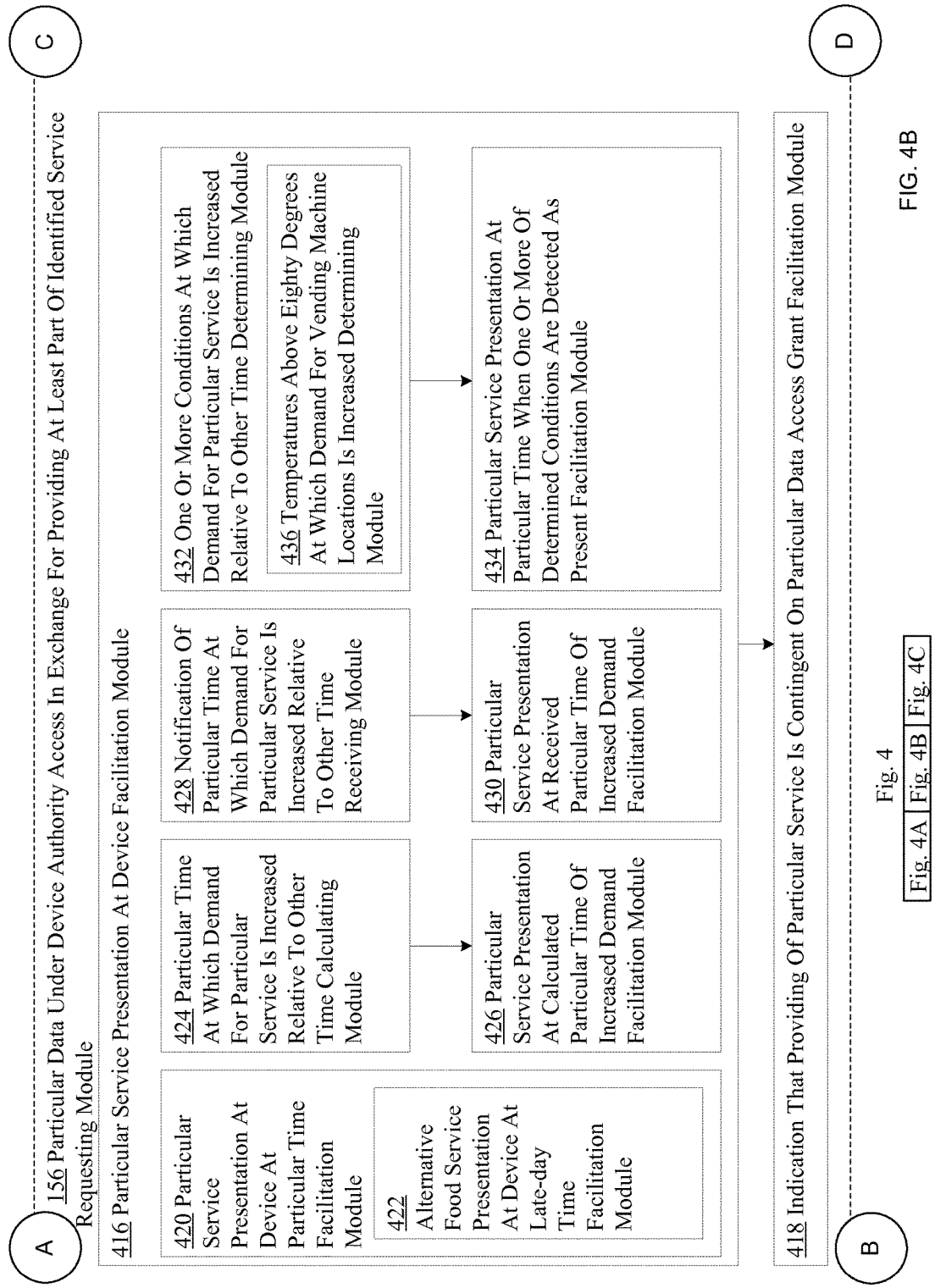

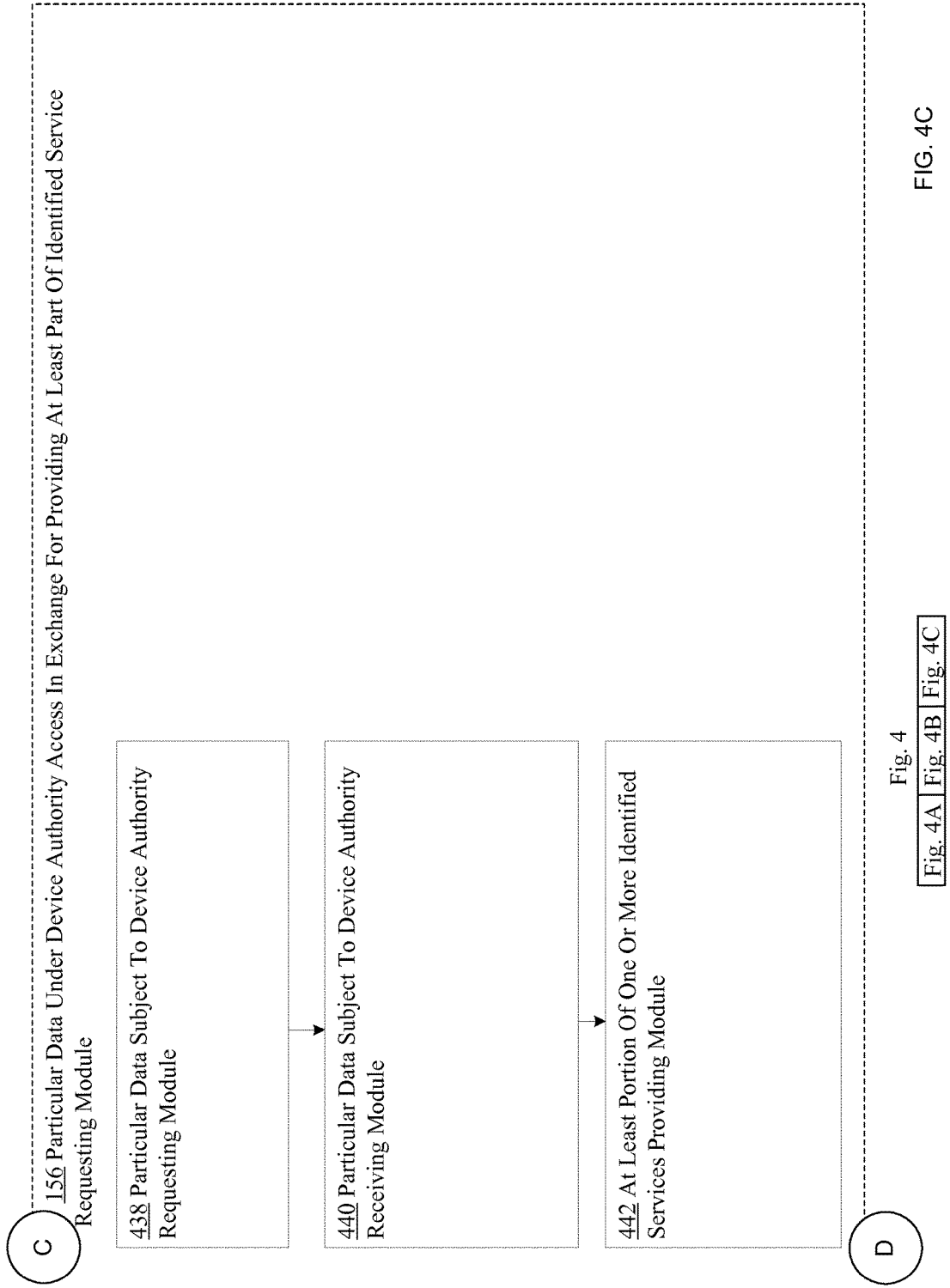

502 Receiving Data Regarding One Or More Properties Of A Device, Said Data Not Particularly Identifying The Device

602 Receiving Data Regarding One Or More Pieces Of Information Collected By A Device, Said Data Not Particularly Identifying The Device

604 Receiving Data Regarding An Existence Of One Or More Pieces Of Information Collected By A Device, Said Data Not Particularly Identifying The Device

606 Receiving Data Comprising One Or More Pieces Of Information Collected By A Device, Said Data Not Particularly Identifying The Device

608 Receiving Data Regarding Information Collected By A Device, Said Data Not Identifying The Device That Collected The Information

610 Receiving Data Regarding Information Collected By A Device Having A Device Identifier, Said Data Omitting The Device Identifier

612 Receiving Data Regarding Information Collected By A Device Having A Device Identifier That Is Unique To The Device, Said Received Data Including A Modified Identifier, Wherein The Device Identifier Cannot Be Independently Derived From The Modified Identifier

614 Receiving Data Regarding Information Collected By A Device Having A Device Identifier, Said Data Providing A Modified Device Identifier That Is Unique To The Device, And From Which The Device Identifier Can Be Derived Only Using A Private Lookup Table That Is Not Received With The Received Data

FIG. 6A

METHODS AND SYSTEMS FOR MANAGING DATA

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application claims benefit of priority of U.S. Provisional Patent Application No. 61/720,245 titled METHODS AND SYSTEMS FOR DATA SERVICES, naming Edward K. Y. Jung, Royce A. Levien, Richard T. Lord, Robert W. Lord, and Mark A. Malamud as inventors, filed 30 Oct. 2012, which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 61/720,874 titled METHODS AND SYSTEMS FOR DATA SERVICES, naming Edward K. Y. Jung, Royce A. Levien, Richard T. Lord, Robert W. Lord, and Mark A. Malamud as inventors, filed 31 Oct. 2012, which was filed within the twelve months preceding the filing date of the present application or is an application of which a currently co-pending application is entitled to the benefit of the filing date.

RELATED APPLICATIONS

U.S. patent application Ser. No. 13/685,609, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012 with, is related to the present application.

U.S. patent application Ser. No. 13/685,488, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012 with, is related to the present application.

U.S. patent application Ser. No. 13/685,612, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012 with, is related to the present application.

U.S. patent application Ser. No. 13/685,491, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012 with, is related to the present application.

U.S. patent application Ser. No. 13/685,613, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012 with, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application is related to data services.

SUMMARY

In one or more various aspects, a method includes but is not limited to receiving data regarding one or more properties of a device, said data not particularly identifying the device, identifying one or more services configured to be provided to a user of the device, said one or more services requiring access to particular data controlled by the device, wherein access to the particular data controlled by the device is managed by the device, and requesting access to the particular data controlled by the device, in exchange for providing one or more of the identified one or more services.

In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for receiving data regarding one or more properties of a device, said data not particularly identifying the device, means for identifying one or more services configured to be provided to a user of the device, said one or more services requiring access to particular data controlled by the device, wherein access to the particular data controlled by the device is managed by the device, and means for requesting access to the particular data controlled by the device, in exchange for providing one or more of the identified one or more services. In addition to the foregoing, other system aspects are described in the claims, drawings, and text forming a part of the disclosure set forth herein.

In one or more various aspects, a system includes, but is not limited to, circuitry for receiving data regarding one or more properties of a device, said data not particularly identifying the device, circuitry for identifying one or more services configured to be provided to a user of the device, said one or more services requiring access to particular data controlled by the device, wherein access to the particular data controlled by the device is managed by the device, and circuitry for requesting access to the particular data controlled by the device, in exchange for providing one or more of the identified one or more services. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for receiving data regarding one or more properties of a device, said data not particularly identifying the device, one or more instructions for identifying one or more services configured to be provided to a user of the device, said one or more services requiring access to particular data controlled by the device, wherein access to the particular data controlled by the device is managed by the device, and one or more instructions for requesting access to the particular data controlled by the device, in exchange for providing one or more of the identified one or more services. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for receiving data regarding one or more properties of a device, said data not particularly identifying the device, one or more interchained physical machines ordered for identifying one or more services configured to be provided to a user of the device, said one or more services requiring access to particular data controlled by the device, wherein access to the particular data controlled by the device is managed by the device, and one or more interchained physical machines ordered for requesting access to the particular data controlled by the device, in exchange for providing one or more of the identified one or more services.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 2, including FIGS. 2A-2D, shows a particular perspective of the non-identifying device property data acquiring module 152 of processing module 150 of computing device 130 of FIG. 1B, according to an embodiment.

FIG. 3, including FIGS. 3A-3F, shows a particular perspective of the device user services that are partly based on access to particular data that is under device authority identifying module 154 of processing module 150 of computing device 130 of FIG. 1B, according to an embodiment.

FIG. 4, including FIGS. 4A-4C, shows a particular perspective of the particular data under device authority access in exchange for providing at least part of identified service requesting module 156 of processing module 150 of computing device 130 of FIG. 1B, according to an embodiment.

FIG. 6A is a high-level logic flow chart of a process depicting alternate implementations of a data receiving operation 502, according to one or more embodiments.

DETAILED DESCRIPTION

Figure 1A:
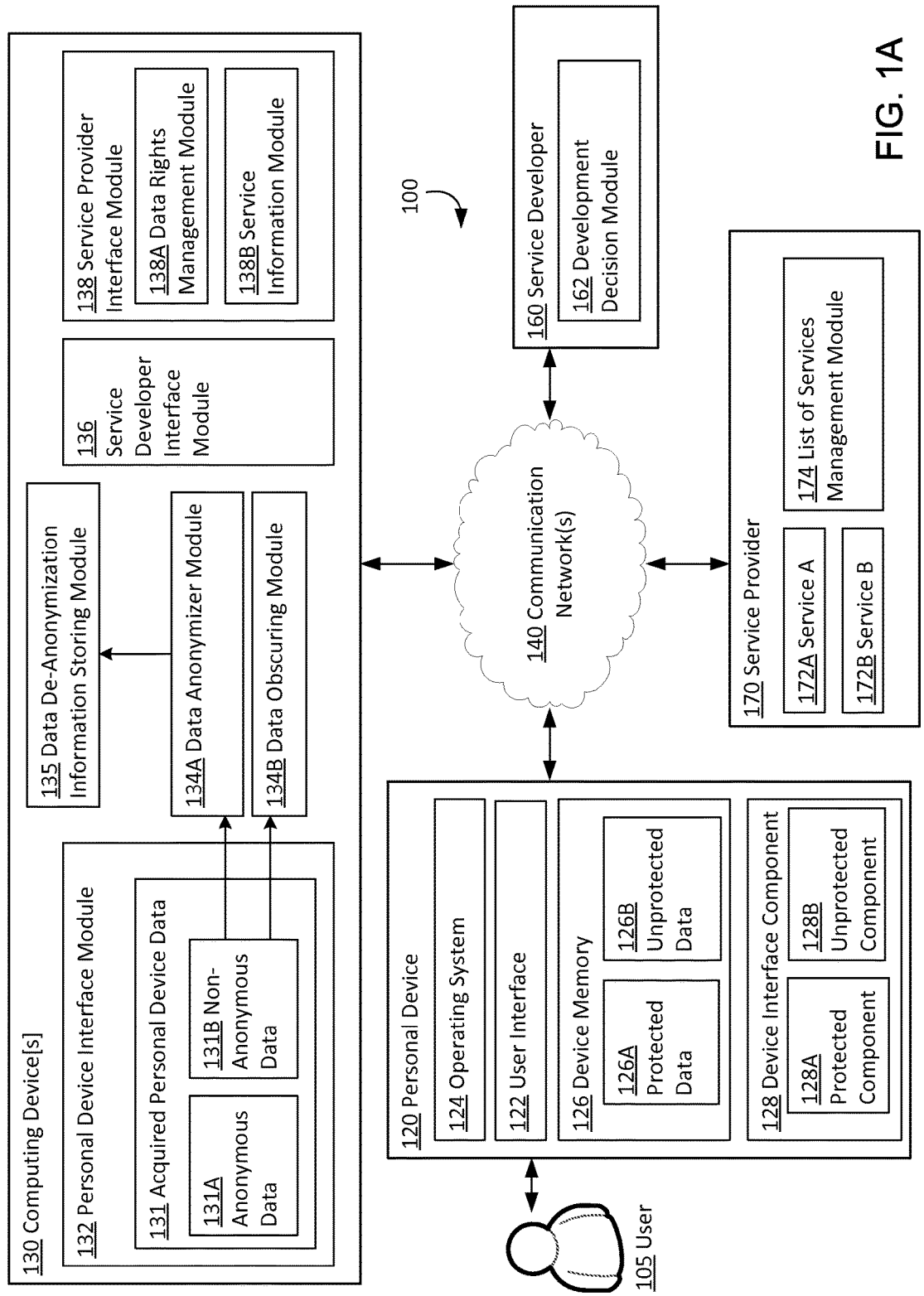
FIG. 1A shows a high-level block diagram of an exemplary environment 100, according to an embodiment.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for receiving data regarding one or more properties of a device, said data not particularly identifying the device, identifying one or more services configured to be provided to a user of the device, said one or more services requiring access to particular data controlled by the device, wherein access to the particular data controlled by the device is managed by the device, and requesting access to the particular data controlled by the device, in exchange for providing one or more of the identified one or more services.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/ converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/ wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user 105 is shown/described herein, e.g., in FIG. 1, and other places, as a single illustrated figure, those skilled in the art will appreciate that user 105 may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In known systems, devices that are associated with one or more users, e.g., phones, tablets, laptops, desktops, cars, game systems, appliances, and the like, may collect data regarding the user. This data may be desired by third parties. The following describes, among other implementations, methods and systems of managing user data collected by one or more devices that may also be useful to entities that are not the user, and which entities may not necessarily have access to the data.

Referring now to FIG. 1A, FIG. 1A illustrates an example environment 100 in which the methods, systems, circuitry, articles of manufacture, and computer program products and architecture, in accordance with various embodiments, may be implemented by one or more computing devices 30 As shown in FIG. 1A, one or more personal devices 20, one or more service providers 70, one or more service developers 60, and one or more computing devices 30 may communicate via one or more communication networks 40. In an embodiment, service provider 70 may have one or more services that personal device 20 may want. In an embodiment, computing device 30, which may be a remote or local server, or distributed set of servers, may manage data that is gathered, stored, controlled, accessed, restricted, monitored, under the control of, checked, examined, verified, authenticated, authorized, manipulated, updated, altered, filtered, or otherwise acted upon, whether passively or actively, by personal device 20. In an embodiment, as described in more detail herein, computing device 30 may have access to some or all of the data on personal device 20. In another embodiment, computing device 30 may have access to only a portion of the data on personal device 20. In still another embodiment, computing device 30 may have access to a modified version of the data on personal device 20. Specifically, in an embodiment, computing device 20 may have access to the data stored on personal device 20, but in anonymous form.

In an embodiment, computing device 30 may offer one or more services to personal device 20. In an embodiment, the offer of one or more services may be conditional on a grant of access to part or all of the data stored and/or collected by personal device 20. In an embodiment, computing device 30 may receive one or more services from service provider 70 and/or service developer 60, and may select one or more of the received services for presentation to the personal device 20. In an embodiment, the data from personal device 20 may be shared with one or more of service provider 70 and service developer 60. In an embodiment, the data from personal device 20 may be anonymized prior to sharing with service developer 60 and/or service developer 70.

Referring again to FIG. 1A, FIG. 1A shows a personal device 120. Personal device 120 may be any electronic device, portable or not, that may be operated by or associated with one or more users. Personal device 120 is shown as interacting with a user 105. As set forth above, user 105 may be a person, or a group of people, or another entity that mimics the operations of a user. In some embodiments, user 105 may be a computer or a computer-controlled device. Personal device 120 may be, but is not limited to, a cellular phone, a network phone, a smartphone, a tablet, a music player, a walkie-talkie, a radio, a USB drive, a portable solid state drive, a portable disc-type hard drive, an augmented reality device (e.g., augmented reality glasses and/or headphones), earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, an electronic safe, an electronic lock, an electronic security system, a video camera, a personal video recorder, a personal audio recorder, and the like.

Referring again to FIG. 1A, personal device 120 may include an operating system 124. In this context, operating system 124 refers to any hardware, software, firmware, and combination thereof which is considered at the core or baseline of a device. For example, applications that interact directly with hardware may be considered to be part of an operating system. In some embodiments, operating system 124 may be an FPGA, printed circuit board, or other wired device. In an embodiment, operating system 124 may include one or more of Google's Android, Apple's iOS, Microsoft's Windows, various implementations of Linux, and the like. In some embodiments, operating system 124 may include a root menu for one or more televisions, stereo systems, media players, and the like. In some embodiments, operating system 124 may be a "home" screen of a device.

Referring again to FIG. 1A, in an embodiment, personal device 20 may include a user interface 122. User interface 122 may include any hardware, software, firmware, and combination thereof that allow a user 105 to interact with a personal device 120, and for a personal device 120 to interact with a user 105. In some embodiments, user interface 122 may include a monitor, screen, touchscreen, liquid crystal display ("LCD") screen, light emitting diode ("LED") screen, speaker, handset, earpiece, keyboard, keypad, touchpad, mouse, trackball, remote control, button set, microphone, video camera, still camera, a charge-coupled device ("CCD") element, a photovoltaic element, and the like.

Referring again to FIG. 1A, in some embodiments, personal device 120 may include a device memory 126. In some embodiments, device memory 126 may include memory, random access memory ("RAM"), read only memory ("ROM"), flash memory, hard drives, disk-based media, disc-based media, magnetic storage, optical storage, volatile memory, nonvolatile memory, and any combination thereof. In some embodiments, device memory 126 may be separated from the device, e.g., available on a different device on a network, or over the air. For example, in a networked system, there may be many personal devices 120 whose device memory 126 is located at a central server that may be a few feet away or located across an ocean.

Referring again to FIG. 1A, in some embodiments, device memory 126 may include one or more of protected data 126A and unprotected data 126B. Not all embodiments include each or both of these, but protected data 126A and unprotected data 126B may be present in one or more embodiments. Protected data 126A may include any data, including data stored on personal device 120, data for which personal device 120 maintains at least partial control of, data for which personal device 120 monitors or provides the ability to monitor, and the like, for which some form of authorization is required to access the data. The authorization may take any form and relate to any sub-unit, including both internally and externally to the device. For example, in an embodiment, protected data 126A may include data which is not available to at least one application running on a computing device. For another example, in an embodiment, protected data 126A may be available to one application at any time, and to another application at specific times, or at times when the first application is not using the data. In an embodiment, protected data 126A includes data for which an application must be authenticated (e.g., a Microsoft operating system certification, or a user flag set to true) in order to access the protected data 126A.

In an embodiment, protected data 126A includes data that a user, e.g., user 105, cannot view until the user 105 verifies their identity, e.g., through a password input or biometric identification. In an embodiment, protected data 126A is limited to the device, and is not transmitted to any other system not under the direct control of the personal device 120. In an embodiment, protected data 126A is limited to the personal device 120, and only applications originating at the personal device 120, or originating with the user 105, are allowed to read protected data 126A. In an embodiment, personal device 120 modifies or directs to be modified protected data 126A, so at least a portion of the protected data 126A is altered or obscured. In an embodiment, personal device 120 allows protected data 126A to be transmitted to an external entity under the condition that the external entity will alter or obscure at least a portion of the protected data 126A.

Referring again to FIG. 1A, in an embodiment, personal device 120 may include device memory 126, which, in some embodiments, may include unprotected data 26B. In an embodiment, unprotected data 126B may have no protections or limitations. In another embodiment, unprotected data 126B may have protections and limitations, but be less protected and/or less limited than protected data 126B. In an embodiment, unprotected data 126B is broadcasted or otherwise transmitted upon request. In an embodiment, unprotected data 126B cannot be accessed by an entity external to personal device 120 due to device design or other factors, but there is no specific protection on unprotected data 126B from access by one or more entities external to personal device 20.

Referring again to FIG. 1A, in an embodiment, personal device 120 may include device interface component 128. In an embodiment, device interface component 128 includes any component that allows the device to interact with its environment. For example, in an embodiment, device interface component 128 includes one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, and the like. In an embodiment, device interface component 128 also may include one or more user interface components, e.g., user interface 122 (e.g., although they are drawn separately, in some embodiments, user interface 122 is a type of device interface component 128), and in some embodiments including one or more user input receiving components and output presenting components.

Referring again to FIG. 1A, in an embodiment, device interface component 128 may include protected component 128A. Protected component 128A may include any device interface component 128, of which some non-limiting examples previously were enumerated, for which some form of authorization and/or authentication is required to access the data. The authorization may take any form and relate to any sub-unit, including both internally and externally to the device. In an embodiment, protected component 128A is similar to protected data 126A. For example, in an embodiment, a personal device 120, e.g., a smart phone, may have twelve applications running on the smartphone. In an embodiment, six of those applications may have access to a protected component 128A, e.g., a positioning sensor, and the other six may not. In some embodiments, data collected by a protected component 128A is part of the protected component 128A. In some embodiments, data collected by a protected component 128A becomes protected data 126A. In some embodiments, data collected by a protected component 128A becomes protected data 126A some of the time, or none of the time. In some embodiments, data collected by a protected component 128A may be part of protected component 128A for a particular amount of time, e.g., two weeks, and then may transition to unprotected data or data that is not considered protected or unprotected. In some embodiments, a protected component 128A may be accessible to everyone at particular times and/or circumstances. For example, a protected component 128A, e.g., a wireless radio, may be accessible to any entity between the hours of 7 and 8 pm, and only accessible to specific entities and/or applications at other times. In some embodiments, a protected component 128A, e.g., an image capturing component, may be accessible to any entity when one or more conditions are met, which conditions may or may not be related to the protected component 128A or the personal device 120, e.g., when the personal device 120 is at a particular location.

Referring again to FIG. 1A, in some embodiments, computing device 30 may include personal device interface module 132. In some embodiments, personal device interface module 132 may communicate with one or more personal devices 120. In some embodiments, personal device interface module 132 may receive data 131 received from a personal device 120. Acquired personal device data 131 may include any data gathered from personal device 120, in any manner. In some embodiments, computing device 30 may request data from personal device 120. In some embodiments, computing device 30 may receive data from personal device 120 on a schedule. In some embodiments, computing device 130 may retrieve data from personal device 120 when certain conditions are met. In some embodiments, personal device 120 is broadcasting data, and computing device 130 gathers the broadcasted data. In some embodiments, personal device 120 broadcasts data that only computing device 130 can use (e.g., decrypt, interpret, or the like). In some embodiments, personal device 120 may transmit acquired personal device data 131 to computing device 30 using one or more communication networks 140, which will be described in more detail herein.

Referring again to FIG. 1A, in some embodiments, the acquired personal device data 131 may be anonymous data 131A. In an embodiment, anonymous data refers to data from which the origin of the data cannot be uniquely identified. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification. It is noted that, in some embodiments, the device may be able to recognize the origin of the data, e.g., an identity of personal device 120, that is transmitting the data due to the nature of the data transmission, but be unable to deduce the origin of the data through the data itself, in which case, in some embodiments, this data is still considered anonymous data 131A.

Anonymous data 131A may include data for which uniquely identifying information has been removed, or data for which uniquely identifying information has been concealed, obscured, made uncertain, made ambiguous, screened, camouflaged, masked, veiled, shrouded, hidden, encoded, encrypted, or otherwise altered. In some embodiments, the received anonymous data 131A never included uniquely identifying information. In some embodiments, anonymous data 131A may partially identify or non-uniquely identify its origin, e.g., the user 105 or the personal device 120 from which the anonymous data came. In some embodiments, uniquely identifying information may be extracted from anonymous data 131A using additional information, e.g., a lookup table, hash, or other known algorithm. In some embodiments, uniquely identifying information may be deduced from anonymous data 131A without additional information. In some embodiments, uniquely identifying information may not be retrieved from anonymous data 131A once the data is in its anonymous format.

In an embodiment, acquired personal device data 131 may include non-anonymous data 131B. In some embodiments, non-anonymous data 131B may identify, either explicitly or implicitly, the origin of the data. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification.

Figure 1B:
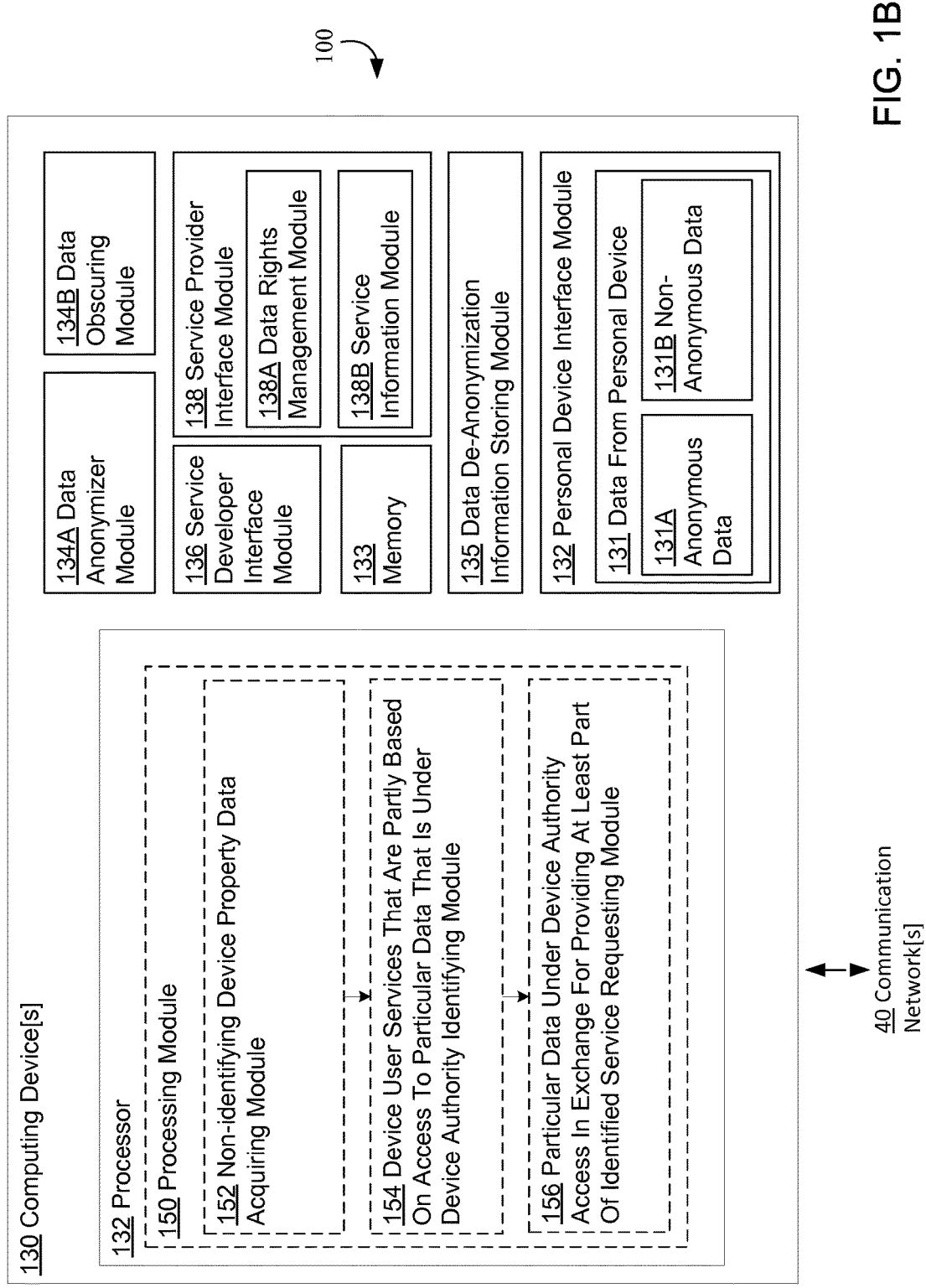
FIG. 1B shows a high-level block diagram of a computing device 130 operating in an exemplary environment 100, according to an embodiment.
Figure 1C:
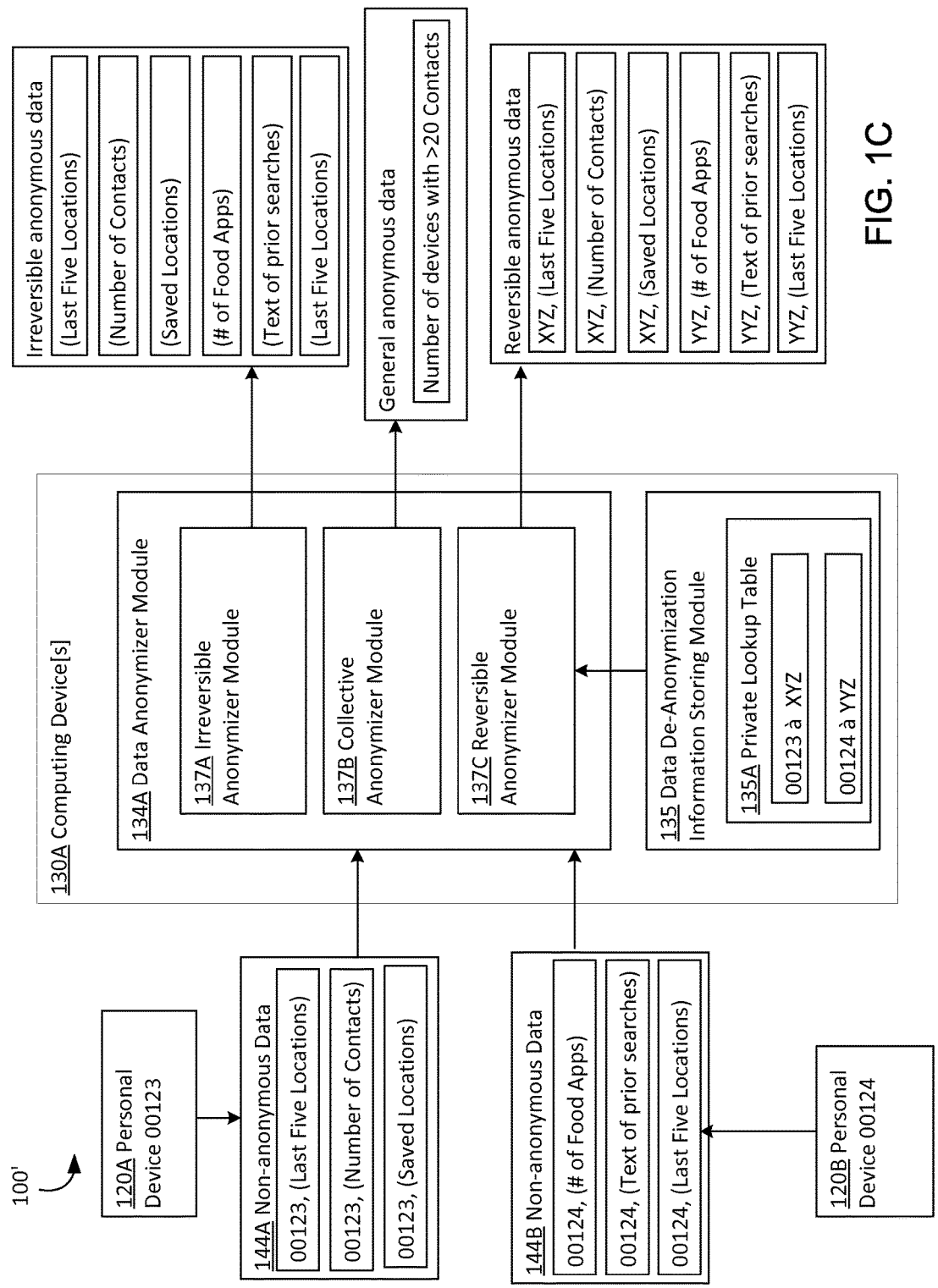
FIG. 1C shows a high level block diagram of a computing device 130A operating in an exemplary embodiment 100', according to an embodiment.
Figure 1D:
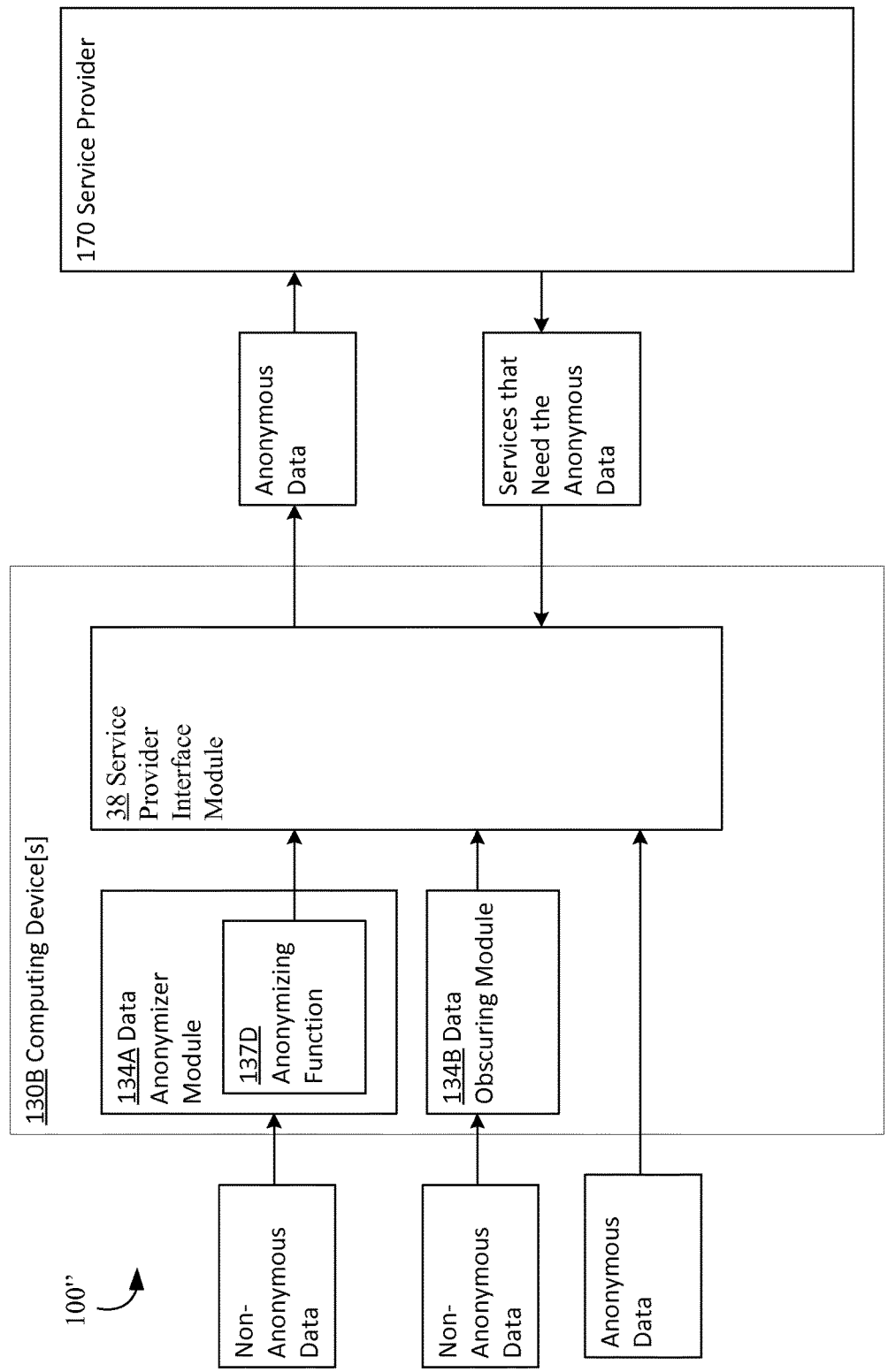
FIG. 1D shows a high-level block diagram of a computing device 130B operating in an exemplary embodiment 100", according to an embodiment.

Referring to FIGS. 1A-1D, in an embodiment, computing device 130 may include a data anonymizer module 134A that converts non-anonymous data 131B into anonymized data, in a process described in more detail with respect to FIGS. 1C and 1D. In an embodiment, depending on the type of anonymization, there may be additional data that can be used to return the anonymized data into non-anonymous data, e.g., a lookup table. In some such embodiments, the additional data, e.g., de-anonymization data, may be stored in data de-anonymization information storing module 135.

Referring again to FIGS. 1A-1D, in an embodiment, computing device 130 may include a data obscuring module 134B. For example, in an embodiment, data obscuring module 134B may obscure the non-anonymous data 131B, similarly to the data anonymizer module 134A. For example, in an embodiment, data obscuring module 134B may apply data masking. In an embodiment, data obscuring module 134B may obscure by addition, e.g., by adding false identification information to the true identification information, so that the false identification information may not be distinguished from the true identification information. Data de-anonymization information storing module 135, data anonymizer module 134A, and data obscuring module 134B may be absent in some embodiments.

Referring again to FIG. 1A, in an embodiment, computing device 130 may include service developer interface module 136. Service developer interface module 136 may communicate with service developer 160, e.g., via communication network 140. Specifically, in an embodiment, service developer interface module 136 may provide limited information regarding the acquired personal device data 131. In an embodiment, for example, service developer interface module 136 may provide information to service developer 160 regarding the type of data collected. In an embodiment, for example, service developer interface module 136 may provide information to service developer 160 regarding an aggregate synopsis of the data collected. In an embodiment, service developer 160 may receive such information and make a decision about what types of services to develop, e.g., using development decision module 162.

Referring again to FIG. 1A, in an embodiment, computing device 130 may include service provider interface module 138. In an embodiment, service provider interface module 138 may communicate with service provider 170, e.g., via communication network 140.

In an embodiment, service provider interface module 138 may include data rights management module 138A. In an embodiment, data rights management module 138A may keep track of which services have rights to which personal device data. For example, in an embodiment, service 172A may have rights to certain anonymous data 131A. For another example, in an embodiment, service 172B may have rights to data that has been processed through the data anonymizer 134A.

Referring again to FIG. 1A, in an embodiment, service provider interface module 138 may include service information module 138B. Service information module 138B may include a list of services that are provided from service provider 170, so that such information may be delivered to personal device 120, in an embodiment. In an embodiment, computing device 130 may present one or more of the services listed in service information module 138B to personal device 120, either upon request, or upon detecting that personal device 120 may be interested in one or more of the services.

Referring again to FIG. 1A, in an embodiment, service provider 170 may provide services to a personal device 120. In an embodiment, these services may be delivered to directly to personal device 120. In an embodiment, service provider 170 has limited or no communication with personal device 120, and communication is handled through an intermediary, e.g., computing device 130. In an embodiment, computing device 130 handles the delivery of services and data between service provider 170 and personal device 120 such that protected data 126A and protected component 128A are protected from service provider 170, but that service provider 170 can still provide services, e.g., service 172A and service 172B, to personal device 120. In an embodiment, service provider 170 includes a list of services management module 174 that maintains a list of services to present to computing device 130, e.g., to allow service information module 138B of computing device 130 to maintain information about various services.

In various embodiments, the communication network 140 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 140 may be wired, wireless, or a combination of wired and wireless networks. It is noted that "communication network" as used herein and in the drawings refers to one or more communication networks, which may or may not interact with each other and which, in some embodiments, may work in concert, wittingly or unwittingly, to facilitate communication between one or more entities.

Referring now to FIG. 1C, an embodiment may include a personal device 120A and a personal device 120B. Personal device 120A may generate non-anonymous data 144A, and personal device 120B may generate non-anonymous data 144B. Non anonymous data 144A and non-anonymous data 144B may be transmitted to computing device 130A, which may be a non-exclusive and non-limiting example of computing device 130. In an embodiment, computing device 130A may include a data anonymizer module 134A. In an embodiment, data anonymizer module 134A may include irreversible anonymizer module 137A, which generates anonymous data that is irreversible, e.g., in an example, the identifying data has been removed. In an embodiment, data anonymizer module 134A may include collective anonymizer module 137B, which may take the non-anonymous data 144A and the non-anonymous data 144B and create an aggregated, general anonymous data, as shown FIG. 1C. In an embodiment, data anonymizer module 134A may include reversible anonymizer module 137C, which may use a private lookup table 135A to convert the non-anonymous data into anonymous data. In an embodiment, that private lookup table 135A may be stored in the data-deanonymization information storing module 135.

Referring now to FIG. 1D, in an embodiment, a computing device 130B may have a data anonymizer 134A that may apply an anonymizing function 132A, as shown in FIG. 1D. For example, an anonymizing function may use a cryptographic method, a perturbation method, a DataFly algorithm, top-down specialization, and/or Mondarian multi-dimensional k-anonymity, as non-limiting and non-exclusive examples. In another embodiment, a data obscuring module 134B obscures the non-anonymous data. In an embodiment, the obscuring may be accomplished by adding similar-looking and plausible "false" data to the actual identifying data, so that later, the true data cannot be determined merely by looking at the data. In an embodiment, the anonymized data may be used by the service provider interface module 38 to give data to the service provider 170, either to carry out a portion of a service, or to determine which services may be useful to one or more personal devices 120.

The examples shown in FIGS. 1C and 1D are merely examples of how a data anonymizer might be implemented, and are not intended to be limiting or exclusive. There are many other techniques for anonymizing the data, some of which will be mentioned herein.

Referring again to FIG. 1B, FIG. 1B shows a more detailed description of computing device 130. In an embodiment, computing device 130 may include a processor 132. Processor 132 may include one or more microprocessors, Central Processing Units ("CPU"), a Graphics Processing Units ("GPU"), Physics Processing Units, Digital Signal Processors, Network Processors, Floating Point Processors, and the like. In some embodiments, processor 132 may be a server. In some embodiments, processor 132 may be a distributed-core processor. Although processor 132 is as a single processor that is part of a single personal device 120, processor 132 may be multiple processors distributed over one or many computing devices 30, which may or may not be configured to operate together. Processor 132 is illustrated as being configured to execute computer readable instructions in order to execute one or more operations described above, and as illustrated in FIGS. 5, 6A-6F, 7A-7I, and 8A-8B. In some embodiments, processor 132 is designed to be configured to operate as processing module 150, which may include one or more of non-identifying device property data acquiring module 152, device user services that are partly based on access to particular data that is under device authority identifying module 154, and particular data under device authority access in exchange for providing at least part of identified service requesting module 156.

In an embodiment, computing device 130 may include a memory 133. In some embodiments, memory 133 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 133 may be located at a single network site. In some embodiments, memory 133 may be located at multiple network sites, including sites that are distant from each other.

Figure 2A:
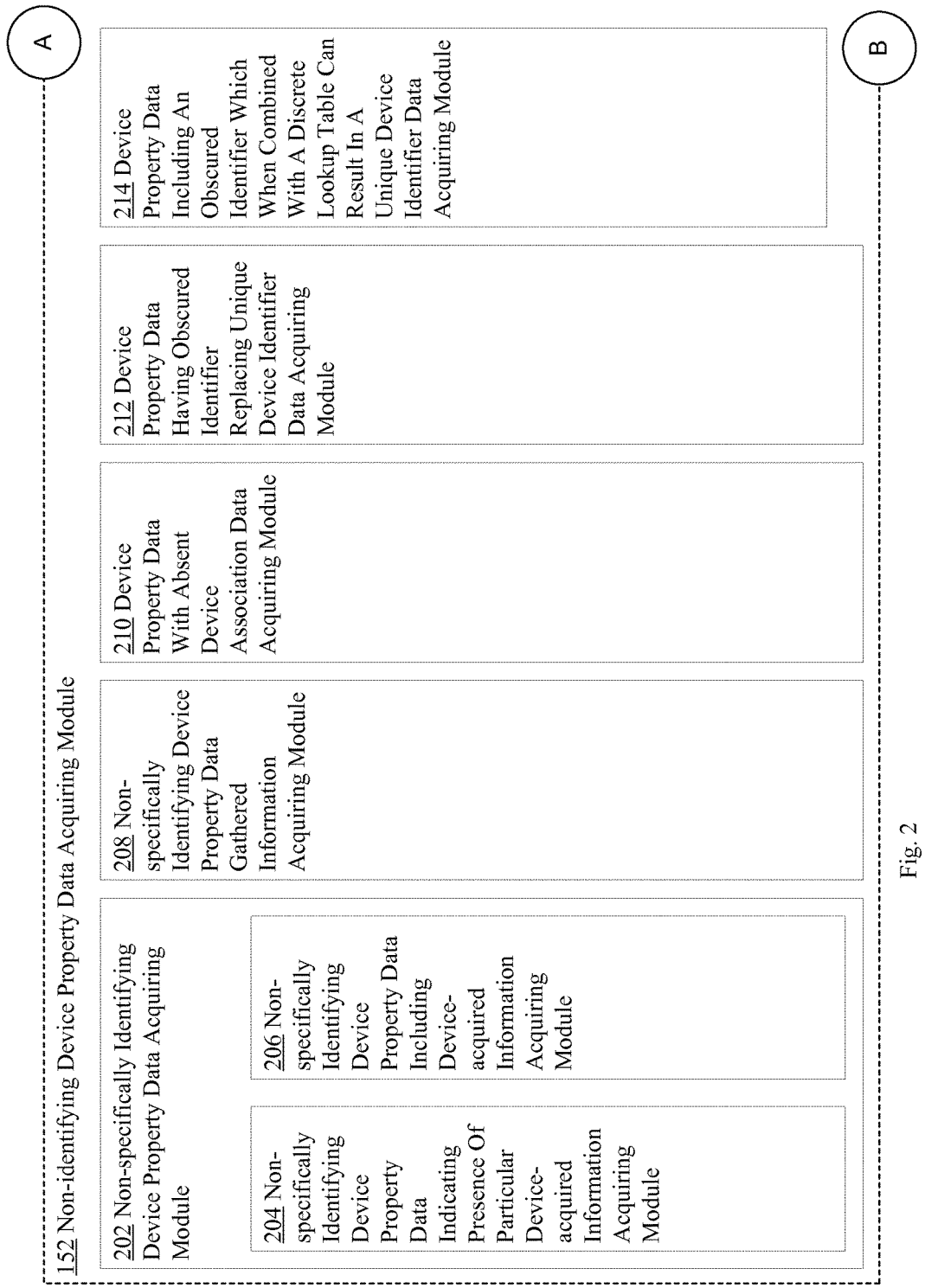

Referring now to FIG. 2A, FIG. 2A illustrates an exemplary implementation of the non-identifying device property data acquiring module 152. As illustrated in FIG. 2A, the non-identifying device property data acquiring module 152 may include one or more sub-logic modules in various alternative implementations and embodiments. For example, as shown in FIG. 2A, in some embodiments, module 152 may include one or more of non-specifically identifying device property data acquiring module 202 (e.g., which, in some embodiments, may include one or more of non-specifically identifying device property data indicating presence of particular device-acquired information acquiring module 204 and non-specifically identifying device property data including device-acquired information acquiring module 206), non-specifically identifying device property data gathered information acquiring module 208, device property data with absent device association data acquiring module 210, device property data having obscured identifier replacing unique device identifier data acquiring module 212, and device property data including an obscured identifier which when combined with a discrete lookup table can result in a unique device identifier data acquiring module 214.

Figures 2, 2B:
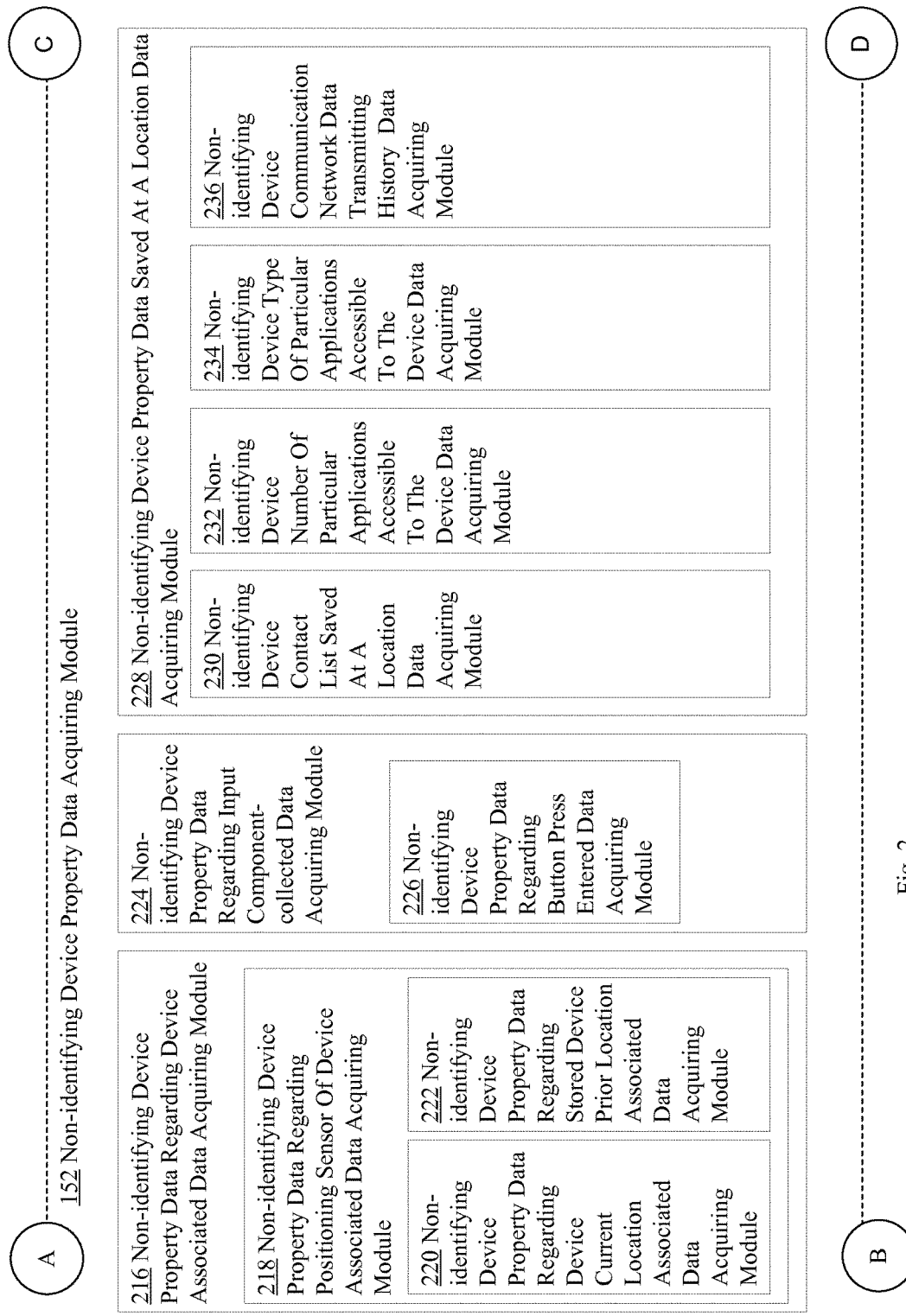

Referring to FIG. 2B, in some embodiments, module 152 may include one or more of non-identifying device property data regarding device associated data acquiring module 216, non-identifying device property data regarding input component-collected data acquiring module 224, and non-identifying device property data saved at a location data acquiring module 228. In some embodiments, module 216 may include non-identifying device property data regarding positioning sensor of device associated data acquiring module 218. In some embodiments, module 218 may include one or more of non-identifying device property data regarding device current location associated data acquiring module 220 and non-identifying device property data regarding stored device prior location associated data acquiring module 222. In some embodiments, module 224 may include non-identifying device property data regarding button press entered data acquiring module 226. In some embodiments, module 228 may include non-identifying device contact list saved at a location data acquiring module 230, non-identifying device number of particular applications accessible to the device data acquiring module 232, non-identifying device type of particular applications accessible to the device data acquiring module 234, and non-identifying device communication network data transmitting history data acquiring module 236.

Referring to FIG. 2C, in some embodiments, module 152 may include one or more of non-specifically identifying device property data acquiring module 238, incompletely identifying device property data acquiring module 240, and device property data with omitted device identifying information acquiring module 242.

Referring to FIG. 2D, in some embodiments, module 152 may include non-identifying device property data including device type data acquiring module 244. In some embodiments, module 244 may include one or more of non-identifying device property data including device type as a smartphone data acquiring module 246, non-identifying device property data including device type as having a radio data acquiring module 248, non-identifying device property data including device manufacturer data acquiring module 250, and non-identifying device property data including device operating system data acquiring module 252.

Referring now to FIG. 3A, FIG. 3A illustrates an exemplary implementation of device user services that are partly based on access to particular data that is under device authority identifying module 154. As illustrated in FIG. 3A, the device user services that are partly based on access to particular data that is under device authority identifying module 154 may include one or more sub-logic modules in various alternative implementations and embodiments. For example, as shown in FIG. 3A, in some embodiments, module 154 may include device user application services that are partly based on access to particular data that is under device authority identifying module 302. In some embodiments, module 302 may include device user object proximity notification application services that are partly based on access to particular data that is under device authority identifying module 304. In some embodiments, module 304 may include one or more of device user shop proximity notification application services that are partly based on access to particular data that is under device authority identifying module 306 and device user one or more friend devices proximity notification application services that are partly based on access to particular data that is under device authority identifying module 310. In some embodiments, module 306 may include device user shop proximity notification application services that are partly based on access to device position data that is under device authority identifying module 308. In some embodiments, module 310 may include device user one or more friend devices proximity notification application services that are partly based on access to device position data and device contact list data that is under device authority identifying module 312. In some embodiments, module 312 may include device user one or more friend devices proximity notification application services that are partly based on access to device position data and device contact list data that is under device authority based on user input identifying module 314.

Referring again to FIG. 3B, in some embodiments, module 154 may include one or more of device user services providing environment-based information and are based on access to particular data that is under device authority identifying module 316, device user services providing prior user action analysis information and are based on access to particular data that is under device authority identifying module 318, device user services providing prior user action analysis information and are based on access to particular data that is under device operating system control identifying module 320, and device user services providing prior user action analysis information and are based on access to particular data that is available to authorized device segment identifying module 322. In some embodiments, module 322 may include one or more of device user services providing prior user action analysis information and are based on access to particular data that is available to a core device application identifying module 324 and device user services providing prior user action analysis information and are based on access to particular data that is available to a device program identifying module 326. In some embodiments, module 326 may include device user services providing prior user action analysis information and are based on access to particular data that is available to a device program by a particular author identifying module 328.

Referring again to FIG. 3C, in some embodiments, module 154 may include one or more of device user services providing prior user action analysis information and are based on access to particular data that is available to a device application having one or more specific properties identifying module 330 and device user services providing prior user action analysis information and are based on access to particular data that is available to a device application for which a user has granted access identifying module 332.

Referring again to FIG. 3D, module 154 may include one or more of device user services providing prior user action analysis information and are based on access to particular data that is available to a device application for which a security determination has been acquired identifying module 334, device user services providing prior user action analysis information and are based on access to particular data that is available to a device application for which a security certification has been obtained identifying module 336, device user services providing prior user action analysis information and are based on access to particular data that is unavailable to a device application for a security determination has not been acquired identifying module 338, device user services providing prior user action analysis information and are based on access to particular data that is prevented from being transmitted to one or more locations identifying module 340, and device user services providing prior user action analysis information and are based on access to particular data that is transmitted only to one or more identified locations identifying module 342.

Referring again to FIG. 3E, in some embodiments, module 154 may include device user services providing prior user action analysis information and are based on access to particular data that is available to a device application for which transmission of the particular data is regulated identifying module 344. In some embodiments, module 344 may include one or more of device user services providing prior user action analysis information and are based on access to particular data that is available to a device application for which transmission of the particular data is approved for one or more determined locations identifying module 346 and device user services providing prior user action analysis information and are based on access to particular data that is available to a device application for which transmission of the particular data is approved for one or more locations for which particular data access is granted identifying module 348. In some embodiments, module 348 may include one or more of device user services providing prior user action analysis information and are based on access to particular data that is available to a device application for which transmission of the particular data is approved for one or more locations for which particular data access is user-granted identifying module 350 and device user services providing prior user action analysis information and are based on access to particular data that is available to a device application for which transmission of the particular data is approved for one or more locations for which particular data access is granted by a device application identifying module 352.

Referring again to FIG. 3F, in some embodiments, module 154 may include one or more of device user services that are based on usage data and that are partly based on access to particular data that has an access attribute managed by the device identifying module 354 (e.g., which in some embodiments, may include device user services that are based on temperature usage data and that are partly based on device position data managed by the device identifying module 356), device user services that are based on usage data and that are partly based on access to particular data that is controlled by the device identifying module 358, device user services that are partly based on access to remotely-stored particular data that is managed by the device identifying module 360, device user services that are partly based on access to cloud stored particular data that is managed by the device identifying module 362, and device user services that are partly based on access to particular sensor collected data that is managed by the device identifying module 364.

Referring now to FIG. 4A, FIG. 4A illustrates an exemplary implementation of the particular data under device authority access in exchange for providing at least part of identified service requesting module 156. As illustrated in FIG. 4A, the particular data under device authority access in exchange for providing at least part of identified service requesting module 156 may include one or more sub-logic modules in various alternative implementations and embodiments. For example, as shown in FIG. 4A, in some embodiments, module 156 may include one or more of particular data under device authority receipt in exchange for providing at least part of identified service requesting module 402, unlock data configured to convert previously received data into particular data in exchange for providing at least part of identified service requesting module 404, and speedometer data controlled by device receipt in exchange for providing at least part of identified service requesting module 410. In some embodiments, module 404 may include reverse lookup table configured to convert previously received data into particular data in exchange for providing at least part of identified service requesting module 406. In some embodiments, module 406 may include reverse lookup table configured to convert previously received anonymized data into deanonymized particular data that identifies the device in exchange for providing at least part of identified service requesting module 408. In some embodiments, module 410 may include speedometer data controlled by motor vehicle control system receipt in exchange for providing at least part of identified service requesting module 412. In some embodiments, module 412 may include speedometer data controlled by motor vehicle control system receipt in exchange for providing at least part of gasoline consumption routing service requesting module 414.

Referring again to FIG. 4B, in some embodiments, module 156 may include one or more of particular service presentation at device facilitation module 416 and indication that providing of particular service is contingent on particular data access grant facilitation module 418. In some embodiments, module 416 may include one or more of particular service presentation at device at particular time facilitation module 420 (e.g., which, in some embodiments, may include alternative food service presentation at device at late-day time facilitation module 422), particular time at which demand for particular service is increased relative to other time calculating module 424, particular service presentation at calculated particular time of increased demand facilitation module 426, notification of particular time at which demand for particular service is increased relative to other time receiving module 428, particular service presentation at received particular time of increased demand facilitation module 430, one or more conditions at which demand for particular service is increased relative to other time determining module 432 (e.g., which, in some embodiments, may include temperatures above eighty degrees at which demand for vending machine locations is increased determining module 436), and particular service presentation at particular time when one or more of determined conditions are detected as present facilitation module 434.

Referring again to FIG. 4C, in some embodiments, module 156 may include one or more of particular data subject to device authority requesting module 438, particular data subject to device authority receiving module 440, and at least portion of one or more identified services providing module 442.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 5:
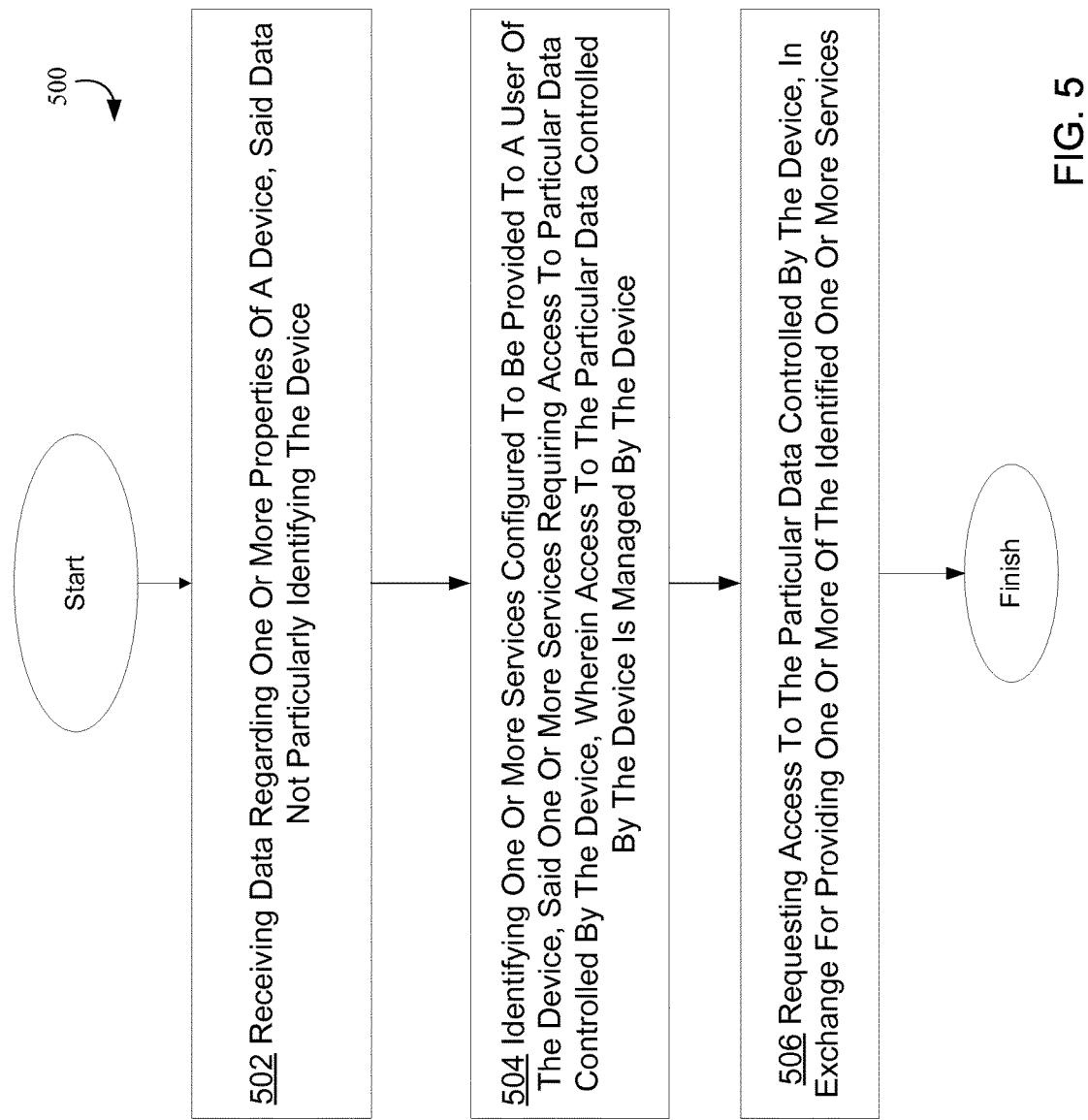
FIG. 5 is a high-level logic flowchart of a process, e.g., operational flow 500, according to an embodiment.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5 as well as the other operations to be described herein may be performed by at least one of a machine, an article of manufacture, or a composition of matter.

Referring again to FIG. 5, FIG. 5 shows operation 500, which may include operation 502 depicting receiving data regarding one or more properties of a device, said data not particularly identifying the device. For example, FIG. 1B, shows non-identifying device property data acquiring module 152 receiving data regarding (e.g., data about any aspect, whether temporary or permanent, or whether related to the environment) one or more properties (e.g., any information, regardless of context dependency, triviality, or other factor) of a device (e.g., a piece of equipment and/or a person or entity that may use that equipment, e.g., in an embodiment, a user's laptop computer device), said data not particularly identifying (e.g., silent about identifying, or identifying in any manner that is not a one-to-one identification, e.g., identifying in any manner that allows for ambiguity about which device is being referenced, e.g., "the device in Seattle, Wash." is not particularly identifying, even if there is only one device in Seattle, Wash. at a given time, although in an embodiment, the identification does not need to be permanent, e.g., an IP address, even if it is not persistent, may be particularly identifying the device under some conditions, although not all (e.g., a router may show a single IP address to the wide area network for multiple devices on the local network) the device (e.g., the user's laptop device).

Referring again to FIG. 5, operation 500 may include operation 504 depicting identifying one or more services configured to be provided to a user of the device, said one or more services requiring access to particular data controlled by the device, wherein access to the particular data controlled by the device is managed by the device. For example, FIG. 1B, shows device user services that are partly based on access to particular data that is under device authority identifying module 154 identifying (e.g., finding, selecting, choosing, receiving, acquiring, retrieving, picking up, creating, generating, intercepting, reading, hearing, detecting, picking, weighting, and the like) one or more services (e.g., a "where are your friends" service that shows a user of a device where the user's friends, e.g., the people listed in the user's contact list, are located) configured to be provided (e.g., configured to be made available to, regardless of actual use) to a user of the device (e.g., the user's laptop computer), said one or more services (e.g., the "where are your friends" service that shows a user of a device where the user's friends, e.g., the people listed in the user's contact list, are located) requiring access to particular data (e.g., the user's contact list) controlled (e.g., under the management of, e.g., the device selects which entities (e.g., programs, users, outside requestors), have access to read, write, or otherwise modify the particular data, whether such control is direct or indirect, specific or general, and unrelated to a location of the data (e.g., the data may be stored remotely to the device) by the device (e.g., the user's laptop computer device), wherein access (e.g., the giving of one or more authentication tools, e.g., passwords, privileges, logins, addresses, and the like, or permission, authorization, authentication, and the like) to the particular data (e.g., the user's contact list) controlled by the device (e.g., the user's laptop computer device) is managed (e.g., under the control of, whether direct or indirect) the device (e.g., the user's laptop computer device).

Referring again to FIG. 5, operation 500 may include operation 506 depicting requesting access to the particular data controlled by the device, in exchange for providing one or more of the identified one or more services. For example. FIG. 1B, shows device user services that are partly based on access to particular data that is under device authority identifying module 156 requesting access (e.g., the giving of one or more authentication tools, e.g., passwords, privileges, logins, addresses, and the like, or permission, authorization, authentication, and the like to one or more of reading, writing, modifying, altering, deleting, encrypting, transmitting, receiving, or performing any of one or more actions or operations upon) to the particular data (e.g., the user's contact list data) controlled (e.g., under the management of, e.g., the device selects which entities (e.g., programs, users, outside requestors) by the device (e.g., the user's laptop computer device), in exchange (e.g., in bargain for, in deal for, in trade for, in consideration of, as a quid pro quo, and the like) for providing (e.g., taking one or more actions that, whether directly or indirectly, are intended to assist in the completion, execution, or carrying out of at least a portion of, regardless of whether such actions constitute the whole of the service or only a part of) for providing one or more of the identified one or more services (e.g., the "where are the user of the device's friends" service that shows a user of a device where the user's friends, e.g., the people listed in the user's contact list, are located).

FIGS. 6A-6D depict various implementations of operation 502, according to embodiments. Referring now to FIG.

6A, operation 502 may include operation 602 depicting receiving data regarding one or more pieces of information collected by a device, said data not particularly identifying the device. For example, FIG. 2A, shows non-specifically identifying device property data acquiring module 202 receiving data regarding one or more pieces of information (e.g., data indicating that a device, e.g., a smartphone, has collected, e.g., through a position sensor, e.g., a global positioning system sensor, more than twenty-five different position data sets in the last seventy-two hours) collected by a device (e.g., a smartphone, e.g., an Apple iPhone with a GPS sensor active), said data not particularly identifying the device (e.g., the data does not identify the device, but merely indicates that there is a device that has collected more than twenty-five different position data sets in the last seventy-two hours).

Referring again to FIG. 6A, operation 602 may include operation 604 depicting receiving data regarding an existence of one or more pieces of information collected by a device, said data not particularly identifying the device. For example, FIG. 2A, shows non-specifically identifying device property data indicating presence of particular device-acquired information acquiring module 204 receiving data regarding an existence (e.g., a data flag is sent when the existence of the data is detected) of one or more pieces of information (e.g., five hundred pictures) collected by a device (e.g., an internet-enabled digital SLR camera), said data not particularly identifying the device (e.g., the data flag indicates that a camera has acquired five hundred pictures, but not which camera, e.g., in an embodiment, the data flag may be combined with many other data flags to determine how many cameras, in a set of cameras, have stored more than five hundred pictures).

Referring again to FIG. 6A, operation 602 may include operation 606 depicting receiving data comprising one or more pieces of information collected by a device, said data not particularly identifying the device. For example, FIG. 2A, shows non-specifically identifying device property data including device-acquired information acquiring module 206 receiving data comprising one or more pieces of information (e.g., names of contacts) collected by a device (e.g., a laptop computer), said data not particularly identifying the device (e.g., the names of the contacts are present in the received data, but not the identity of the user who was using the laptop for which the contacts are associated).

Referring again to FIG. 6A, operation 502 may include operation 608 depicting receiving data regarding information collected by a device, said data not identifying the device that collected the information. For example, FIG. 2A, shows non-specifically identifying device property data gathered information acquiring module 208 receiving data regarding information (e.g., temperature information collected by a thermometer) collected by a device (e.g., a home weather station), said data not identifying the device (e.g., the temperature information does not identify its geography with enough specificity to pinpoint the dwelling from which it came.

Referring again to FIG. 6A, operation 502 may include operation 610 depicting receiving data regarding information collected by a device having a device identifier, said data omitting the device identifier. For example, FIG. 2A, shows device property data with absent device association data acquiring module 210 receiving data regarding information (e.g., a number of songs in an mp3 collection) collected by a device (e.g., a portable music player, e.g., a Microsoft Zune) having a device identifier (e.g., a specific ID that identifies the device to an overarching network, e.g., the Microsoft Zune Marketplace), said data omitting the device identifier (e.g., the specific ID).

Referring again to FIG. 6A, operation 502 may include operation 612 depicting receiving data regarding information collected by a device having a device identifier that is unique to the device, said received data including a modified identifier, wherein the device identifier cannot be independently derived from the modified identifier. For example, FIG. 2A, shows device property data having obscured identifier replacing unique device identifier data acquiring module 212 receiving data regarding information (e.g., collected by a device (e.g., a portable music player, e.g., an Apple iPod) having a device identifier that is unique to the device (e.g., a device ID assigned by Apple the first time the device connects to a network), said received data including a modified identifier (e.g., a string of characters that is different from the device ID), wherein the device identifier cannot be independently derived from the modified identifier (e.g., an entity, having only the device identifier, cannot perform an algorithm or other mutation of the data to arrive at the device ID, without knowing more information that is not available to the entity).

Referring again to FIG. 6A, operation 502 may include operation 614 depicting receiving data regarding information collected by a device having a device identifier, said data providing a modified device identifier that is unique to the device, and from which the device identifier can be derived only using a lookup table that is not received with the received data. For example, FIG. 2A, shows device property data including an obscured identifier which when combined with a discrete lookup table can result in a unique device identifier data acquiring module 214 receiving data regarding information (e.g., a name of one or more applications installed on the device) collected by a device (e.g., the device, e.g., a tablet device, e.g., an ASUS tablet, keeps track of the applications that are installed on the device) having a device identifier (e.g., the tablet device has a MAC address that acts as an identifier), said data providing a modified device identifier (e.g., the MAC address is replaced with a different identifier that is still unique, e.g., if the MAC address is A5:B0:FF:53:2B:12, then the modified device identifier might be, for example, 76:0F:FF:42:CA:77) that is unique to the device, and from which the device identifier can be derived only using a private lookup table (e.g., there is a table, stored at a location, that shows that modified identifier 76:0F:FF:42:CA:77 corresponds to actual MAC address A5:B0:FF:53:2B:12, but the relationship was generated randomly, not procedurally, so without the private lookup table, there is no way to reliably reconstruct the actual MAC address from the modified identifier) that is not received with the received data (e.g., the received data includes the modified device identifier, but does not include the lookup table, which is necessary to obtain the MAC address from the modified identifier).

Figure 6B:
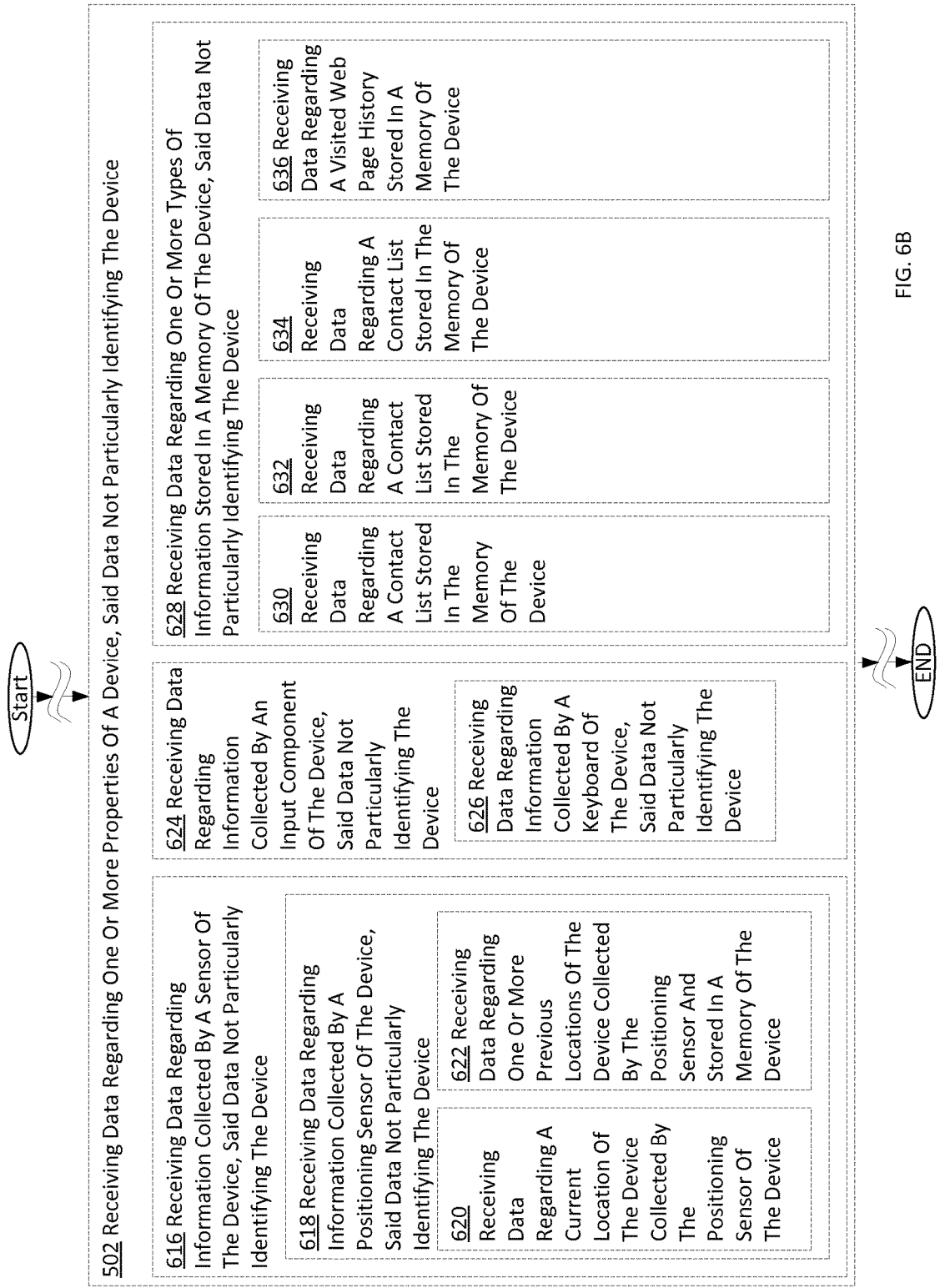
FIG. 6B is a high-level logic flow chart of a process depicting alternate implementations of a data receiving operation 502, according to one or more embodiments.

Referring now to FIG. 6B, operation 502 may include operation 616 depicting receiving data regarding information collected by a sensor of the device, said data not particularly identifying the device. For example, FIG. 2B, shows non-identifying device property data regarding device associated data acquiring module 216. It is noted that "associate" in the context of this claim means anything that a device uses to associate with its environment, e.g., anything exterior to the device. Thus, associate may include a keyboard, touchscreen, scroll wheel, soft or hard keys, microphone, speaker, wireless radio, accelerometer, temperature sensor, and the like. In an example, FIG. 2B shows module 216 receiving data regarding information (e.g., wireless network names) collected by a sensor of the device (e.g., a wireless radio of a cellular device, e.g., a Nokia Lumia 920), said data not particularly identifying the device (e.g., the data may include a location of the device, but no details about the identity of the device itself).

Referring again to FIG. 6B, operation 616 may include operation 618 depicting receiving data regarding information collected by a positioning sensor of the device, said data not particularly identifying the device. For example, FIG. 2B, shows non-identifying device property data regarding positioning sensor of device associated data acquiring module 218 receiving data regarding information collected by a positioning sensor of the device (e.g., a GPS sensor of an in-vehicle management system), said data not particularly identifying the device (e.g., it identifies the make and model of the car, but not specific identifying information, such as license plate, owner, or Vehicle Identification Number ("VIN")).

Referring again to FIG. 6B, operation 618 may include operation 620 depicting receiving data regarding a current location of the device collected by the positioning sensor of the device. For example, FIG. 2B, shows non-identifying device property data regarding device current location associated data acquiring module 220 receiving data regarding a current location (e.g., a present position detected by the sensor) of the device (e.g., a tablet device with GPS functionality, e.g., an iPad) collected by the positioning sensor of the device (e.g., the iPad).

Referring again to FIG. 6B, operation 618 may include operation 622 depicting receiving data regarding one or more previous locations of the device collected by the positioning sensor and stored in a memory of the device. For example, FIG. 2B, shows non-identifying device property data regarding stored device prior location associated data acquiring module 222 receiving data regarding one or more previous locations (e.g., data indicating that the device has been to three different banks in the last twenty-four hours) of the device (e.g., a personal video recorder with GPS functionality) collected by the positioning sensor (e.g., a GPS sensor) and stored in a memory of the device (e.g., the device has a memory of the locations that it has been).

Referring again to FIG. 6B, operation 502 may include operation 624 depicting receiving data regarding information collected by an input component of the device, said data not particularly identifying the device. For example, FIG. 2B, shows non-identifying device property data regarding input component-collected data acquiring module 224 receiving data regarding information (e.g., a list of the initials of each contact in the device's contact list) collected by an input component (e.g., keyboard or speaker) of the device (e.g., a smartphone, e.g., a Samsung Galaxy Nexus), said data not particularly identifying the device (e.g., the data does not include any information specific enough to associate the contact list with a single device, but might contain more broad information that could narrow it down to a set of devices). It is noted that, in some embodiments, the received data may include information, and non-particular device identification, and that, through the non-particular device identification, and the included information, the identity of the device may be determined.

Referring again to FIG. 6B, operation 624 may include operation 626 depicting receiving data regarding information collected by a keyboard of the device, said data not particularly identifying the device. For example, FIG. 2B, shows non-identifying device property data regarding button press entered data acquiring module 226 receiving data regarding information (e.g., how many times the name "Rocket Bar" was used in text messages) collected by a keyboard of the device (e.g., a smartphone with a physical keyboard, e.g., a Blackberry 8800), said data not particularly identifying the device (e.g., the data only identifies what type of device and what communication network the device is operating on).

Referring again to FIG. 6B, operation 502 may include operation 628 depicting receiving data regarding one or more types of information stored in a memory of the device, said data not particularly identifying the device. For example, FIG. 2B, shows non-identifying device property data saved at a location data acquiring module 228 receiving data regarding one or more types of information (e.g., whether there is contact information with phone numbers, or contact information only with emails, or no contact information at all) stored in a memory of the device (e.g., a PDA for tracking personal contacts), said data not particularly identifying the device (e.g., the device is identified through its IP address, but a user of the device is omitted or obscured).

Referring again to FIG. 6B, operation 628 may include operation 630 depicting receiving data regarding a contact list stored in the memory of the device. For example, FIG. 2, e.g., FIG. 2B, shows non-identifying device contact list saved at a location data acquiring module 230 receiving data (e.g., a number of contacts in a particular city, or a number of contacts under a particular age) regarding a contact list stored in the memory of the device (e.g., a smartphone, e.g., a Nokia Lumia).

Referring again to FIG. 6B, operation 628 may include operation 632 depicting receiving data regarding a number of program applications stored in a memory of the device. For example, FIG. 2B, shows non-identifying device number of particular applications accessible to the device data acquiring module 232 receiving data regarding a number of program applications (e.g., twenty-five different applications) stored in a memory of the device (e.g., an e-reader, e.g., an Amazon Kindle).

Referring again to FIG. 6B, operation 628 may include operation 634 depicting receiving data regarding a type of program applications stored in a memory of the device. For example, FIG. 2B, shows non-identifying device type of particular applications accessible to the device data acquiring module 234 receiving data regarding a type of program applications (e.g., data indicating that there are seven different games, or six different money management programs) stored in a memory (e.g., a removable SD card) of the device (e.g., a tablet device, e.g., an ASUS Transformer).

Referring again to FIG. 6B, operation 628 may include operation 636 depicting receiving data regarding a visited web page history stored in a memory of the device. For example, FIG. 2B, shows non-identifying device communication network data transmitting history data acquiring module 236 receiving data regarding a visited web page history stored in a memory of the device (e.g. a personal computer).

Figure 6C:
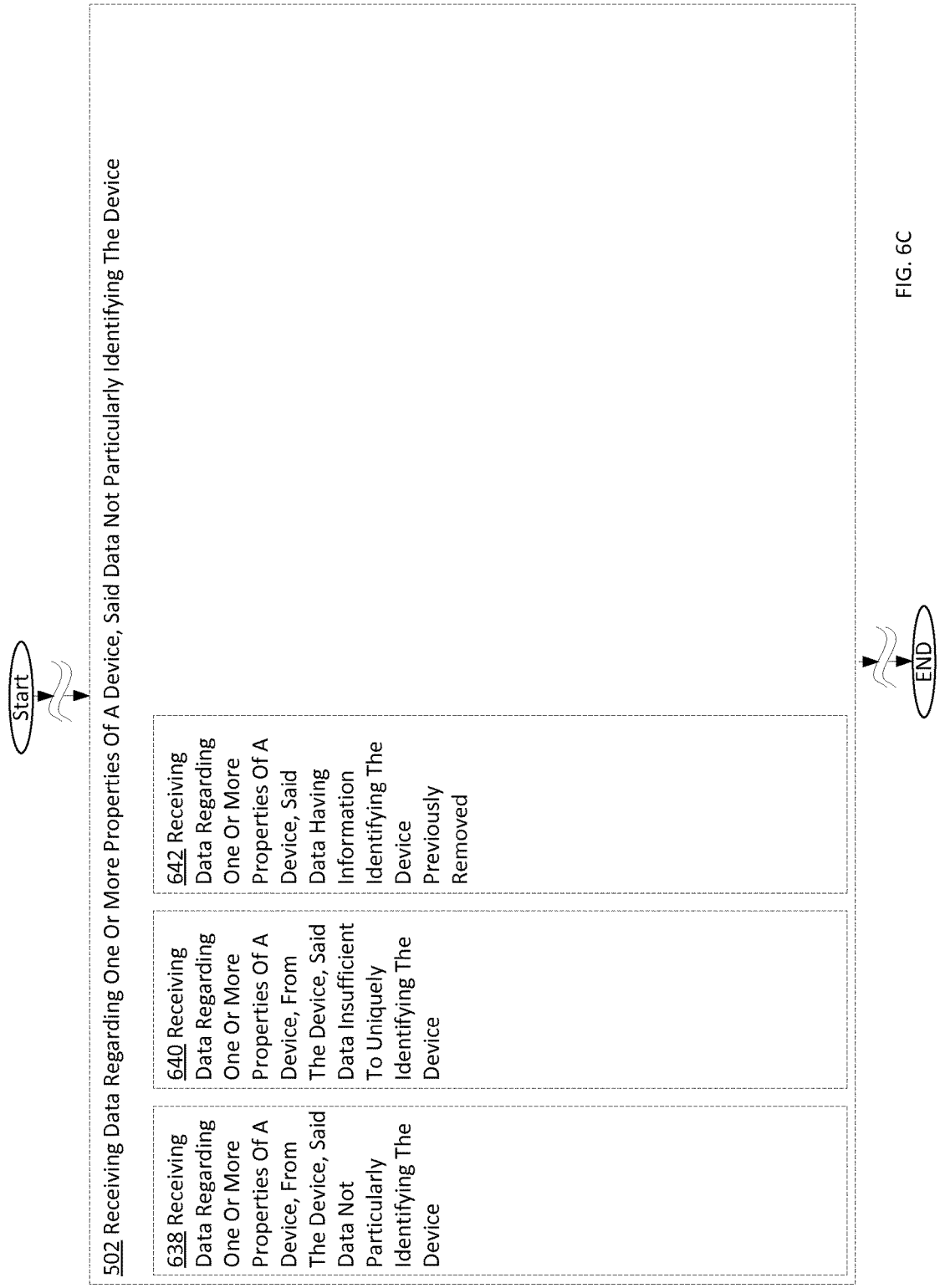
FIG. 6C is a high-level logic flow chart of a process depicting alternate implementations of a data receiving operation 502, according to one or more embodiments.

Referring now to FIG. 6C, operation 502 may include operation 638 depicting receiving data regarding one or more properties of the device, from the device, said data not particularly identifying the device. For example, FIG. 2C, shows non-specifically identifying device property data acquiring module 238 receiving data regarding one or more properties (e.g., available memory, or which different sensors are present, or how often various sensors are used) of a device (e.g., a smartphone, e.g., an Apple iPhone), from the device, said data not particularly identifying the device (e.g., the user ID and device ID have been stripped away from the data prior to receipt).

Referring again to FIG. 6C, operation 502 may include operation 640 depicting receiving data regarding one or more properties of the device, from the device, said data insufficient to uniquely identify the device. For example, FIG. 2C, shows incompletely identifying device property data acquiring module 240 receiving data regarding one or more properties (e.g., a type of wireless radio, or information about maximum device data throughput) of a device (e.g., a tablet device, e.g., a Nook), said data insufficient to uniquely identify the device (e.g., the data might give a general location, or the data might specify that "this device is a Nook," or the data might specify, "this is a Nook that was purchased by one of the following one hundred people," but does not uniquely identify the device).

Referring again to FIG. 6C, operation 502 may include operation 642 depicting receiving data regarding one or more properties of the device, said data having information identifying the device previously removed. For example, FIG. 2C, shows device property data with omitted device identifying information acquiring module 242 receiving data regarding one or more properties (e.g., how often the device travels between five and ten miles per hour) of a device (e.g., a running assistant watch), said data having information identifying the device (e.g., the serial number provided at registration) previously removed (e.g., removed before receipt of the data).

Figure 6D:
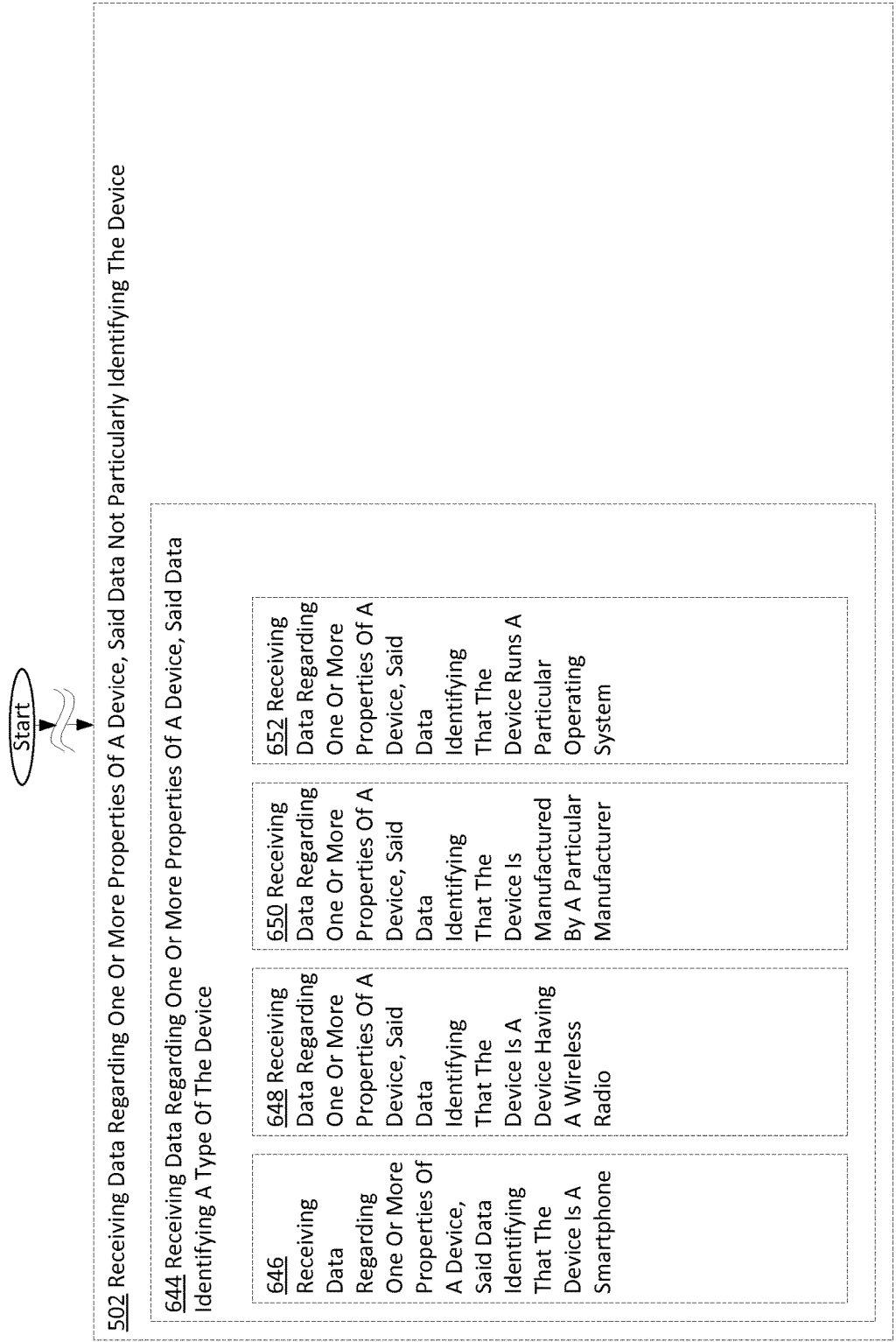
FIG. 6D is a high-level logic flow chart of a process depicting alternate implementations of a data receiving operation 502, according to one or more embodiments.

Referring now to FIG. 6D, operation 502 may include operation 644 depicting receiving data regarding one or more properties of the device, said data identifying a type of the device. For example, FIG. 2D, shows non-identifying device property data including device type data acquiring module 244 receiving data regarding one or more properties (e.g., how many minutes per day the phone of a device is used) of a device (e.g., a smartphone), said data identifying a type of the device (e.g., "this device is a smartphone," or "this device is an Apple Smartphone," or "this device is an Apple iPhone 5," or "this is a smartphone running iOS").

Referring again to FIG. 6D, operation 644 may include operation 646 depicting receiving data regarding one or more properties of the device, said data identifying that the device is a smartphone. For example, FIG. 2D, shows non-identifying device property data including device type as a smartphone data acquiring module 246 receiving data regarding one or more properties (e.g., a number of movies watched on the device in the last sixty days) of a device (e.g., a Samsung Galaxy), said data identifying that the device is a smartphone (e.g., the data classifies all devices as one of ten types, one type of which is "smartphone").

Referring again to FIG. 6D, operation 644 may include operation 648 depicting receiving data regarding one or more properties of the device, said data identifying that the device is a device having a wireless radio. For example, FIG. 2D, shows non-identifying device property data including device type as having a radio data acquiring module 248 receiving data regarding one or more properties (e.g., the device has a microphone having a sensitivity above a particular level) of a device (e.g., a personal digital recorder), said data identifying that the device is a device having a wireless radio (e.g., a flag indicating that the data was recorded on a device that has a wireless radio, e.g., could have transmitted wirelessly, or is transmitting wirelessly).

Referring again to FIG. 6D, operation 644 may include operation 650 depicting receiving data regarding one or more properties of the device, said data identifying that the device is manufactured by a particular manufacturer. For example, FIG. 2D, shows non-identifying device property data including device manufacturer data acquiring module 250 receiving data regarding one or more properties (e.g., a heuristic analysis of the data stored on the device) of a device (e.g., a desktop computer), said data identifying that the device is manufactured by a particular manufacturer (e.g., a computer manufacturer, e.g., Dell Computers).

Referring again to FIG. 6D, operation 644 may include operation 652 depicting receiving data regarding one or more properties of the device, said data identifying that the device runs a particular operating system. For example, FIG. 2D, shows non-identifying device property data including device operating system data acquiring module 252 receiving data regarding one or more properties (e.g., a screen resolution) of a device (e.g., a smartphone, e.g., a Galaxy Nexus phone), said data identifying that the device runs a particular operating system (e.g., Google's Android operating system).

Figure 7A:
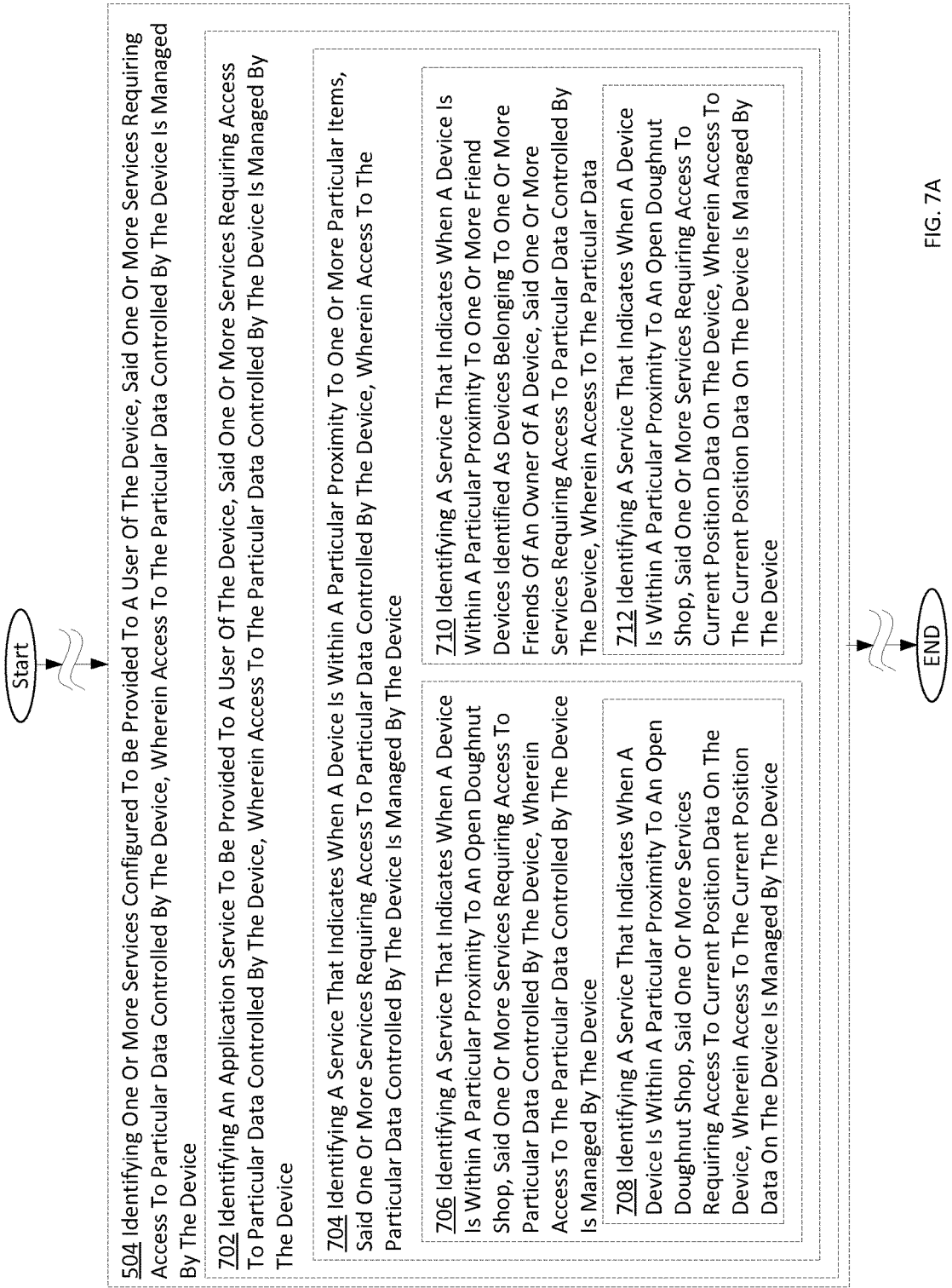
FIG. 7A is a high-level logic flow chart of a process depicting alternate implementations of a service identifying operation 504, according to one or more embodiments.

FIGS. 7A-7G depict various implementations of operation 504, depicting identifying one or more services configured to be provided to a user of the device, said one or more services requiring access to particular data controlled by the device, wherein access to the particular data controlled by the device is managed by the device, according to embodiments. Referring now to FIG. 7A, operation 504 may include operation 702 depicting identifying an application service to be provided to a user of the device, said one or more services requiring access to particular data controlled by the device, wherein access to the particular data controlled by the device is managed by the device. For example, FIG. 3A, shows device user application services that are based on access to particular data that is under device authority identifying module 302 identifying an application service (e.g., an application that tracks a number of calories the user eats) to be provided to a user of the device (e.g., a smartphone carried by the user), said one or more services requiring access to particular data (e.g., a food log stored on the device that the user inputs and pairs to her location) controlled by the device (e.g., the device has rights to change, modify, store, or otherwise access the data), wherein access to the particular data controlled by the device is managed by the device (e.g., the smartphone is the gatekeeper for the data, so that other applications on the smartphone and/or other users and external entities cannot retrieve the data).

Referring again to FIG. 7A, operation 702 may include operation 704 depicting identifying a service that indicates when a device is within a particular proximity to one or more particular items, said one or more services requiring access to particular data controlled by the device, wherein access to the particular data controlled by the device is managed by the device. For example, FIG. 3, e.g., FIG. 3A, shows device user object proximity notification application services that are based on access to particular data that is under device authority identifying module 304 identifying a service that indicates when a device (e.g., a user's tablet device) is within a particular proximity (e.g., when a device is within 500 feet) to one or more particular items (e.g., a particular brand of automated teller machine device ("ATM")), said one or more services requiring access to particular data (e.g., location information regarding the device, which may be pulled directly from the sensor or stored in memory) controlled by the device (e.g., the device determines which applications get access to the positioning sensor), wherein access to the particular data (e.g., the data gathered by the positioning sensor) controlled by the device is managed by the device (e.g., in order to access the positioning sensor, an entity must be granted access by the device).

Referring again to FIG. 7A, operation 704 may include operation 706 depicting identifying a service that indicates when a device is within a particular proximity to an open doughnut shop, said one or more services requiring access to particular data controlled by the device, wherein access to the particular data controlled by the device is managed by the device. For example, FIG. 3A, shows device user shop proximity notification application services that are based on access to particular data that is under device authority identifying module 306 identifying a service that indicates when a device (e.g., a smartphone device, e.g., a Nokia Lumia 820) is within a particular proximity to an open doughnut shop (e.g., a Krispy Kreme donut shop), said one or more services requiring access to particular data controlled by the device (e.g., position data that is triangulated on the device through one or more radios, e.g., wireless radio and/or cellular radio), wherein access to the particular data (e.g., the triangulated position data) controlled by the device is managed by the device (e.g., the triangulated position data cannot be accessed without flagging the user to ask for her permission, each time the data is accessed).

Referring again to FIG. 7A, operation 706 may include operation 708 depicting identifying a service that indicates when a device is within a particular proximity to an open doughnut shop, said one or more services requiring access to current position data on the device, wherein access to the current position data on the device is managed by the device. For example, FIG. 3A, shows device user shop proximity notification application services that are based on access to device position data that is under device authority identifying module 308 identifying a service that indicates when a device (e.g., an augmented reality smart-glasses device that is worn by a user when walking around outside) is within a particular proximity to an open doughnut shop, said one or more services requiring access to current position data on the device, wherein access to the current position data on the device is managed by the device (e.g., the device logs each entity that requests the position data, and requests and saves that entity's credentials).

Figure 7B:
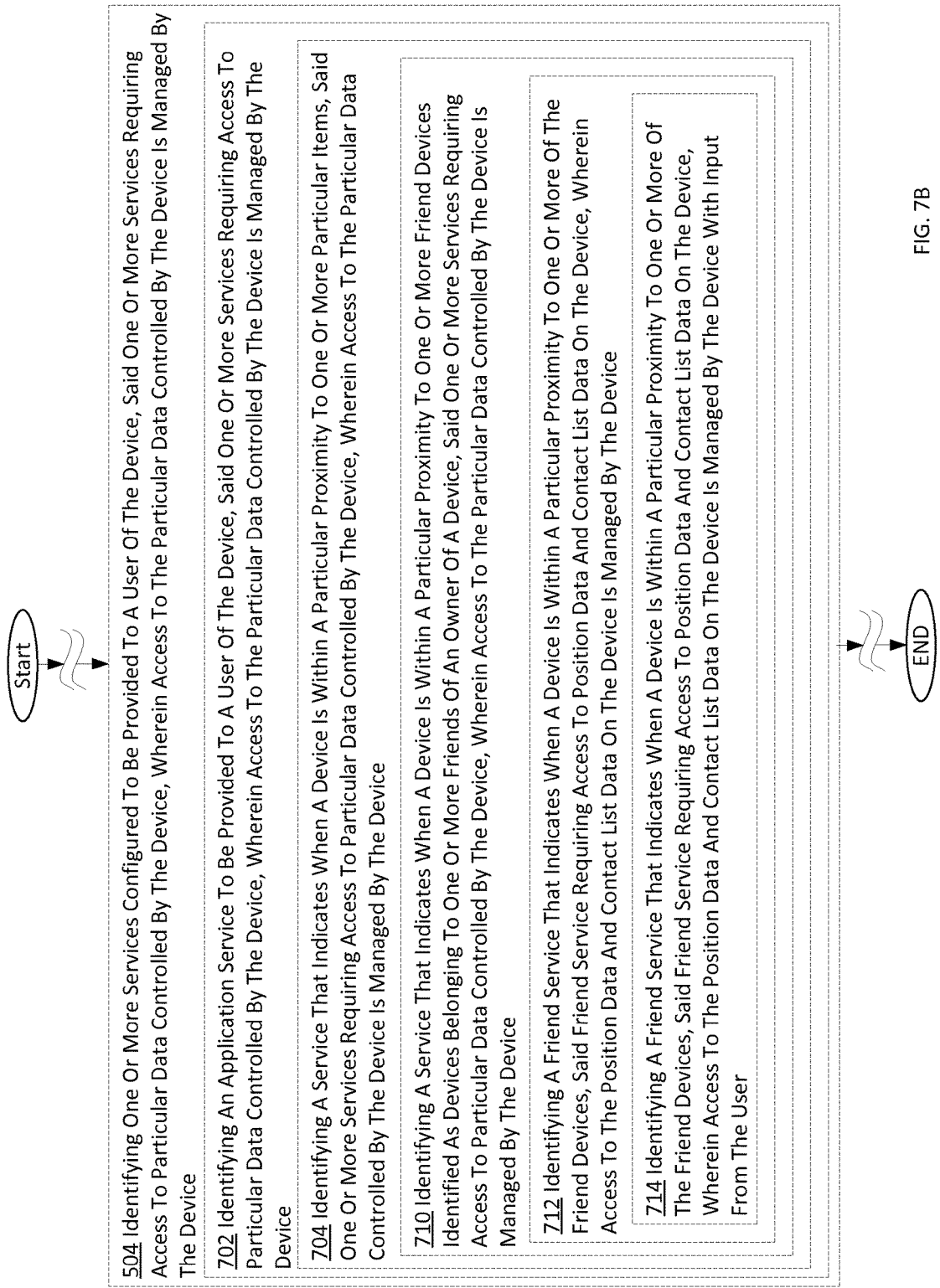
FIG. 7B is a high-level logic flow chart of a process depicting alternate implementations of a service identifying operation 504, according to one or more embodiments.

Referring now to FIG. 7B, operation 704 may include operation 710 depicting identifying a service that indicates when a device is within a particular proximity to one or more friend devices identified as devices belonging to one or more friends of an owner of a device, said one or more services requiring access to particular data controlled by the device, wherein access to the particular data controlled by the device is managed by the device. For example, FIG. 3A, shows device user one or more friend devices proximity notification application services that are based on access to particular data that is under device authority identifying module 310 identifying a service that indicates when a device is within a particular proximity (e.g., within 200 feet) to one or more friend devices identified as devices belonging to one or more friends of an owner of a device (e.g., a tablet device, e.g., an Apple iPad), said one or more services requiring access to particular data controlled by the device, wherein access to the particular data controlled by the device is managed by the device (e.g., the data is stored in an encrypted format on the device, and there is a program running on the device that is linked to the device operating system and that controls distribution of the decryption key or keys).

Referring again to FIG. 7B, operation 704 may include operation 712 depicting identifying a friend service that indicates when a device is within a particular proximity to one or more of the friend devices, said friend service requiring access to position data and contact list data on the device, wherein access to the position data and contact list data on the device is managed by the device. For example, FIG. 3A, shows device user one or more friend devices proximity notification application services that are based on access to device position data and device contact list data that is under device authority identifying module 312 identifying a friend service that indicates when a device is within a particular proximity to one or more of the friend devices, said friend service requiring access to position data and contact list data on the device, wherein access to the position data and contact list data on the device (e.g., a smartphone, e.g., an HTC Desire smartphone running Google Android operating system) is managed by the device (e.g., the device manages which entities, if any, can modify the data once it is stored in memory, and can verify the authenticity of the collected data, for the position data, and can prevent modification of the contact data except with explicit user override).

Referring again to FIG. 7B, operation 712 may include operation 714 depicting identifying a friend service that indicates when a device is within a particular proximity to one or more of the friend devices, said friend service requiring access to position data and contact list data on the device, wherein access to the position data and contact list data on the device is managed by the device with input from the user. For example, FIG. 3A, shows device user one or more friend devices proximity notification application services that are based on access to device position data and device contact list data that is under device authority based on user input identifying module 314 identifying a friend service that indicates when a device (e.g., a laptop computer, e.g., an Ultrabook) is within a particular proximity to one or more of the friend devices (e.g., a smartphone carried by one of the user's friends), said friend service requiring access to position data and contact list data on the device, wherein access to the position data and contact list data on the device is managed by the device with input from the user (e.g., the user, through a series of drop-down menus, specifies which entities can access the position data, and which entities can access the contact data).

Figure 7C:
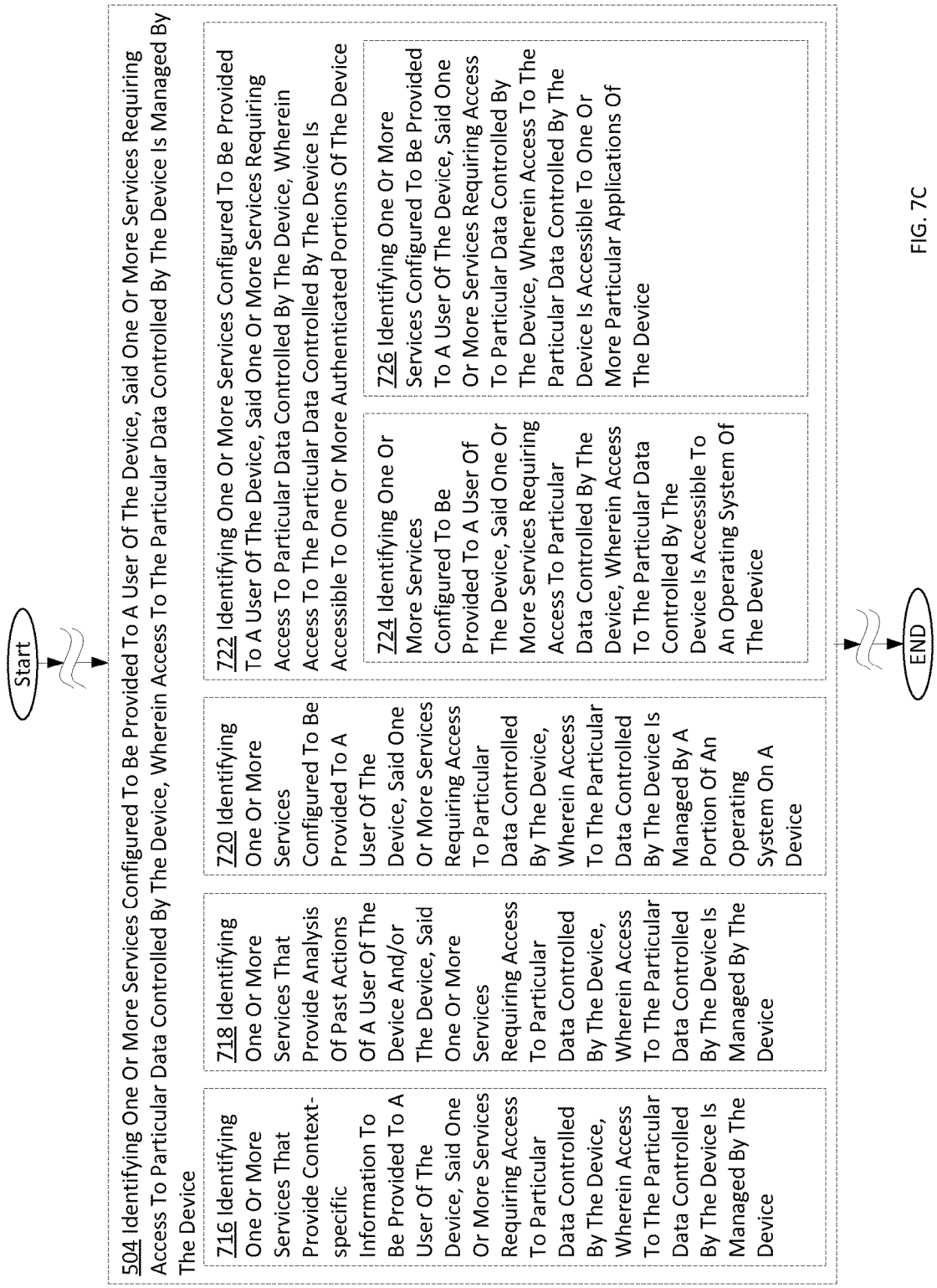
FIG. 7C is a high-level logic flow chart of a process depicting alternate implementations of a service identifying operation 504, according to one or more embodiments.

Referring now to FIG. 7C, operation 504 may include operation 716 depicting identifying one or more services that provide context-specific information to be provided to a user of the device, said one or more services requiring access to particular data controlled by the device, wherein access to the particular data controlled by the device is managed by the device. For example, FIG. 3B, shows device user services providing environment-based information and are based on access to particular data that is under device authority identifying module 316 identifying one or more services that provide context-specific information to be provided to a user of the device (e.g., when the user is traveling in Rome, and gets close to a particular statue, a service identifies who the statue is of, and directs the user to that person's Wikipedia page, if one exists), said one or more services requiring access to particular data controlled by the device (e.g., position data and/or itinerary data), wherein access to the particular data controlled by the device is managed by the device).

Referring again to FIG. 7C, operation 504 may include operation 718 depicting identifying one or more services that provide analysis of past actions of a user of the device or the device, said one or more services requiring access to particular data controlled by the device, wherein access to the particular data controlled by the device is managed by the device. For example, FIG. 3B, shows device user services providing prior user action analysis information and are based on access to particular data that is under device authority identifying module 318 identifying one or more services that provide analysis of past actions of a user of the device (e.g., a sports/running watch that tracks a users' movement) and/or the device (e.g., an analysis of the temperatures that a user runs in and how fast the user goes as a function of temperature), said one or more services requiring access to particular data (e.g., accelerometer and thermometer data), wherein access to the particular data controlled by the device is managed by the device (e.g., internally to the device, any entity can access the data, but external to the device, a specific permission has to be granted for the data to be transmitted outside the device, e.g., through a USB cable or through Bluetooth or other transmission method):

Referring again to FIG. 7C, operation 504 may include operation 720 depicting identifying one or more services configured to be provided to a user of the device, said one or more services requiring access to particular data controlled by the device, wherein access to the particular data controlled by the device is managed by a portion of an operating system on a device. For example, FIG. 3B, shows device user services providing prior user action analysis information and are based on access to particular data that is under device operating system control identifying module 320.

Referring again to FIG. 7C, operation 504 may include operation 722 depicting identifying one or more services configured to be provided to a user of the device, said one or more services requiring access to particular data controlled by the device, wherein access to the particular data controlled by the device is accessible to one or more authenticated portions of the device. For example, FIG. 3B, shows device user services providing prior user action analysis information and are based on access to particular data that is available to authorized device segments identifying module 322 identifying one or more services (e.g., a music suggestion service) configured to be provided to a user of the device (e.g., a portable music player), said one or more services requiring access to particular data controlled by the device (e.g., information about the songs stored on the portable music player), wherein access to the particular data controlled by the device is accessible to one or more authenticated portions of the device (e.g., the actual music player has access to the data, and so do some other parts of the device that are authenticated to have the data).

Referring again to FIG. 7C, operation 722 may include operation 724 depicting identifying one or more services configured to be provided to a user of the device, said one or more services requiring access to particular data controlled by the device, wherein access to the particular data controlled by the device is accessible to an operating system of the device. For example, FIG. 3B, shows device user services providing prior user action analysis information and are based on access to particular data that is available to a core device application identifying module 324 identifying one or more services (e.g., a "find new restaurant" service) configured to be provided to a user of the device (e.g., a smartphone, e.g., an Apple iPhone), said one or more services requiring access to particular data controlled by the device (e.g., reviews of restaurants that the user has submitted via the device to an online rating service, e.g., Yelp), wherein access to the particular data controlled by the device is accessible to an operating system (e.g., Apple's iOS operating system) of the device (e.g., the Apple iPhone).

Figure 7D:
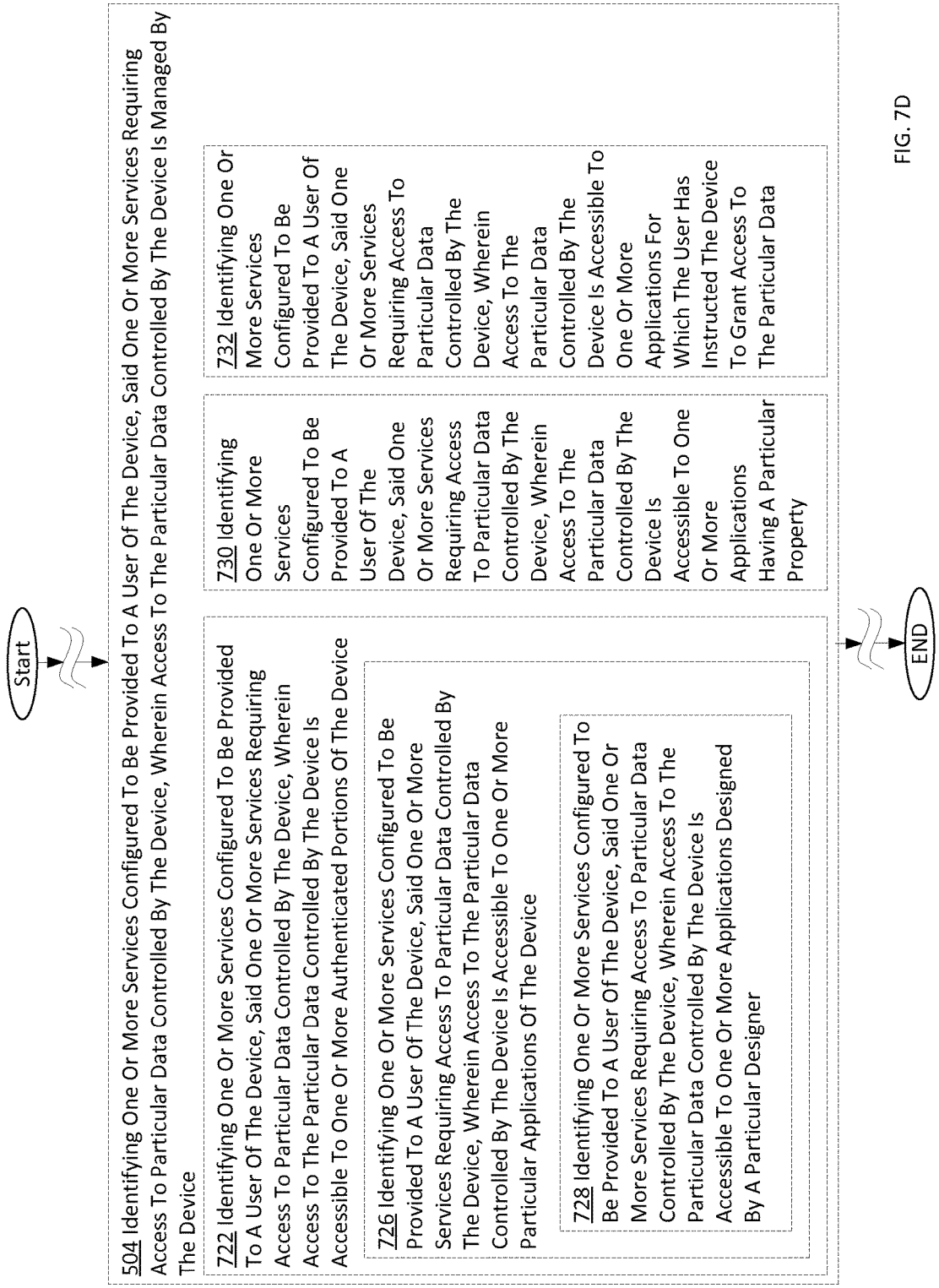
FIG. 7D is a high-level logic flow chart of a process depicting alternate implementations of a service identifying operation 504, according to one or more embodiments.

Referring now to FIG. 7D, operation 722 may include operation 726 depicting identifying one or more services configured to be provided to a user of the device, said one or more services requiring access to particular data controlled by the device, wherein access to the particular data controlled by the device is accessible to one or more particular applications of the device. For example, FIG. 3B, shows device user services providing prior user action analysis information and are based on access to particular data that is available to a device program identifying module 326 identifying one or more services (e.g., a weather forecasting service) configured to be provided to a user of the device (e.g., a smartphone carried by a user), requiring access to particular data (e.g., barometric and temperature data) controlled by the device, wherein access to the particular data controlled by the device is accessible to one or more particular applications of the device (e.g., the thermometer display application running on the smartphone has access to the barometric and temperature data).

Referring again to FIG. 7D, operation 726 may include operation 728 depicting identifying one or more services configured to be provided to a user of the device, said one or more services requiring access to particular data controlled by the device, wherein access to the particular data controlled by the device is accessible to one or more applications designed by a particular designer. For example, FIG. 3B, shows device user services providing prior user action analysis information and are based on access to particular data that is available to a device program by a particular author identifying module 328 identifying one or more services (e.g., a driving habit analysis service) configured to be provided to a user of the device (e.g., an on-board vehicle control system), said one or more services requiring access to the particular data (e.g., acceleration data and/or velocity data) controlled by the device, wherein access to the particular data controlled by the device is accessible to one or more applications designed by a particular designer (e.g., the original manufacturer of the vehicle, e.g., Ford, any applications designed by Ford have access to acceleration and velocity data).

Referring again to FIG. 7D, operation 504 may include operation 730 depicting identifying one or more services configured to be provided to a user of the device, said one or more services requiring access to particular data controlled by the device, wherein access to the particular data controlled by the device is accessible to one or more applications having a particular property. For example, FIG. 3C, shows device user services providing prior user action analysis information and are based on access to particular data that is available to a device application having one or more specific properties identifying module 330 identifying one or more services (e.g., a sleepy driver alert service) configured to be provided to a user of the device (e.g., a smartphone that is connected to measure body functions, e.g., heart rate and breathing), said one or more services requiring access to particular data controlled by the device (e.g., heart rate data and breathing rate data), wherein access to the particular data controlled by the device is accessible to one or more applications having a particular property (e.g., usable while driving).

Referring again to FIG. 7D, operation 504 may include operation 732 depicting identifying one or more services configured to be provided to a user of the device, said one or more services requiring access to particular data controlled by the device, wherein access to the particular data controlled by the device is accessible to one or more applications for which the user has instructed the device to grant access to the particular data. For example, FIG. 3C, shows device user services providing prior user action analysis information and are based on access to particular data that is available to a device application for which a user has granted access identifying module 332 identifying one or more services (e.g., a video processing/editing service) configured to be provided to a user of the device, said one or more services requiring access to particular data controlled by the device (e.g., pictures and/or video stored on the device), wherein access to the particular data controlled by the device is accessible to one or more applications (e.g., a picture editing application, a social networking application, e.g., Facebook, and the like) for which the user has instructed the device to grant access to the particular data (e.g., pictures taken by the device data).

Figure 7E:
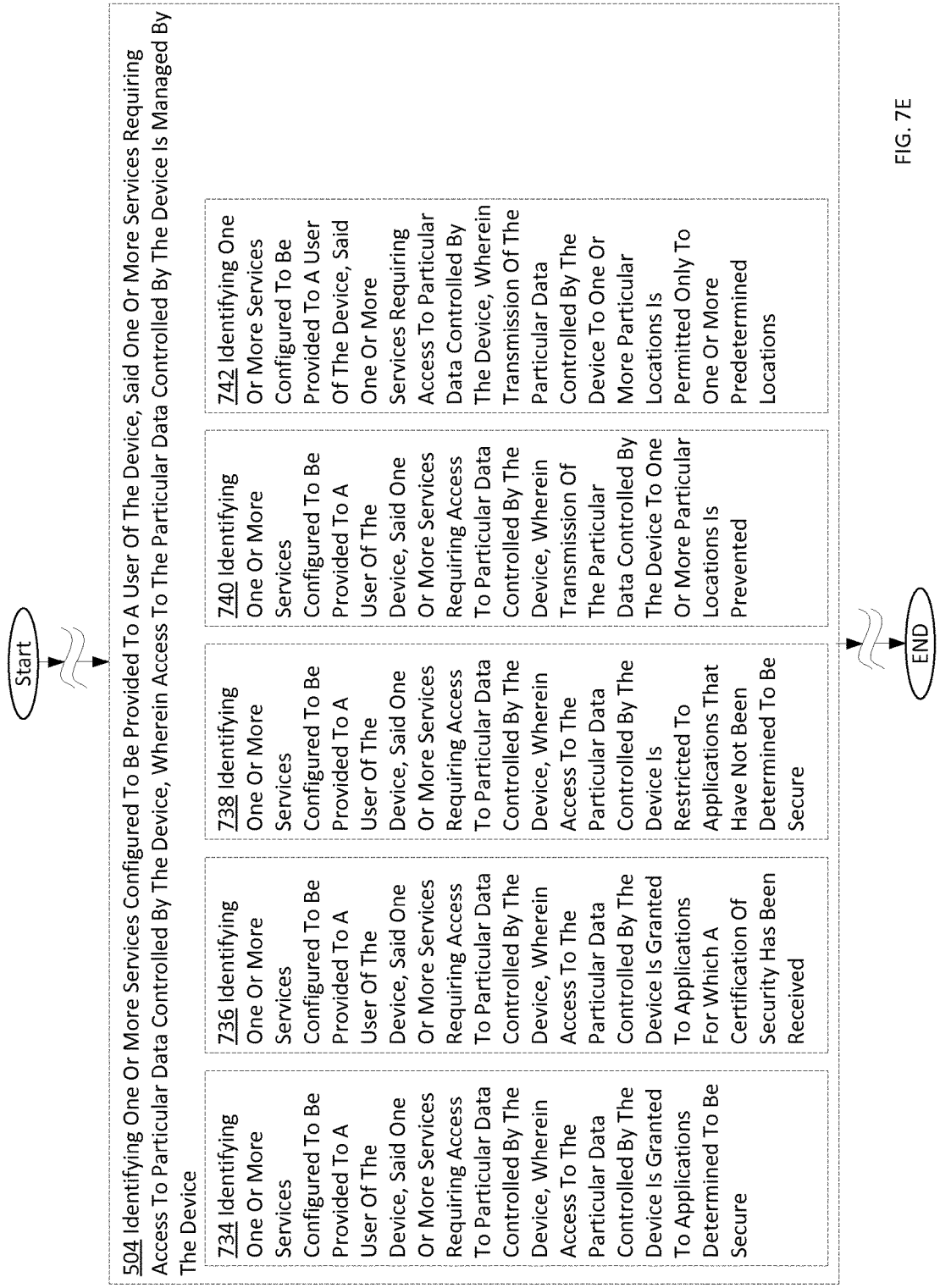
FIG. 7E is a high-level logic flow chart of a process depicting alternate implementations of a service identifying operation 504, according to one or more embodiments.

Referring now to FIG. 7E, operation 504 may include operation 734 depicting identifying one or more services configured to be provided to a user of the device, said one or more services requiring access to particular data controlled by the device, wherein access to the particular data controlled by the device is granted to applications determined to be secure. For example, FIG. 3D, shows device user services providing prior user action analysis information and are based on access to particular data that is available to a device application for which a security determination has been acquired identifying module 334 identifying one or more services (e.g., a time management assistant service) configured to be provided to a user of the device (e.g., a school-issued laptop), said one or more services requiring access to particular data controlled by the device (e.g., a user's calendar and/or itinerary), wherein access to the particular data (e.g., the calendar and/or itinerary data) controlled by the device is granted to applications determined to be secure (e.g., applications that have received some form of certification from a third party security certifying service).

Referring again to FIG. 7E, operation 504 may include operation 736 depicting identifying one or more services configured to be provided to a user of the device, said one or more services requiring access to particular data controlled by the device, wherein access to the particular data controlled by the device is granted to applications for which a certification of security has been received. For example, FIG. 3C, shows device user services providing prior user action analysis information and are based on access to particular data that is available to a device application for which a security certification has been obtained identifying module 336 identifying one or more services (e.g., time management services) configured to be provided to a user of the device (e.g., an employee using his work-issued desktop computer), said one or more services requiring access to particular data controlled by the device (e.g., a list of applications currently running), wherein access to the particular data controlled by the device is granted to applications (e.g., a word processing application, or a billing application) for which a certification of security has been received (e.g., from a central server on an enterprise network that certifies programs to run on the network).

Referring again to FIG. 7E, operation 504 may include operation 738 depicting identifying one or more services configured to be provided to a user of the device, said one or more services requiring access to particular data controlled by the device, wherein access to the particular data controlled by the device is restricted to applications that have not been determined to be secure. For example, FIG. 3D, shows device user services providing prior user action analysis information and are based on access to particular data that is unavailable to a device application for a security determination has not been acquired identifying module 338 identifying one or more services (e.g., a calorie burning calculation service) configured to be provided to a user of the device (e.g., a health monitor device that is worn and monitors vital signs, and links to a smartphone), said one or more services requiring access to particular data controlled by the device (e.g., heart rate monitor data and temperature data, which can be used to calculate caloric processing), wherein access to the particular data controlled by the device is restricted (e.g., limited or no access is given) to applications that have not been determined to be secure (e.g., a new application, for which the device does not have security information).

Referring again to FIG. 7E, operation 504 may include operation 740 depicting identifying one or more services configured to be provided to a user of the device, said one or more services requiring access to particular data controlled by the device, wherein transmission of the particular data controlled by the device to one or more particular locations is prevented. For example, FIG. 3D, shows device user services providing prior user action analysis information and are based on access to particular data that is prevented from being transmitted to one or more locations identifying module 340 identifying one or more services (e.g., a socializing application to determine what bar a user should go to, based on how many people in the device's contact list have people in their contact lists that are in similar locations) configured to be provided to a user of a device (e.g., a smartphone), said one or more services requiring access to particular data controlled by the device (e.g., abbreviated information from the contact list, e.g., first and last names only), wherein transmission of the particular data controlled by the device to one or more particular locations (e.g., broadcasting, or transmitting to an insecure website) is prevented (e.g., the device does not allow the data to be transmitted out except in certain circumstances.

Referring again to FIG. 7E, operation 504 may include operation 742 depicting identifying one or more services configured to be provided to a user of the device, said one or more services requiring access to particular data controlled by the device, wherein transmission of the particular data controlled by the device is permitted only to one or more predetermined locations. For example, FIG. 3D, shows device user services providing prior user action analysis information and are based on access to particular data that is transmitted only to one or more identified locations identifying module 342 identifying one or more services (e.g., a plant-watering application that uses ambient light and a growing-plant database to determine when to water one or more plants) configured to be provided to a user of the device (e.g., a garden-aid device), said one or more services requiring access to particular data controlled by the device (e.g., a light sensor, or, in an embodiment, the image capturing sensor, which also can be used to measure the ambient light), wherein transmission of the particular data controlled by the device is permitted only to one or more predetermined locations (e.g., a plant-growing community server).

Figure 7F:
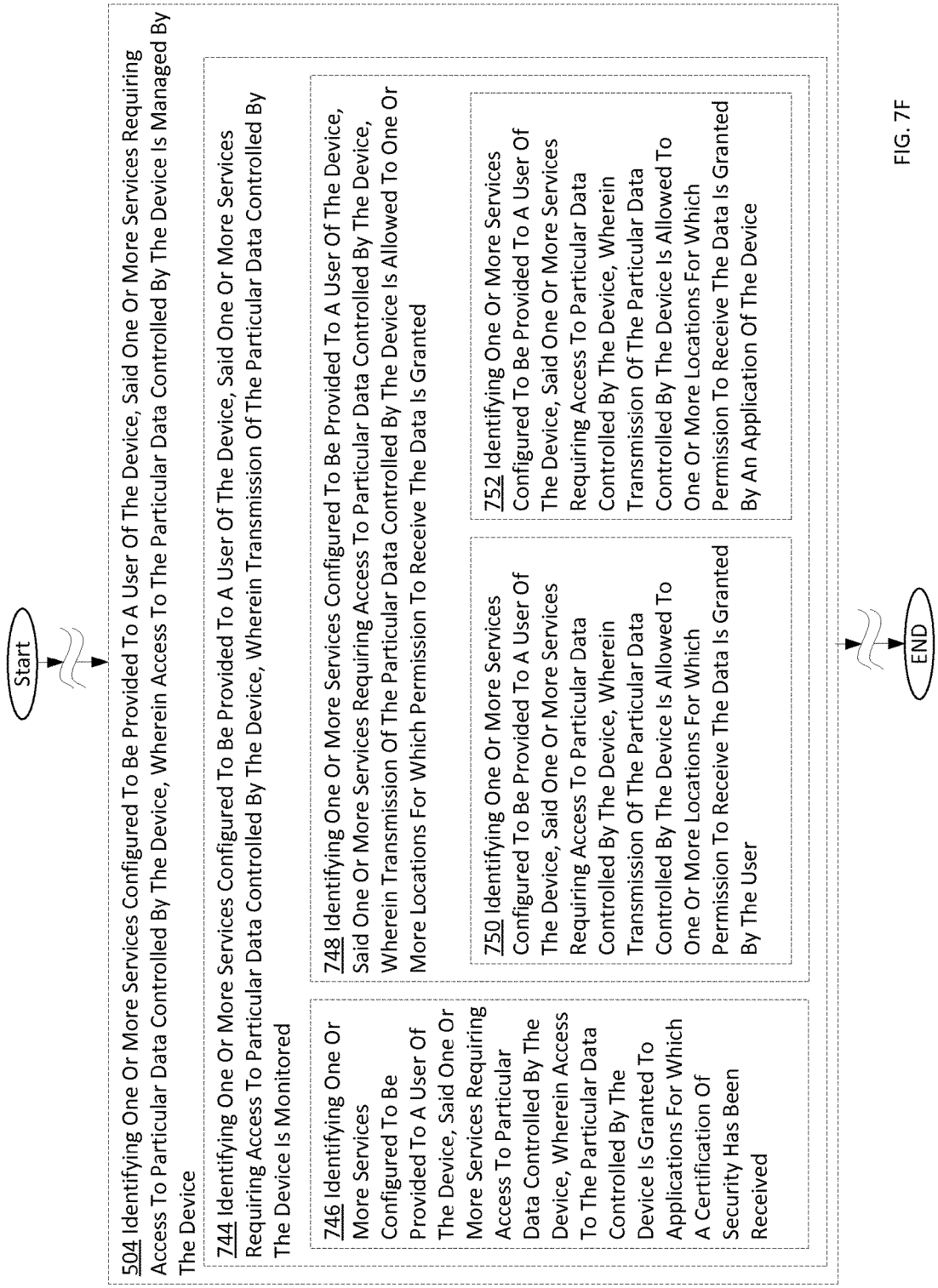
FIG. 7F is a high-level logic flow chart of a process depicting alternate implementations of a service identifying operation 504, according to one or more embodiments.

Referring now to FIG. 7F, operation 504 may include operation 744 depicting identifying one or more services configured to be provided to a user of the device, said one or more services requiring access to particular data controlled by the device, wherein transmission of the particular data controlled by the device is monitored. For example, FIG. 3E, shows device user services providing prior user action analysis information and are based on access to particular data that is available to a device application for which transmission of the particular data is regulated identifying module 344 identifying one or more services configured to be provided to a user of the device, said one or more services (e.g., a dynamic news-flash alerting service) requiring access to particular data controlled by the device (e.g., a weighted list of all the words used in text messages transmitted by the device in the last twenty-four hours), wherein transmission of the particular data controlled by the device is monitored (e.g., the device logs any attempt to access the particular data).

Referring again to FIG. 7F, operation 744 may include operation 746 depicting identifying one or more services configured to be provided to a user of the device, said one or more services requiring access to particular data controlled by the device, wherein transmission of the particular data controlled by the device is allowed to one or more determined locations. For example, FIG. 3E, shows device user services providing prior user action analysis information and are based on access to particular data that is available to a device application for which transmission of the particular data is approved for one or more determined locations identifying module 346 identifying one or more services (e.g., a bicycling information application) configured to be provided to a user of the device (e.g., a smartphone strapped to a bicycle), said one or more services requiring access to particular data (e.g., velocity data) controlled by the device, wherein transmission of the particular data controlled by the device is allowed to one or more determined locations (e.g., the manufacturer of the operating system of the device is allowed to receive the data, e.g., if it is an Apple device, then transmission to Apple-controlled servers is permitted).

Referring again to FIG. 7F, operation 744 may include operation 748 depicting identifying one or more services configured to be provided to a user of the device, said one or more services requiring access to particular data controlled by the device, wherein transmission of the particular data controlled by the device is allowed to one or more locations for which permission to receive the data is granted. For example, FIG. 3E, shows device user services providing prior user action analysis information and are based on access to particular data that is available to a device application for which transmission of the particular data is approved for one or more locations for which particular data access is granted identifying module 348 identifying one or more services (e.g., use of a database to store all the various physical exercise activities conducted by the user, and use of a server back-end to calculate total calories burned) configured to be provided to a user of the device (e.g., a tablet computer stored at a gym for use by people working out), said one or more services requiring access (e.g., the service cannot be performed without the data) to the particular data (e.g., the user's input regarding the exercises performed by the user) controlled by the device (e.g., the device is the gateway through which the information is inputted), wherein transmission of the particular data controlled by the device (e.g., transmission from the server where the data is stored to the requesting entity, which in an embodiment is the entity carrying out the database service) is allowed to one or more locations for which permission to receive the data is granted (e.g., the database entity has permission to receive the data, which was granted by the user via the device).

For another example, FIG. 3E, shows device user services providing prior user action analysis information and are based on access to particular data that is available to a device application for which transmission of the particular data is approved for one or more locations for which particular data access is granted identifying module 348 identifying one or more services (e.g., a book recommendation service) configured to be provided to a user of the device (e.g., an e-reader), said one or more services requiring access to particular data controlled by the device (e.g., a list of how long it took a user to get through each of the books in her library), wherein transmission of the particular data controlled by the device is allowed to one or more locations (e.g., a vendor location, e.g., Amazon) for which permission to receive the data is granted.

Referring again to FIG. 7F, operation 748 may include operation 750 depicting identifying one or more services configured to be provided to a user of the device, said one or more services requiring access to particular data controlled by the device, wherein transmission of the particular data controlled by the device is allowed to one or more locations for which permission to receive the particular data is granted by the user. For example, FIG. 3E, shows device user services providing prior user action analysis information and are based on access to particular data that is available to a device application for which transmission of the particular data is approved for one or more locations for which particular data access is user-granted identifying module 350 identifying one or more services (e.g., a food evaluation testing service that evaluates food stored within a refrigerator to determine freshness) configured to be provided to a user of the device (e.g., a smart refrigerator appliance installed in a house), said one or more services requiring access to particular data controlled by the device (e.g., a video feed into the refrigerator, or temperature and humidity information), wherein transmission of the particular data controlled by the device is allowed to one or more locations for which permission to receive the data is granted by the user (e.g., upon installation of the appliance, the user grants access to one or more appliance maintenance services run by manufacturers or third party distributors that are granted access to the data to determine that the refrigerator is operating properly.

For another example, FIG. 3E, shows device user services providing prior user action analysis information and are based on access to particular data that is available to a device application for which transmission of the particular data is approved for one or more locations for which particular data access is user-granted identifying module 350 identifying one or more services (e.g., gas mileage efficiency service) configured to be provided to a user of the device (e.g., an add-on portable motor vehicle driving assistant), said one or more services requiring access to particular data (e.g., speed and location, acceleration and deceleration) controlled by the device (e.g., collected by the device and stored on the device or remotely, or a combination thereof), wherein transmission of the particular data controlled by the device is allowed to one or more locations for which permission to receive the data is granted by the user (e.g., the user, by setting up the device and agreeing to the EULA, grants permission for the entity to receive the particular data.

Referring again to FIG. 7F, operation 748 may include operation 752 depicting identifying one or more services configured to be provided to a user of the device, said one or more services requiring access to particular data controlled by the device, wherein transmission of the particular data controlled by the device is allowed to one or more locations for which permission to receive the data is granted by an application of the device. For example, FIG. 3E, shows device user services providing prior user action analysis information and are based on access to particular data that is available to a device application for which transmission of the particular data is approved for one or more locations for which particular data access is granted by a device application identifying module 352 identifying one or more services (e.g., phone calling plan optimization service) configured to be provided to a user of the device, said one or more services requiring access to particular data (e.g., telephone service data) controlled by the device (e.g., an Android tablet with Skype installed), wherein transmission of the particular data (e.g., a list of the area codes of the last thirty numbers called) controlled by the device is allowed to one or more locations (e.g., the telecom provider) for which permission to receive the data is granted by an application of the device (e.g., a data management application on the device controls that the telecom provider only gets the area codes of the numbers, and not the complete numbers).

Figure 7G:
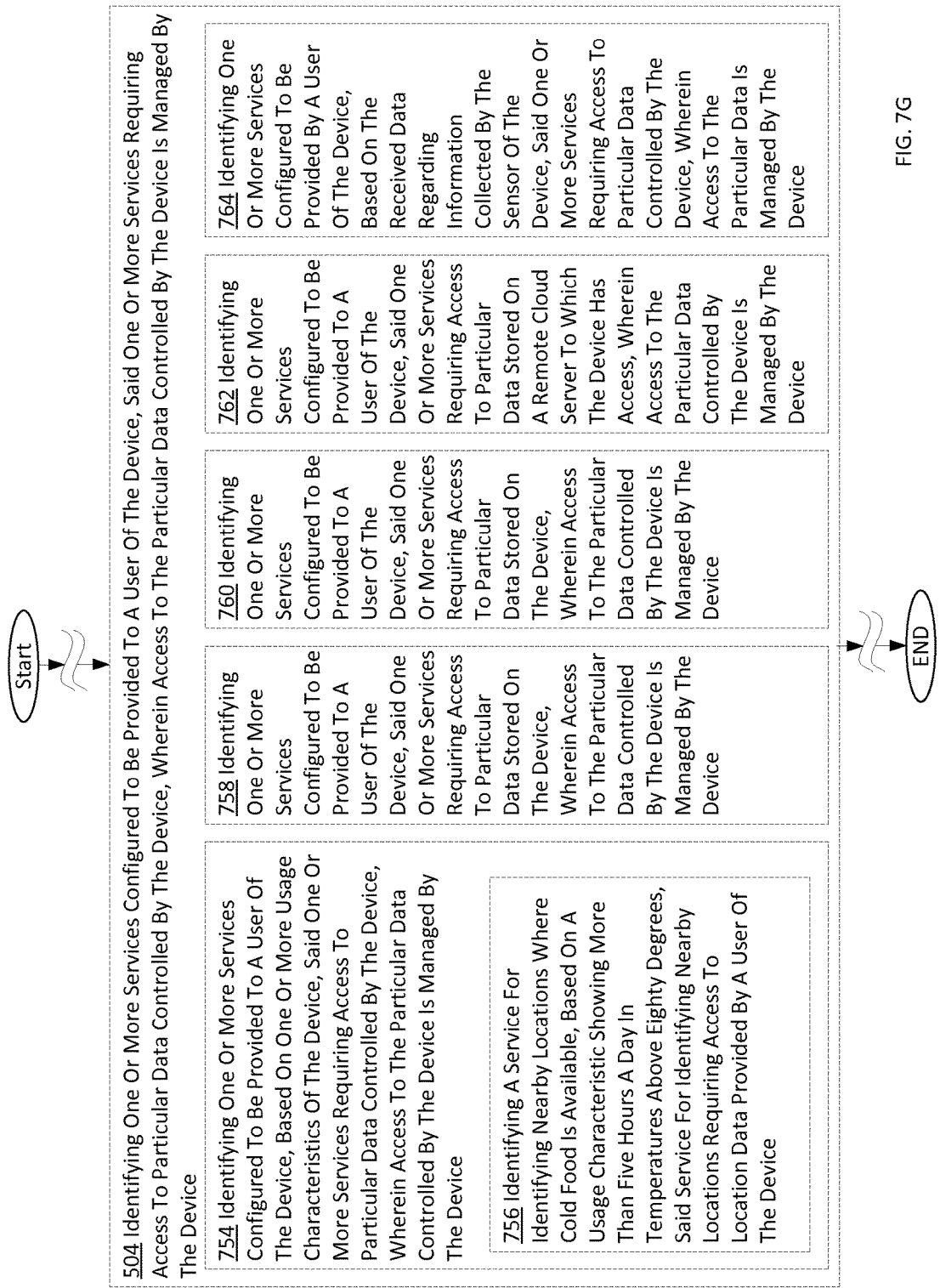
FIG. 7G is a high-level logic flow chart of a process depicting alternate implementations of a service identifying operation 504, according to one or more embodiments.

Referring now to FIG. 7G, operation 504 may include operation 754 depicting identifying one or more services configured to be provided to a user of the device, based on one or more usage characteristics of the device, said one or more services requiring access to particular data controlled by the device, wherein access to the particular data controlled by the device is managed by the device. For example, FIG. 3E, shows device user services that are based on access to particular data that has an access attribute managed by the device identifying module 354 identifying one or more services (e.g., offering a blood-alcohol level concentration estimating service that bases its estimate on time, body weight, and the drinks the user inputs as consuming) configured to be provided to a user of the device (e.g., a user's smartphone), based on one or more usage characteristics of the device (e.g., when it is determined that a device spends more than five hours a week at positions corresponding to establishments that serve alcohol), said one or more services requiring access to particular data controlled by the device (e.g., inputted drink information, and the stored data relating to the user's weight, height, and gender), wherein access to the particular data controlled by the device is managed by the device (e.g., the device receives the inputs and determines where to store them, e.g., on an SD card of the smartphone, on the smartphone's internal memory, or remotely to the smartphone).

Referring again to FIG. 7G, operation 754 may include operation 756 depicting identifying a service for identifying nearby locations where cold food is available, based on a usage characteristic showing more than five hours a day in temperatures above eighty degrees, said service for identifying nearby locations requiring access to location data provided by a user of the device. For example, FIG. 3F, shows device user services that are based on temperature usage data and that are partly based on device position data managed by the device identifying module 356 identifying a service for identifying nearby locations where cold food is available, based on a usage characteristic showing more than five hours a day in temperatures above eighty degrees, said service for identifying nearby locations requiring access to location data provided by a user of the device.

Referring again to FIG. 7G, operation 504 may include operation 758 depicting identifying one or more services configured to be provided to a user of the device, said one or more services requiring access to particular data stored on the device, wherein access to the particular data controlled by the device is managed by the device. For example, FIG. 3F, shows device user services that are based on usage data and that are partly based on access to particular data that is controlled by the device identifying module 358 identifying one or more services (e.g., a route-mapping service based on current conditions for outdoor enthusiasts) configured to be provided to a user of the device (e.g., a wilderness navigation unit with GPS, compass, and weather instruments), said one or more services requiring access (e.g., without this access, the service cannot be performed adequately) to particular data stored on the device (e.g., location and weather information gathered by the device sensor, and "stored" only briefly as the sensor collects it), wherein access to the particular data controlled by the device is managed by the device (e.g., the device watches how much of its data is being sampled to make predictions).

Referring again to FIG. 7G, operation 504 may include operation 760 depicting identifying one or more services configured to be provided to a user of the device, said one or more services requiring access to particular data stored at a remote server and accessible by the device, wherein access to the particular data controlled by the device is managed by the device. For example, FIG. 3F, shows device user services that are based on usage data and that are partly based on access to remotely-stored particular data that is managed by the device identifying module 360 identifying one or more services (e.g., a mixed drink predictor service for use when talking to people at bars) configured to be provided to a user of the device (e.g., a smartphone carried by a user, e.g., an Apple iPhone), said one or more services requiring access to particular data (e.g., contact list data, to determine if the person for whom the predictor service is being used on has any contacts in common which could be used to mine information) stored at a remote server (e.g., a server that tracks lots of people who have devices and what type of drinks they order) and accessible by the device (e.g., each device can access his or her own information), wherein access to the particular data controlled by the device is managed by the device (e.g., the device controls the access to the information, e.g., granting a server limited access to its information to participate in the mixed drink predictor service).

Referring again to FIG. 7G, operation 504 may include operation 762 depicting identifying one or more services configured to be provided to a user of the device, said one or more services requiring access to particular data stored on a remote cloud server to which the device has access, wherein access to the particular data controlled by the device is managed by the device. For example, FIG. 3F, shows device user services that are based on usage data and that are partly based on access to cloud stored particular data that is managed by the device identifying module 362 identifying one or more services (e.g., an airport food option presenter) configured to be provided to a user of the device (e.g., a tablet device, e.g., a Samsung Galaxy Tab), said one or more services requiring access to particular data (e.g., restaurant reviews written by the user and posted to her blog) stored on a remote cloud server (e.g., an Amazon cloud server, which in an embodiment, may be presented publicly as HTML, and in another embodiment, may be private) to which the device has access (e.g., the device is allowed to access the data, even if private), wherein access to the particular data controlled by the device is managed by the device (e.g., the device is used to change the permissions on the cloud server).

Referring again to FIG. 7G, operation 504 may include operation 764 depicting identifying one or more services configured to be provided by a user of the device, based on the received data regarding information collected by the sensor of the device, said one or more services requiring access to particular data controlled by the device, wherein access to the particular data is managed by the device. For example, FIG. 3F, shows device user services that are partly based on access to particular sensor collected data that is managed by the device identifying module 364 identifying one or more services (e.g., a finding a frozen yogurt shop when the temperature is hot, and finding a coffee shop when the temperature is cold) configured to be provided to a user of the device (e.g. a smartphone device, e.g., a Nokia Lumia), based on the received data (e.g., temperature data) regarding information collected by the sensor of the device (e.g., the thermometer), said one or more services requiring access to particular data (e.g., in some embodiments, the particular data may be the sensor data, e.g., the temperature data, but in other embodiments, it may be different data, such as position data, and in other embodiments, it may be both) controlled by the device, wherein access to the particular data (e.g., position data and temperature data) is managed by the device (e.g., the Nokia Lumia).

Figure 8A:
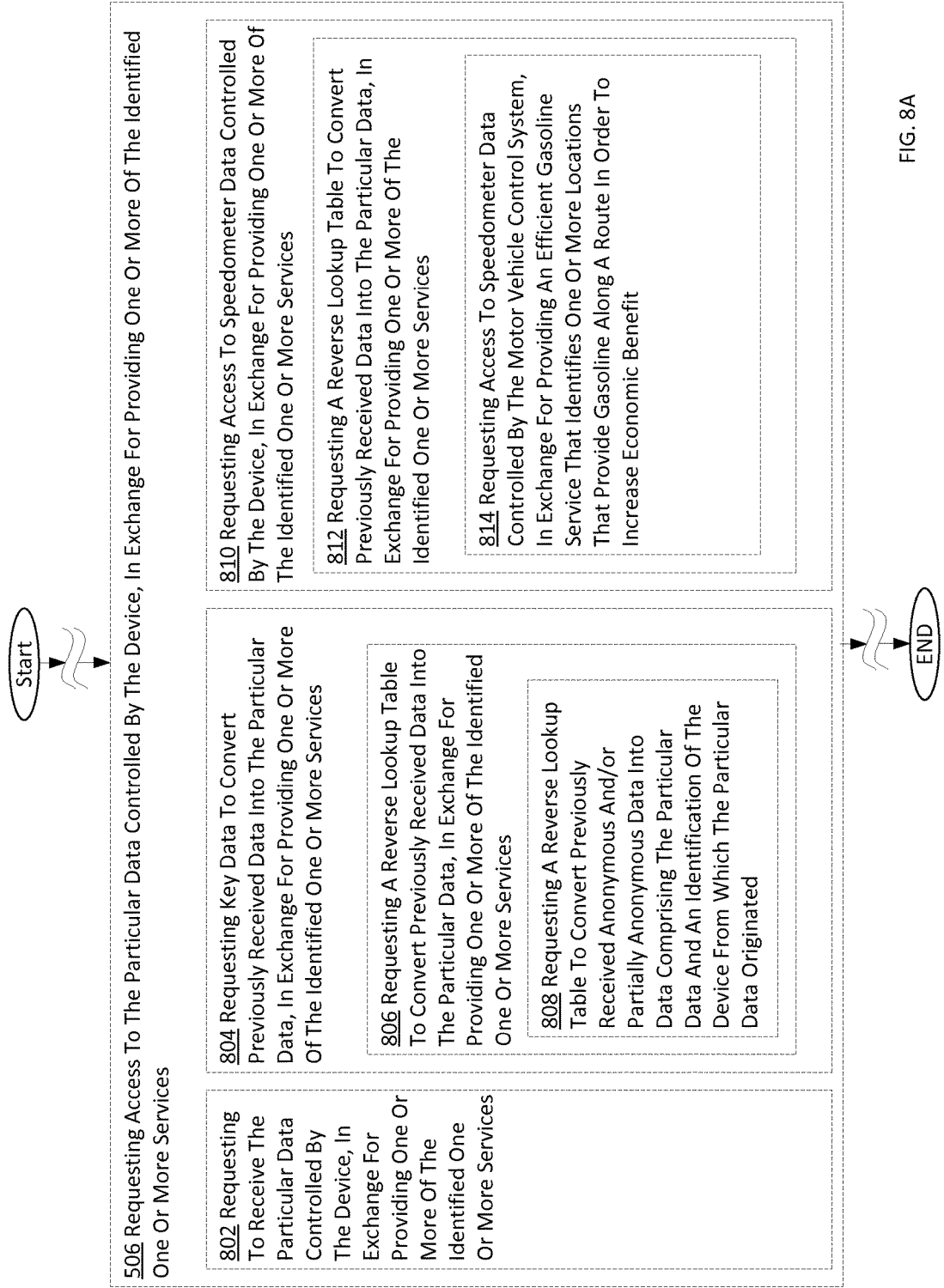
FIG. 8A is a high-level logic flow chart of a process depicting alternate implementations of an access requesting operation 506, according to one or more embodiments.
Figure 8B:
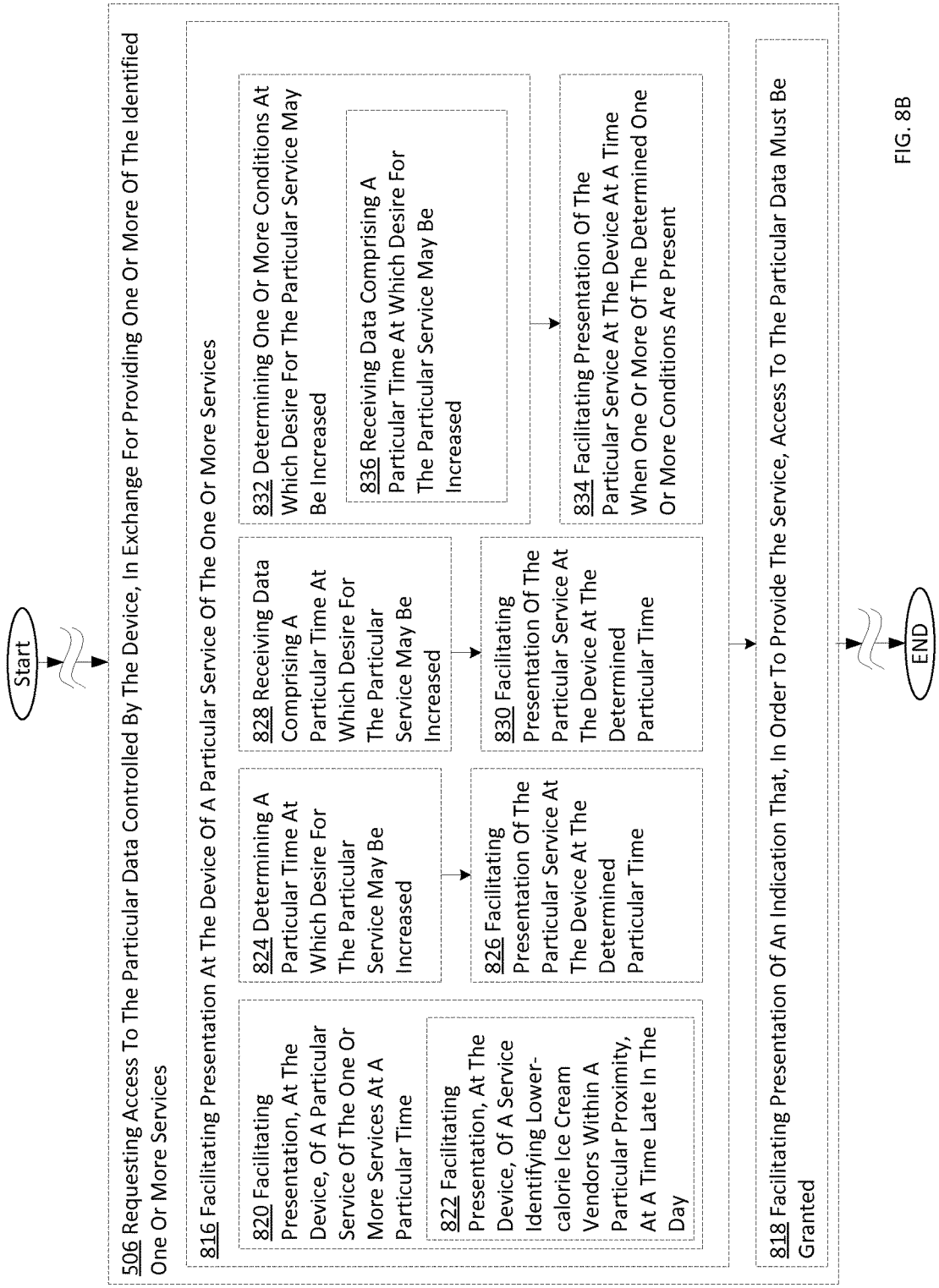
FIG. 8B is a high-level logic flow chart of a process depicting alternate implementations of an access requesting operation 506, according to one or more embodiments.
Figure 8C:
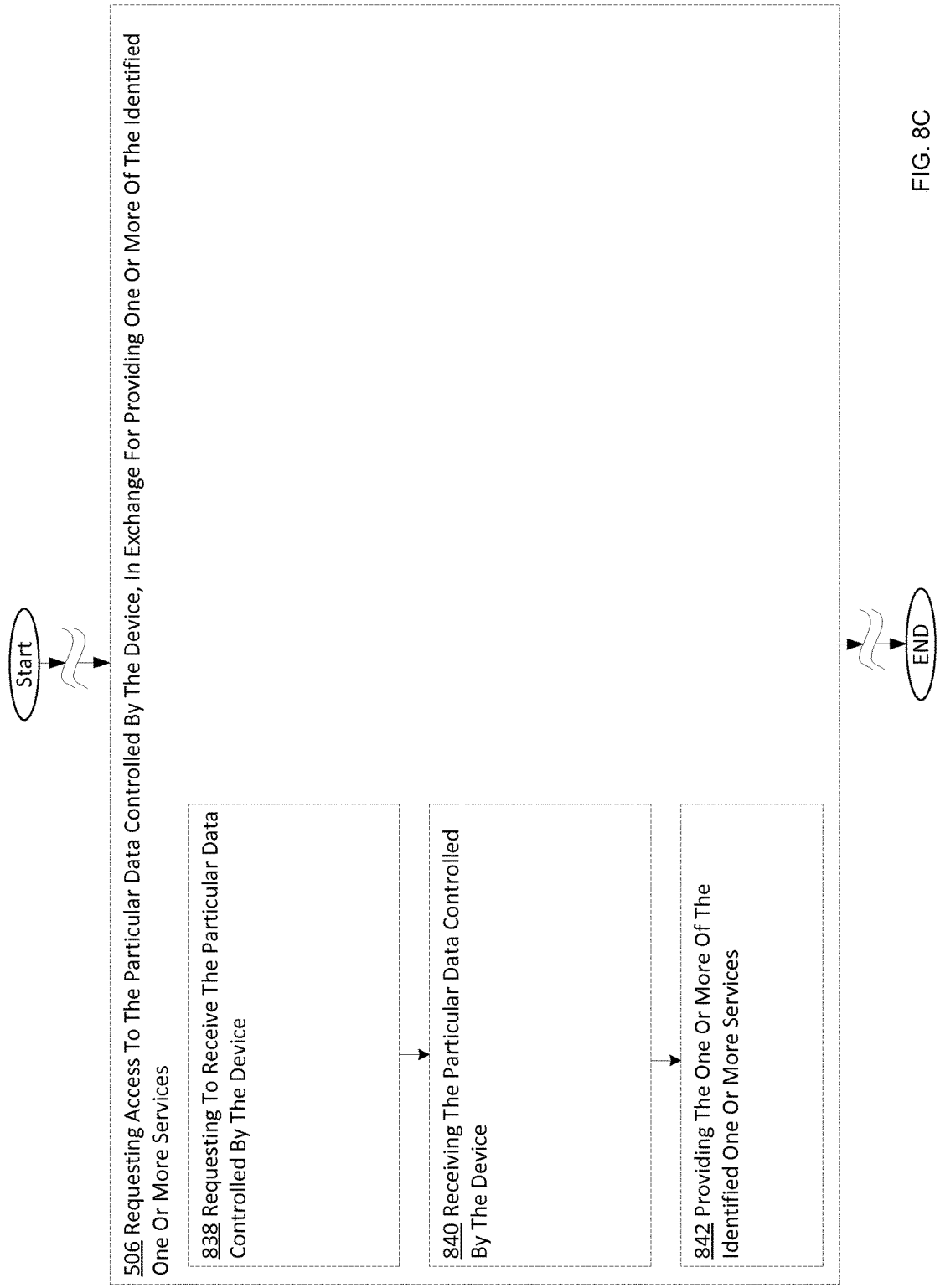
FIG. 8C is a high-level logic flow chart of a process depicting alternate implementations of an access requesting operation 506, according to one or more embodiments.

FIGS. 8A-8C depict various implementations of operation 506 depicting requesting access to the particular data controlled by the device, in exchange for providing one or more of the identified one or more services, according to embodiments. Referring now to FIG. 8A, operation 506 may include operation 802 depicting requesting to receive the particular data controlled by the device, in exchange for providing one or more of the identified one or more services. For example, FIG. 4A, shows particular data under device authority receipt in exchange for providing at least part of identified service requesting module 402 requesting to receive the particular data (e.g., position data) controlled by the device (e.g., a smartphone, e.g., a Nokia Lumia Windows phone), in exchange for (e.g., the service is provided as payment, trade, barter, exchange, contract, agreement, or other relationship in which it is understood that access to the particular data controlled by the device is the exchange for receiving the service, whether such agreement is implied or explicit, or presented contemporaneously with the service or at another time, e.g., at purchase time, or at time of agreeing to a EULA) providing one or more of the identified one or more services (e.g., showing a user of the device how many of the user's friends, and the user's friends' friends are close by to the device's location).

Referring again to FIG. 8A, operation 506 may include operation 804 depicting requesting key data to convert previously received data into the particular data, in exchange for providing one or more of the identified one or more services. For example, FIG. 4A, shows unlock data configured to convert previously received data into particular data in exchange for providing at least part of identified service requesting module 404 requesting key data (e.g., data that will allow conversion, e.g., an RSA private key, in an embodiment where the previously received data is RSA-encrypted) to convert (e.g., transform, manipulate, process, or otherwise act upon the data) previously received data (e.g., data that does not uniquely identify the device) into the particular data (e.g., data that may uniquely identify the device and/or a user of the device), in exchange for providing one or more of the identified one or more services (e.g., a rural location trip planner that determines the best combination of flying, driving, and taking a train to get to a location).

Referring again to FIG. 8A, operation 804 may include operation 806 depicting requesting a reverse lookup table to convert previously received data into the particular data, in exchange for providing one or more of the identified one or more services. For example, FIG. 4A, shows reverse lookup table configured to convert previously received data into particular data in exchange for providing at least part of identified service requesting module 406 requesting a reverse lookup table (e.g., the reverse table of a table that was used to substitute identifying information for non-identifying information) to convert previously received data into the particular data, in exchange for providing one or more of the identified one or more services (e.g., a "good picture" service that monitors weather and light conditions at the device location and prompts when the service thinks there is a possibility of a good picture of a landmark or other point of interest).

Referring again to FIG. 8A, operation 806 may include operation 808 depicting requesting a reverse lookup table to convert previously received anonymous or partially anonymous data into data comprising the particular data and an identification of the device from which the particular data originated. For example, FIG. 4A, shows reverse lookup table configured to convert previously received anonymized data into deanonymized particular data that identifies the device in exchange for providing at least part of identified service requesting module 408 requesting a reverse lookup table to convert previously received anonymous or partially anonymous data into data comprising the particular data (e.g., the user's position data) and an identification of the device (e.g., a device ID number, e.g., the email address associated with a device, or the device's MAC address, or some other device identifier) of the device from which the particular data originated (e.g., the device that generated the data). It is noted that, for ease of understanding, with respect to this application, in an embodiment, "identification of the device" may include an identification of the device without the user, an identification of the user without the device, an identification of the user and the device, or some combination thereof.

Referring again to FIG. 8A, operation 506 may include operation 810 depicting requesting access to speedometer data controlled by the device, in exchange for providing one or more of the identified one or more services. For example, FIG. 4A, shows speedometer data controlled by device receipt in exchange for providing at least part of identified service requesting module 410 requesting access to speedometer data controlled by the device (e.g., a motor vehicle control system), in exchange for providing one or more of the identified one or more services (e.g., a driver monitoring program used by parents whose children are just beginning to drive, and they want to make sure they are not driving recklessly, this system can cause an alarm to sound and/or the engine to throttle back if certain acceleration and/or speed conditions are detected).

Referring again to FIG. 8A, operation 810 may include operation 812 depicting requesting access to speedometer data controlled by the motor vehicle control system, in exchange for providing one or more of the identified one or more services. For example, FIG. 4A, shows speedometer data controlled by motor vehicle control system receipt in exchange for providing at least part of identified service requesting module 412 requesting access to speedometer data controlled by the motor vehicle control system, in exchange for providing one or more of the identified one or more services (e.g., an insurance company may promise lower rates for particular driving profiles, and this service allows access to the information in the car's processor so that driving patterns can be analyzed).

Referring again to FIG. 8A, operation 812 may include operation 814 depicting requesting access to speedometer data controlled by the motor vehicle control system, in exchange for providing an efficient gasoline service that identifies one or more locations that provide gasoline along a route in order to increase economic benefit. For example, FIG. 4A, shows speedometer data controlled by motor vehicle control system receipt in exchange for providing at least part of gasoline consumption routing service requesting module 414 requesting access to speedometer data controlled by the motor vehicle control system, in exchange for providing an efficient gasoline service that identifies one or more locations that provide gasoline along a route in order to increase economic benefit.

Referring now to FIG. 8B, operation 506 may include operation 816 depicting facilitating presentation at the device of a particular service of the one or more services. For example, FIG. 4B, shows particular service presentation at device facilitation module 416 facilitating presentation (e.g., causing to be spoken aloud through a speaker) at the device (e.g., a speaker of the device, e.g., a speaker of a personal navigation system mounted in a motor vehicle) of the one or more services (e.g., gasoline usage efficiency services).

Referring again to FIG. 8B, operation 506 may include operation 818 depicting facilitating presentation of an indication that, in order to provide the service, access to the particular data must be granted. For example, FIG. 4B, shows indication that providing of particular service is contingent on particular data access grant facilitation module 418 facilitating presentation of an indication that, in order to provide the service (e.g., determining the nearest gas station), access to the particular data (e.g., position data) must be granted.

Referring again to FIG. 8B, operation 816 may include operation 820 depicting facilitating presentation, at the device, of a particular service of the one or more services at a particular time. For example, FIG. 4B, shows particular service presentation at device at particular time facilitation module 420 facilitating presentation (e.g., display), at the device (e.g., a user's tablet device), of a particular service (e.g., directions to a health-food alternative and calories saved) at a particular time (e.g., at a time when a user is detected as entering a candy store).

Referring again to FIG. 8B, operation 820 may include operation 822 depicting facilitating presentation, at the device, of a service identifying lower-calorie ice cream vendors within a particular proximity, at a time late in the day. For example, FIG. 4B, shows alternative food service presentation at device at late-day time facilitation module 422 facilitating presentation (e.g., instructing a device to display), at the device, of a service identifying lower-calorie ice cream vendors within a particular proximity (e.g., how many ice cream vendors are within walking distance of the device's current position), at a time late in the day (e.g., an ice cream finding service may be more beneficial later in the day because fewer people eat ice cream in the morning).

Referring again to FIG. 8B, operation 820 may include operation 824 depicting determining a particular time at which desire for the particular service may be increased. For example, FIG. 4B, shows particular time at which demand for particular service is increased relative to other time calculating module 424 determining a particular time at which desire for the particular service may be increased (e.g., shopping deal service desirability may be increased as the time gets closer to Christmas).

Referring again to FIG. 8B, operation 820 may include operation 826 depicting facilitating presentation of the particular service at the device at the determined particular time. For example, FIG. 4B, shows particular service presentation at calculated particular time of increased demand facilitation module 426 facilitating presentation of the particular service (e.g., a price-comparing service for popular items for fathers) at the device at the determined particular time (e.g., at a time between December 15 and December 25).

Referring again to FIG. 8B, operation 820 may include operation 828 depicting receiving data comprising a particular time at which desire for the particular service may be increased. For example, FIG. 4B, shows notification of particular time at which demand for particular service is increased relative to other time receiving module 428 receiving data comprising a particular time (e.g., if a user always goes to restaurants on Thursday evenings, then receiving data, e.g., from the device, indicating that, on Thursday afternoon, a new restaurant finding service might have increased desirability) at which desire for the particular service (e.g., a new restaurant finding service) may be increased.

Referring again to FIG. 8B, operation 820 may include operation 830 depicting facilitating presentation of the particular service at the device at the determined particular time. For example, FIG. 4B, shows particular service presentation at received particular time of increased demand facilitation module 430 facilitating presentation of the particular service (e.g., the new restaurant finding service) at the device (e.g., a user's personal digital assistant) at the determined particular time (e.g., late Thursday afternoon).

Referring again to FIG. 8B, operation 820 may include operation 832 depicting determining one or more conditions at which desire for the particular service may be increased. For example, FIG. 4B, shows one or more conditions at which demand for particular service is increased relative to other time determining module 432 determining one or more conditions at which desire for the particular service may be increased (e.g., if a device has been subjected to a lot of activity and it is a hot day, then it may be determined that a cold drink finding service would have increased desirability).

Referring again to FIG. 8B, operation 820 may include operation 834 depicting facilitating presentation of the particular service at the device at a time when one or more of the determined one or more conditions are present. For example, FIG. 4B, shows particular service presentation at particular time when one or more of determined conditions are detected as present facilitation module 434 facilitating presentation of the particular service (e.g., a sports game scheduling service) at the device (e.g., a user's smartphone) at a time when one or more of the determined one or more conditions (e.g., the user's calendar indicates that time between 2 pm and 10 pm is open) are present.

Referring again to FIG. 8B, operation 832 may include operation 836 depicting determining that at temperatures above eighty degrees Fahrenheit, desire for a soda pop vending machine locator-and-inventory service may be increased. For example, FIG. 4B, shows temperatures above eighty degrees at which demand for vending machine locations is increased determining module 436 determining that at temperatures above eighty degrees Fahrenheit, desire for a soda pop vending machine locator and inventory service may be increased.

Referring now to FIG. 8C, operation 506 may include operation 838 depicting requesting to receive the particular data controlled by the device. For example, FIG. 4B, shows particular data subject to device authority requesting module 438 requesting to receive the particular data (e.g., the last twenty-five locations visited by the device) controlled by the device (e.g., a motor vehicle control system).

Referring again to FIG. 8C, operation 506 may include operation 840 depicting receiving the particular data controlled by the device. For example, FIG. 4B, shows particular data subject to device authority receiving module 440 receiving the particular data (e.g., the last twenty-five locations visited by the device) controlled by the device (e.g., the motor vehicle control system).

Referring again to FIG. 8C, operation 506 may include operation 842 depicting providing the one or more of the identified one or more services. For example, FIG. 4B, shows at least portion of one or more identified services providing module 442 providing the one or more of the identified one or more services (e.g., showing various alternatives for healthy foods that are similar to foods served in the restaurant at a user's current location).

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method configured to be carried out on a server device that communicates with one or more service providers configured to provide one or more services that are executed at least in part on one or more other devices, said other devices also in communication with the server device, comprising:

receiving data regarding one or more properties of a device, wherein said data is not alone sufficient to particularly identify the device;

identifying one or more services at the server device that are configured to be provided to a user of the device, said one or more services requiring access to particular data controlled by the device, wherein access to the particular data controlled by the device is managed by the device; and requesting access to the particular data controlled by the device, in exchange for providing one or more of the identified one or more services.

2. The computationally-implemented method of claim 1, wherein said receiving data regarding one or more properties of a device, wherein said data is not alone sufficient to particularly identify the device comprises:

receiving data regarding information collected by a device, wherein said data is not sufficient to particularly identify the device that collected the information.

3. The computationally-implemented method of claim 1, wherein said receiving data regarding one or more properties of a device, wherein said data is not alone sufficient to particularly identify the device comprises:

receiving data regarding information collected by a device having a device identifier, wherein said data does not include the device identifier.

4. The computationally-implemented method of claim 1, wherein said receiving data regarding one or more properties of a device, wherein said data is not alone sufficient to particularly identify the device comprises:

receiving data regarding information collected by a device having a device identifier that is unique to the device, said received data including a modified identifier, wherein the device identifier cannot be independently derived from the modified identifier.

5. The computationally-implemented method of claim 1, wherein said receiving data regarding one or more properties of a device, wherein said data is not alone sufficient to particularly identify the device comprises:

receiving data regarding information collected by a device having a device identifier, said data providing a modified device identifier that is unique to the device, and from which the device identifier can be derived only using a lookup table that is not received with the received data.

6. The computationally-implemented method of claim 1, wherein said receiving data regarding one or more properties of a device, wherein said data is not alone sufficient to particularly identify the device comprises:

receiving data regarding information collected by a sensor of the device, wherein said data is not alone sufficient to particularly identify the device.

7. The computationally-implemented method of claim 1, wherein said receiving data regarding one or more properties of a device, wherein said data is not alone sufficient to particularly identify the device comprises:

receiving data regarding information collected by an input component of the device, wherein said data is not alone sufficient to particularly identify the device.

8. The computationally-implemented method of claim 1, wherein said receiving data regarding one or more properties of a device, wherein said data is not alone sufficient to particularly identify the device comprises:

receiving data regarding one or more types of information stored in a memory of the device, wherein said data is not alone sufficient to particularly identify the device.

9. The computationally-implemented method of claim 8, wherein said receiving data regarding one or more types of information stored in a memory of the device, wherein said data is not alone sufficient to particularly identify the device comprises:

receiving data regarding a number of program applications stored in a memory of the device.

10. The computationally-implemented method of claim 8, wherein said receiving data regarding one or more types of information stored in a memory of the device, wherein said data is not alone sufficient to particularly identify the device comprises:

receiving data regarding a type of program applications stored in a memory of the device.

11. The computationally-implemented method of claim 1, wherein said receiving data regarding one or more properties of a device, wherein said data is not alone sufficient to particularly identify the device comprises:

receiving data regarding one or more properties of the device, from the device, wherein said data is alone insufficient to uniquely identify the device.

12. The computationally-implemented method of claim 1, wherein said receiving data regarding one or more properties of a device, wherein said data is not alone sufficient to particularly identify the device comprises:

receiving data regarding one or more properties of the device, said data having information identifying the device previously removed.

13. The computationally-implemented method of claim 1, wherein said identifying one or more services at the server device that are configured to be provided to a user of the device, said one or more services requiring access to particular data controlled by the device, wherein access to the particular data controlled by the device is managed by the device comprises:

identifying an application service to be provided to a user of the device, said one or more services requiring access to particular data controlled by the device, wherein access to the particular data controlled by the device is managed by the device.

14. The computationally-implemented method of claim 13, wherein said identifying an application service to be provided to a user of the device, said one or more services requiring access to particular data controlled by the device, wherein access to the particular data controlled by the device is managed by the device comprises:

identifying a service that indicates when a device is within a particular proximity to one or more particular items, said one or more services requiring access to particular data controlled by the device, wherein access to the particular data controlled by the device is managed by the device.

15. The computationally-implemented method of claim 1, wherein said identifying one or more services at the server device that are configured to be provided to a user of the device, said one or more services requiring access to particular data controlled by the device, wherein access to the particular data controlled by the device is managed by the device comprises:

identifying one or more services that provide analysis of past actions of a user of the device or the device, said one or more services requiring access to particular data controlled by the device, wherein access to the particular data controlled by the device is managed by the device.

16. The computationally-implemented method of claim 1, wherein said identifying one or more services at the server device that are configured to be provided to a user of the device, said one or more services requiring access to particular data controlled by the device, wherein access to the particular data controlled by the device is managed by the device comprises:
   identifying one or more services configured to be provided to a user of the device, said one or more services requiring access to particular data controlled by the device, wherein access to the particular data controlled by the device is managed by a portion of an operating system on a device.

17. The computationally-implemented method of claim 1, wherein said identifying one or more services at the server device that are configured to be provided to a user of the device, said one or more services requiring access to particular data controlled by the device, wherein access to the particular data controlled by the device is managed by the device comprises:
   identifying one or more services configured to be provided to a user of the device, said one or more services requiring access to particular data controlled by the device, wherein access to the particular data controlled by the device is accessible to one or more authenticated portions of the device.

18. The computationally-implemented method of claim 17, wherein said identifying one or more services configured to be provided to a user of the device, said one or more services requiring access to particular data controlled by the device, wherein access to the particular data controlled by the device is accessible to one or more authenticated portions of the device comprises:
   identifying one or more services configured to be provided to a user of the device, said one or more services requiring access to particular data controlled by the device, wherein access to the particular data controlled by the device is accessible to an operating system of the device.

19. The computationally-implemented method of claim 17, wherein said identifying one or more services configured to be provided to a user of the device, said one or more services requiring access to particular data controlled by the device, wherein access to the particular data controlled by the device is accessible to one or more authenticated portions of the device comprises:
   identifying one or more services configured to be provided to a user of the device, said one or more services requiring access to particular data controlled by the device, wherein access to the particular data controlled by the device is accessible to one or more particular applications of the device.

20. The computationally-implemented method of claim 19, wherein said identifying one or more services configured to be provided to a user of the device, said one or more services requiring access to particular data controlled by the device, wherein access to the particular data controlled by the device is accessible to one or more particular applications of the device comprises:
   identifying one or more services configured to be provided to a user of the device, said one or more services requiring access to particular data controlled by the device, wherein access to the particular data controlled by the device is accessible to one or more applications designed by a particular designer.

21. The computationally-implemented method of claim 1, wherein said identifying one or more services at the server device that are configured to be provided to a user of the device, said one or more services requiring access to particular data controlled by the device, wherein access to the particular data controlled by the device is managed by the device comprises:
   identifying one or more services configured to be provided to a user of the device, said one or more services requiring access to particular data controlled by the device, wherein access to the particular data controlled by the device is granted to applications determined to be secure.

22. The computationally-implemented method of claim 1, wherein said identifying one or more services at the server device that are configured to be provided to a user of the device, said one or more services requiring access to particular data controlled by the device, wherein access to the particular data controlled by the device is managed by the device comprises:
   identifying one or more services configured to be provided to a user of the device, said one or more services requiring access to particular data controlled by the device, wherein access to the particular data controlled by the device is granted to applications for which a certification of security has been received.

23. The computationally-implemented method of claim 1, wherein said identifying one or more services at the server device that are configured to be provided to a user of the device, said one or more services requiring access to particular data controlled by the device, wherein access to the particular data controlled by the device is managed by the device comprises:
   identifying one or more services configured to be provided to a user of the device, said one or more services requiring access to particular data controlled by the device, wherein transmission of the particular data controlled by the device to one or more particular locations is prevented.

24. The computationally-implemented method of claim 1, wherein said identifying one or more services at the server device that are configured to be provided to a user of the device, said one or more services requiring access to particular data controlled by the device, wherein access to the particular data controlled by the device is managed by the device comprises:
   identifying one or more services configured to be provided to a user of the device, said one or more services requiring access to particular data controlled by the device, wherein transmission of the particular data controlled by the device is monitored.

25. The computationally-implemented method of claim 24, wherein said identifying one or more services configured to be provided to a user of the device, said one or more services requiring access to particular data controlled by the device, wherein transmission of the particular data controlled by the device is monitored comprises:
   identifying one or more services configured to be provided to a user of the device, said one or more services requiring access to particular data controlled by the device, wherein transmission of the particular data controlled by the device is allowed to one or more locations for which permission to receive the data is granted.

26. The computationally-implemented method of claim 25, wherein said identifying one or more services configured to be provided to a user of the device, said one or more services requiring access to particular data controlled by the device, wherein transmission of the particular data controlled by the device is allowed to one or more locations for which permission to receive the data is granted comprises:

identifying one or more services configured to be provided to a user of the device, said one or more services requiring access to particular data controlled by the device, wherein transmission of the particular data controlled by the device is allowed to one or more locations for which permission to receive the data is granted by an application of the device.

27. The computationally-implemented method of claim 1, wherein said identifying one or more services at the server device that are configured to be provided to a user of the device, said one or more services requiring access to particular data controlled by the device, wherein access to the particular data controlled by the device is managed by the device comprises:

identifying one or more services configured to be provided to a user of the device, based on one or more usage characteristics of the device, said one or more services requiring access to particular data controlled by the device, wherein access to the particular data controlled by the device is managed by the device.

28. The computationally-implemented method of claim 27, wherein said identifying one or more services configured to be provided to a user of the device, based on one or more usage characteristics of the device, said one or more services requiring access to particular data controlled by the device, wherein access to the particular data controlled by the device is managed by the device comprises:

identifying a service for identifying nearby locations where cold food is available, based on a usage characteristic showing more than five hours a day in temperatures above eighty degrees, said service for identifying nearby locations requiring access to location data provided by a user of the device.

29. The computationally-implemented method of claim 1, wherein said identifying one or more services at the server device that are configured to be provided to a user of the device, said one or more services requiring access to particular data controlled by the device, wherein access to the particular data controlled by the device is managed by the device comprises:

identifying one or more services configured to be provided to a user of the device, said one or more services requiring access to particular data stored on the device, wherein access to the particular data controlled by the device is managed by the device.

30. The computationally-implemented method of claim 1, wherein said identifying one or more services at the server device that are configured to be provided to a user of the device, said one or more services requiring access to particular data controlled by the device, wherein access to the particular data controlled by the device is managed by the device comprises:

identifying one or more services configured to be provided to a user of the device, said one or more services requiring access to particular data stored at a remote server and accessible by the device, wherein access to the particular data controlled by the device is managed by the device.

31. The computationally-implemented method of claim 1, wherein said identifying one or more services at the server device that are configured to be provided to a user of the device, said one or more services requiring access to particular data controlled by the device, wherein access to the particular data controlled by the device is managed by the device comprises:

identifying one or more services configured to be provided by a user of the device, based on the received data regarding information collected by the sensor of the device, said one or more services requiring access to particular data controlled by the device, wherein access to the particular data is managed by the device.

32. The computationally-implemented method of claim 1, wherein said requesting access to the particular data controlled by the device, in exchange for providing one or more of the identified one or more services comprises:

requesting to receive the particular data controlled by the device, in exchange for providing one or more of the identified one or more services.

33. The computationally-implemented method of claim 1, wherein said requesting access to the particular data controlled by the device, in exchange for providing one or more of the identified one or more services comprises:

requesting key data to convert previously received data into the particular data, in exchange for providing one or more of the identified one or more services.

34. The computationally-implemented method of claim 33, wherein said requesting key data to convert previously received data into the particular data, in exchange for providing one or more of the identified one or more services comprises:

requesting a reverse lookup table to convert previously received data into the particular data, in exchange for providing one or more of the identified one or more services.

35. The computationally-implemented method of claim 34, wherein said requesting a reverse lookup table to convert previously received data into the particular data, in exchange for providing one or more of the identified one or more services comprises:

requesting a reverse lookup table to convert previously received anonymous or partially anonymous data into data comprising the particular data and an identification of the device from which the particular data originated.

36. The computationally-implemented method of claim 1, wherein said requesting access to the particular data controlled by the device, in exchange for providing one or more of the identified one or more services comprises:

facilitating presentation at the device of a particular service of the one or more services; and facilitating presentation of an indication that, in order to provide the service, access to the particular data must be granted.

37. The computationally-implemented method of claim 36, wherein said facilitating presentation at the device of a particular service of the one or more services comprises:

facilitating presentation, at the device, of a particular service of the one or more services at a particular time.

38. The computationally-implemented method of claim 36, wherein said facilitating presentation at the device of a particular service of the one or more services comprises:

receiving data comprising a particular time at which desire for the particular service may be increased; and facilitating presentation of the particular service at the device at the determined particular time.

39. The computationally-implemented method of claim 36, wherein said facilitating presentation at the device of a particular service of the one or more services comprises:

determining one or more conditions at which desire for the particular service may be increased; and facilitating presentation of the particular service at the device at a time when one or more of the determined one or more conditions are present.

40. The computationally-implemented method of claim 1, wherein said requesting access to the particular data controlled by the device, in exchange for providing one or more of the identified one or more services comprises:

requesting to receive the particular data controlled by the device;

receiving the particular data controlled by the device; and providing the one or more of the identified one or more services.

41. The computationally-implemented method of claim 1, wherein said receiving data regarding one or more properties of a device, wherein said data is not alone sufficient to particularly identify the device comprises:

receiving data regarding one or more properties of the device, wherein said data is not alone sufficient to particularly identify the device, and wherein one or more properties of the device includes at least one of:

data indicating that the device has collected more than twenty-five different position data readings in the last seventy-two hours;

data indicating that the device is a camera that contains more than five hundred pictures;

data indicating that the device is one of a set of cameras, each of which contain more than five hundred pictures;

data indicating one or more names of contacts stored on the device;

data indicating a number of names of contacts stored on the device;

data indicating temperature information collected by the device;

data indicating a number of songs stored in MP3 format on the device;

a name of the device;

a name of one or more applications stored on the device;

a device identifier assigned by a device manufacturer on a first time that the device connects to a particular network;

a device identifier that allows the device to use an online marketplace;

a location of the device;

data indicating that the device has visited three or more of a particular place within last twenty four hours;

a list of data collected by an input component of the device;

a list of words typed into a keyboard of the device;

an identifying information of a communication network on which the device is communicating and/or has communicated;

a format of contact information data, including but not limited to, contact information with phone numbers, and contact information with e-mails;

a number of contacts stored on the device which represent persons under a particular age;

a number of contacts stored on the device which represent persons who physically reside in a particular geographic area;

a number of programs stored in a memory of the device;

a number of a particular type of program stored in a memory of the device;

a list of sensors present on the device;

a compilation of how often various sensors present on the device are used;

data that regards an information throughput capacity of the device;

an accounting of how many minutes per day a particular feature of the device is used;

a number of movies that were watched through use of the device in the last 60 days; and a screen resolution of a display of the device.

42. The computationally-implemented method of claim 1, wherein said receiving data regarding one or more properties of a device, wherein said data is not alone sufficient to particularly identify the device comprises:

receiving data regarding one or more properties of the device, wherein said data is not alone sufficient to particularly identify the device, and wherein the device includes one or more of:

a computer-controlled device;

a cellular phone;

a network phone;

a smartphone;

a tablet; a music player;

a radio;

a USB drive;

a portable solid state drive;

an augmented reality device;

a media player;

a television;

an appliance, a microwave, a convection oven, a refrigerator/freezer;

a navigation system;

a medical alert device;

a remote control;

a peripheral;

an electronic safe;

an electronic lock;

an electronic security system;

a video camera; and a personal video recorder.

43. The computationally-implemented method of claim 1, wherein said identifying one or more services at the server device that are configured to be provided to a user of the device, said one or more services requiring access to particular data controlled by the device, wherein access to the particular data controlled by the device is managed by the device comprises:

identifying one or more services configured to be provided to the user of the device, said one or more services requiring access to particular data controlled by the device, wherein access to the particular data controlled by the device is managed by the device, wherein the one or more services include on or more of:

a service that shows a location of entities in the user's contact list;

a music suggestion service based on music accessed by the device;

a new restaurant finder service based on reviews of restaurants submitted by the user through use of the device;

a weather forecasting service;

a driving habit analysis service;

a sleepy driver alerting service;

a video and/or image processing service;

a time management assistance service;

a calorie burning calculation service;
a socializing application that determines a bar to go to based on how many persons in a contact list of the device that are in similar locations;
a plant-watering timing application;
a dynamic news-flash delivery service;
a database service that stores various physical exercise activities and contacts a server to determine total calories burned;
a book recommendation service for an e-reader device;
a food evaluation test service for a refrigerator device that evaluates food freshness inside the refrigerator device;
a fuel mileage efficiency monitoring service;
a blood alcohol level concentration estimation service;
an outdoor route mapping service;
a mixed drink selection service; and
a health-food alternative selection service.

44. A computationally-implemented system, comprising circuitry for receiving data regarding one or more properties of a device, wherein said data is not alone sufficient to particularly identify the device;

circuitry for identifying one or more services from one or more service providers configured to be provided to a user of the device by a computing device separate from the one or more service providers, said one or more services requiring access to particular data controlled by the device, wherein access to the particular data controlled by the device is managed by the device, and wherein the identification of the one or more services is performed through automation based on the received data; and circuitry for requesting access to the particular data controlled by the device, in exchange for providing one or more of the identified one or more services.

45. A computationally-implemented method, comprising:

receiving data regarding one or more properties of a device, wherein said data is not alone sufficient to particularly identify the device;

identifying one or more services from one or more service providers configured to be provided to a user of the device by a computing device separate from the one or more service providers, said one or more services requiring access to particular data controlled by the device, wherein access to the particular data controlled by the device is managed by the device, and wherein the identification of the one or more services is performed through automation based on the received data; and requesting access to the particular data controlled by the device, in exchange for providing one or more of the identified one or more services.

* * * * *